(12) United States Patent
Kuppuswamy et al.

(10) Patent No.: US 10,696,758 B2
(45) Date of Patent: *Jun. 30, 2020

(54) GROUP 4 CATALYST COMPOUNDS AND PROCESS FOR USE THEREOF

(71) Applicant: ExxonMobil Chemical Patents Inc., Baytown, TX (US)

(72) Inventors: Subramaniam Kuppuswamy, Mont Belvieu, TX (US); Matthew W. Holtcamp, Huffman, TX (US); David M. Fiscus, Houston, TX (US); Matthew S. Bedoya, Humble, TX (US); Laughlin G. McCullough, League City, TX (US); Xuan Ye, Houston, TX (US)

(73) Assignee: ExxonMobil Chemical Patents, Inc., Baytown, TX (US)

( * ) Notice: Subject to any disclaimer, the term of this patent is extended or adjusted under 35 U.S.C. 154(b) by 29 days.

This patent is subject to a terminal disclaimer.

(21) Appl. No.: 15/877,143

(22) Filed: Jan. 22, 2018

(65) Prior Publication Data

US 2018/0237559 A1 Aug. 23, 2018

Related U.S. Application Data

(60) Provisional application No. 62/461,110, filed on Feb. 20, 2017.

(51) Int. Cl.
*C07F 17/00* (2006.01)
*C08F 4/6592* (2006.01)
(Continued)

(52) U.S. Cl.
CPC .............. *C08F 10/02* (2013.01); *C07F 17/00* (2013.01); *C08F 210/16* (2013.01);
(Continued)

(58) Field of Classification Search
CPC ..... C07F 17/00; C08F 4/65927; C08F 210/16
See application file for complete search history.

(56) References Cited

U.S. PATENT DOCUMENTS 7,179,876 B2 2/2007 Szul et al.
7,829,495 B2 11/2010 Floyd et al.
(Continued)

FOREIGN PATENT DOCUMENTS

JP 5262405 A 2/2010
WO 2016/094843 A 6/2016
(Continued)

OTHER PUBLICATIONS

Stadelhofer, J. et al., "Darstellung und eigenschaften von alkylmetallcyclopentadienderivativen des aluminiums, galliums und indiums" J. Organomet. Chem., 1975, vol. 84, C1-C4.
(Continued)

*Primary Examiner* — Caixia Lu
(74) *Attorney, Agent, or Firm* — ExxonMobil Chemical Patents, Inc.-Law Department

(57) ABSTRACT

This invention relates to metallocene compounds having a group substituted at the 3 position of at least one cyclopentadienyl ring represented by the formula —$CH_2$—$SiR'_3$ or —$CH_2$—$CR'_3$ and R' is a $C_1$ to $C_{20}$ substituted or unsubstituted hydrocarbyl.

22 Claims, 2 Drawing Sheets

(51) Int. Cl.
*C08F 210/16* (2006.01)
*C08F 10/02* (2006.01)
*C08F 4/659* (2006.01)

(52) U.S. Cl.
CPC ...... *C08F 4/65912* (2013.01); *C08F 4/65916* (2013.01); *C08F 2800/10* (2013.01)

(56) References Cited

U.S. PATENT DOCUMENTS

2009/0297810 A1    12/2009  Fiscus et al.
2012/0041164 A1*    2/2012  Kolb ................. C08F 10/02
                                              526/241

FOREIGN PATENT DOCUMENTS

WO    2016/171807 A    10/2016
WO    2016/172099 A    10/2016

OTHER PUBLICATIONS

Leino R., et al., "Syndiospecific Propylene Polymerization with C1 Symmetric Group 4 ansa-Metallocene Catalysts", Macromolecules, 2001, vol. 34, pp. 2072-2082.
Hill, M., et al., "Exploring CH-Activation Pathways in Bifunctional Zirconocene/Borane Systems", Journal of the American Chemical Society, 2004, vol. 126, No. 35, pp. 11046-11057.
U.S. Appl. No. 62/461,104, filed Feb. 20, 2017.
U.S. Appl. No. 15/852,553, filed Dec. 22, 2017.

* cited by examiner

GROUP 4 CATALYST COMPOUNDS AND PROCESS FOR USE THEREOF

CROSS REFERENCE TO RELATED APPLICATIONS

This application claims the benefit of Ser. No. 62/461,110, filed Feb. 20, 2017, the disclosure of which is hereby incorporated by reference in its entirety.

FIELD OF THE INVENTION

This invention relates to novel group 4 catalyst compounds, catalyst systems comprising such, and uses thereof.

BACKGROUND OF THE INVENTION

Olefin polymerization catalysts are of great use in industry. Hence there is interest in finding new catalyst systems that increase the commercial usefulness of the catalyst and allow the production of polymers having improved properties.

Catalysts for olefin polymerization are often based on substituted metallocenes as catalyst precursors, which are activated either with the help of an alumoxane, or with an activator containing a non-coordinating anion.

For example, U.S. Pat. No. 7,829,495 discloses $Me_2Si$(fluorenyl)(3-nPr-Cp)$ZrCl_2$ and U.S. Pat. No. 7,179,876 discloses supported (nPrCp)$_2$HfMe$_2$.

Further, Stadelhofer, J.; Weidlein, J.; and Haaland, A., *J. Organomet. Chem.*, 1975, 84, C1-C4 discloses preparation of potassium cyclopentadienide.

Additionally, $Me_2C(Cp)(Me_3SiCH_2$-Ind)$MCl_2$ and $Me_2C$(Cp)(Me,$Me_3SiCH_2$-Ind)$MCl_2$, where M is Zr or Hf have been synthesized and screened for the syndiospecific polymerization of propylene, see Leino, R.; Gomez, F.; Cole, A.; and Waymouth, R., *Macromolecules*, 2001, 34, pp. 2072-2082.

Background references include U.S. Publication No. 2009/0297810, WO 2016/171807, WO 2016/094,843, WO 2016/172,099, and JP 5 262405B.

There is still a need in the art for new and improved catalyst systems for the polymerization of olefins, in order to achieve specific polymer properties, such as high melting point, high molecular weights, to increase conversion or comonomer incorporation, or to alter comonomer distribution without deteriorating the resulting polymer's properties. There is especially a need to produce linear low density polyethylene where the comonomer used to disrupt the ethylene run lengths to reduce crystallinity is efficient. The catalyst systems described herein are particularly efficient at yielding linear low density polyethylene with efficient use of comonomer.

It is therefore an object of the present invention to provide novel catalyst compounds, catalysts systems comprising such compounds, and processes for the polymerization of olefins using such compounds and systems.

SUMMARY OF THE INVENTION

This invention relates to bridged group 4 metallocene compounds represented by the formula (A):

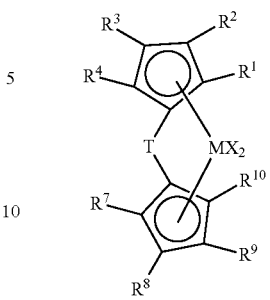

where:

M is Hf or Zr;

each $R^1$, $R^2$, and $R^4$ is independently hydrogen, alkoxide, or a $C_1$ to $C_{40}$ substituted or unsubstituted hydrocarbyl group;

$R^3$ is independently hydrogen, alkoxide, or a $C_1$ to $C_{40}$ substituted or unsubstituted hydrocarbyl group or is —$CH_2$—$SiR'_3$ or —$CH_2$—$CR'_3$ where each R' is independently a $C_1$ to $C_{20}$ substituted or unsubstituted hydrocarbyl, provided that at least one R' is not H;

each $R^7$, $R^8$, and $R^{10}$ is independently hydrogen, alkoxide, or a $C_1$ to $C_{40}$ substituted or unsubstituted hydrocarbyl group;

$R^9$ is —$R^{20}$—$SiR'_3$ or —$R^{20}$—$CR'_3$, where $R^{20}$ is hydrogen, or a $C_1$ to $C_4$ hydrocarbyl, and each R' is independently a $C_1$ to $C_{20}$ substituted or unsubstituted hydrocarbyl, provided that at least one R' is not H;

T is a bridging group; and each X is, independently, a univalent anionic ligand, or two X are joined and bound to the metal atom to form a metallocycle ring, or two X are joined to form a chelating ligand, a diene ligand, or an alkylidene ligand.

This invention also relates to catalyst systems comprising an activator, a catalyst compound described above, and optional support.

This invention also relates to a method to polymerize olefins comprising contacting the catalyst system described above with one or more monomers.

This invention further relates to polymer compositions produced by the methods described herein.

DETAILED DESCRIPTION

Figure 1:
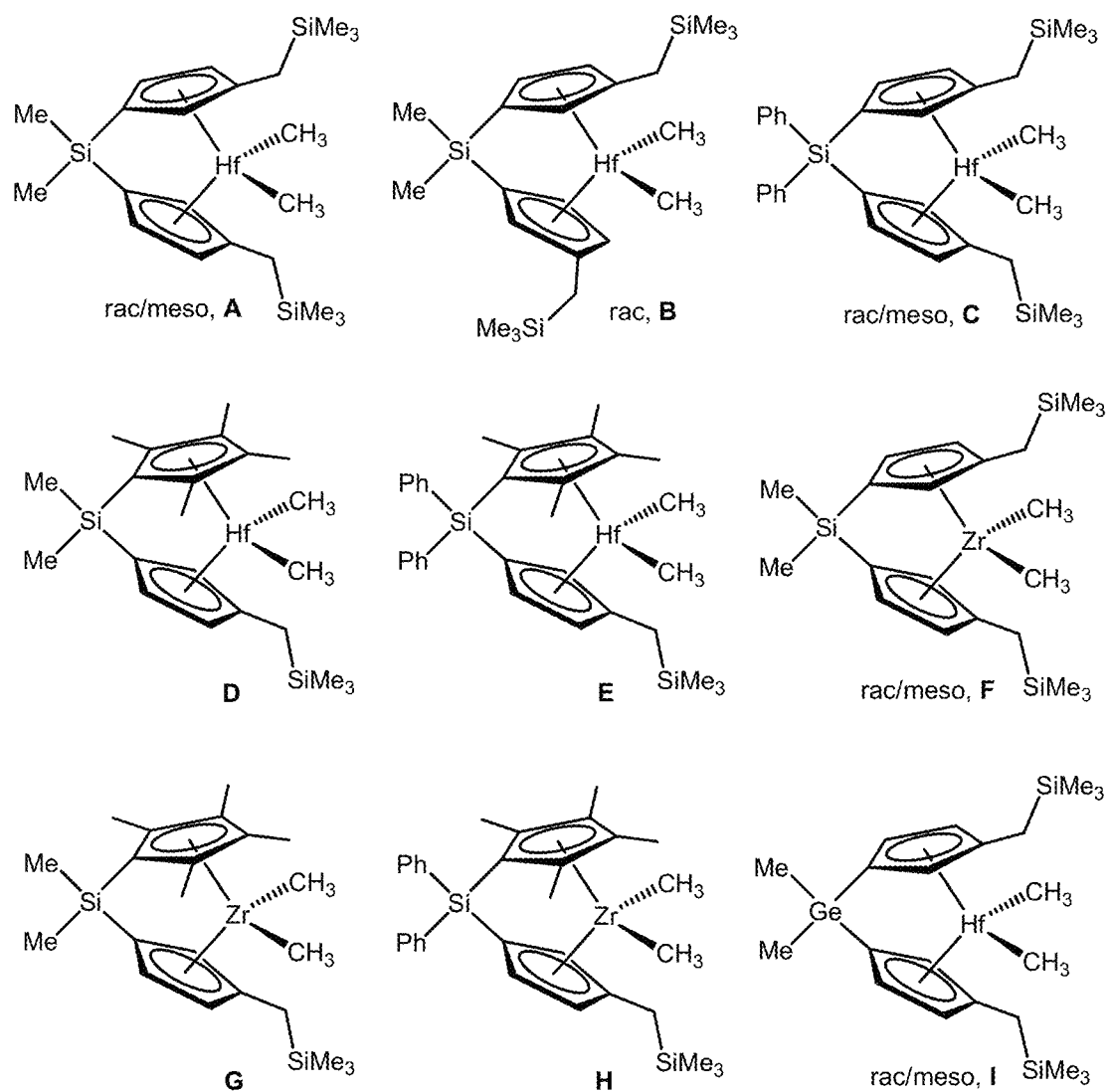
FIG. 1 shows drawings of compounds A to I.

For the purposes of this invention and the claims thereto, the new numbering scheme for the Periodic Table Groups is used as described in CHEMICAL AND ENGINEERING NEWS, 63(5), pg. 27 (1985). Therefore, a "group 4 metal" is an element from group 4 of the Periodic Table, e.g. Hf, Ti, or Zr.

"Catalyst productivity" is a measure of how many grams of polymer (P) are produced using a polymerization catalyst comprising W g of catalyst (cat), over a period of time of T hours; and may be expressed by the following formula: P/(T×W) and expressed in units of gPgcat$^{-1}$hr$^{-1}$. Conversion is the amount of monomer that is converted to polymer product, and is reported as mol % and is calculated based on the polymer yield and the amount of monomer fed into the reactor. Catalyst activity is a measure of how active the catalyst is and is reported as the mass of product polymer (P) produced per mole of catalyst (cat) used (kgP/molcat).

An "olefin," alternatively referred to as "alkene," is a linear, branched, or cyclic compound of carbon and hydrogen having at least one double bond. For purposes of this specification and the claims appended thereto, when a polymer or copolymer is referred to as comprising an olefin, the olefin present in such polymer or copolymer is the polymerized form of the olefin. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer. A "polymer" has two or more of the same or different mer units. A "homopolymer" is a polymer having mer units that are the same. A "copolymer" is a polymer having two or more mer units that are different from each other. A "terpolymer" is a polymer having three mer units that are different from each other. "Different" as used to refer to mer units indicates that the mer units differ from each other by at least one atom or are different isomerically. Accordingly, the definition of copolymer, as used herein, includes terpolymers and the like. An "ethylene polymer" or "ethylene copolymer" is a polymer or copolymer comprising at least 50 mol % ethylene derived units, a "propylene polymer" or "propylene copolymer" is a polymer or copolymer comprising at least 50 mol % propylene derived units, and so on.

For the purposes of this invention, ethylene shall be considered an α-olefin.

For purposes of this invention and claims thereto, the term "substituted" means that a hydrogen group has been replaced with a heteroatom, or a heteroatom containing group. For example, a "substituted hydrocarbyl" is a radical made of carbon and hydrogen where at least one hydrogen is replaced by a heteroatom or heteroatom containing group.

As used herein, Mn is number average molecular weight, Mw is weight average molecular weight, and Mz is z average molecular weight, wt % is weight percent, and mol % is mole percent. Molecular weight distribution (MWD), also referred to as polydispersity index or PDI, is defined to be Mw divided by Mn. Unless otherwise noted, all molecular weight units (e.g., Mw, Mn, Mz) are g/mol. The following abbreviations may be used herein: Me is methyl, Et is ethyl, Pr is propyl, cPR is cyclopropyl, nPr is n-propyl, iPr is isopropyl, Bu is butyl, nBu is normal butyl, iBu is isobutyl, sBu is sec-butyl, tBu is tert-butyl, Oct is octyl, Cy is cyclohexyl, Ph is phenyl, Bn is benzyl, MAO is methylalumoxane.

A "catalyst system" is combination of at least one catalyst compound, at least one activator, an optional co-activator, and an optional support material. For the purposes of this invention and the claims thereto, when catalyst systems are described as comprising neutral stable forms of the components, it is well understood by one of ordinary skill in the art, that the ionic form of the component is the form that reacts with the monomers to produce polymers.

In the description herein, the catalyst may be described as a catalyst precursor, a pre-catalyst compound, catalyst compound, a complex, transition metal complex, or a transition metal compound, and these terms are used interchangeably. A polymerization catalyst system is a catalyst system that can polymerize monomers to polymer. An "anionic ligand" is a negatively charged ligand which donates one or more pairs of electrons to a metal ion.

For purposes of this invention and claims thereto in relation to catalyst compounds, the term "substituted" means that a hydrogen group has been replaced with a hydrocarbyl group, a heteroatom, or a heteroatom containing group. For example, methyl cyclopentadiene (Cp) is a Cp group substituted with a methyl group.

For purposes of this invention and claims thereto, "alkoxides" include those where the alkyl group is a $C_1$ to $C_{10}$ hydrocarbyl. The alkyl group may be straight chain, branched, or cyclic. The alkyl group may be saturated or unsaturated. In some embodiments, the alkyl group may comprise at least one aromatic group.

The terms "hydrocarbyl radical," "hydrocarbyl," "hydrocarbyl group," "alkyl radical," and "alkyl" are used interchangeably throughout this document. Likewise, the terms "group," "radical," and "substituent" are also used interchangeably in this document. For purposes of this disclosure, "hydrocarbyl radical" is defined to be $C_1$-$C_{100}$ radicals, that may be linear, branched, or cyclic, and when cyclic, aromatic or non-aromatic. Examples of such radicals include, but are not limited to, methyl, ethyl, n-propyl, isopropyl, n-butyl, isobutyl, sec-butyl, tert-butyl, pentyl, iso-amyl, hexyl, octyl cyclopropyl, cyclobutyl, cyclopentyl, cyclohexyl, cyclooctyl, and the like including their substituted analogues. Substituted hydrocarbyl radicals are radicals in which at least one hydrogen atom of the hydrocarbyl radical has been substituted with at least one functional group, such as halogen (such as Br, Cl, F or I) or at least one functional group such as $NR^*_2$, $OR^*$, $SeR^*$, $TeR^*$, $PR^*_2$, $AsR^*_2$, $SbR^*_2$, $SR^*$, $BR^*_2$, $SiR^*_3$, $GeR^*_3$, $SnR^*_3$, $PbR^*_3$, and the like, or where at least one heteroatom has been inserted within a hydrocarbyl ring.

The term "alkenyl" means a straight-chain, branched-chain, or cyclic hydrocarbon radical having one or more double bonds. These alkenyl radicals may be optionally substituted. Examples of suitable alkenyl radicals include, but are not limited to, ethenyl, propenyl, allyl, 1,4-butadienyl cyclopropenyl, cyclobutenyl, cyclopentenyl, cyclohexenyl, cyclooctenyl and the like including their substituted analogues.

The term "aryl" or "aryl group" means a six carbon aromatic ring and the substituted variants thereof, including but not limited to, phenyl, 2-methyl-phenyl, xylyl, and 4-bromo-xylyl. Likewise, heteroaryl means an aryl group where a ring carbon atom (or two or three ring carbon atoms) has been replaced with a heteroatom, preferably N, O, or S. As used herein, the term "aromatic" also refers to pseudo-aromatic heterocycles which are heterocyclic substituents that have similar properties and structures (nearly planar) to aromatic heterocyclic ligands, but are not by definition aromatic; likewise, the term aromatic also refers to substituted aromatics.

Where isomers of a named alkyl, alkenyl, alkoxide, or aryl group exist (e.g., n-butyl, iso-butyl, sec-butyl, and tert-butyl) reference to one member of the group (e.g., n-butyl) shall expressly disclose the remaining isomers (e.g., iso-butyl, sec-butyl, and tert-butyl) in the family. Likewise, reference to an alkyl, alkenyl, alkoxide, or aryl group without specifying a particular isomer (e.g., butyl) expressly discloses all isomers (e.g., n-butyl, iso-butyl, sec-butyl, and tert-butyl).

The term "ring atom" means an atom that is part of a cyclic ring structure. By this definition, a benzyl group has six ring atoms and tetrahydrofuran has 5 ring atoms.

A heterocyclic ring is a ring having a heteroatom in the ring structure as opposed to a heteroatom substituted ring where a hydrogen on a ring atom is replaced with a heteroatom. For example, tetrahydrofuran is a heterocyclic ring and 4-N,N-dimethylamino-phenyl is a heteroatom substituted ring.

A scavenger is a compound that is typically added to facilitate polymerization by scavenging impurities. Some scavengers may also act as activators and may be referred to as co-activators. A co-activator, that is not a scavenger, may also be used in conjunction with an activator in order to form an active catalyst. In some embodiments, a co-activator can be pre-mixed with the transition metal compound to form an alkylated transition metal compound.

An "anionic ligand" is a negatively charged ligand which donates one or more pairs of electrons to a metal ion. A "neutral donor ligand" is a neutrally charged ligand which donates one or more pairs of electrons to a metal ion.

The term "continuous" means a system that operates without interruption or cessation. For example, a continuous process to produce a polymer would be one where the reactants are continually introduced into one or more reactors and polymer product is continually withdrawn.

This invention relates to catalyst compounds represented by the formula (A), and catalyst systems comprising: activator, catalyst compound, and optional support wherein the catalyst compound is represented by the formula (A):

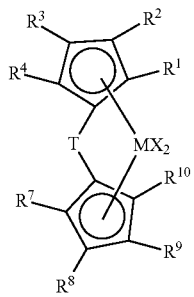

(A)

where:
M is Hf or Zr;
each $R^1$, $R^2$, and $R^4$ is independently hydrogen, alkoxide, or a $C_1$ to $C_{40}$ substituted or unsubstituted hydrocarbyl group (preferably a $C_1$ to $C_{20}$ substituted or unsubstituted hydrocarbyl group);
$R^3$ is independently hydrogen, alkoxide, or a $C_1$ to $C_{40}$ substituted or unsubstituted hydrocarbyl group or is —$R^{20}$—$SiR'_3$ or —$R^{20}$—$CR'_3$ where $R^{20}$ is hydrogen, or a $C_1$ to $C_4$ hydrocarbyl, and each R' is independently a $C_1$ to $C_{20}$ substituted or unsubstituted hydrocarbyl, provided that at least one R' is not H;
each $R^7$, $R^8$, and $R^{10}$ is independently hydrogen, alkoxide, or a $C_1$ to $C_{40}$ substituted or unsubstituted hydrocarbyl group (preferably a $C_1$ to $C_{20}$ substituted or unsubstituted hydrocarbyl group);
$R^9$ is —$R^{20}$—$SiR'_3$ or —$R^{20}$—$CR'_3$ where $R^{20}$ is hydrogen or a $C_1$ to $C_4$ hydrocarbyl (preferably $R^{20}$ is $CH_2$), and each R' is independently a $C_1$ to $C_{20}$ substituted or unsubstituted hydrocarbyl, (preferably R' is alkyl, such as Me, or aryl, such as phenyl), provided that at least one R' is not H, alternately 2 R' are not H, alternately 3 R' are not H;
T is a bridging group, such as $CR^{21}R^{22}$, where $R^{21}$ and $R^{22}$ are independently hydrogen, halogen, or a $C_1$-$C_{20}$ containing hydrocarbyl, substituted hydrocarbyl, and optionally $R^{21}$ and $R^{22}$ join to form a substituted or unsubstituted, saturated, partially unsaturated or aromatic, cyclic or polycyclic substituent, optionally $R^{21}$ and $R^{22}$ are the same or different; and
each X is, independently, a univalent anionic ligand, or two X are joined and bound to the metal atom to form a metallocycle ring, or two X are joined to form a chelating ligand, a diene ligand, or an alkylidene ligand, preferably (halogen or C1 to C12 alkyl or aryl, such as Cl, Me, Et, Ph).

Catalyst Compounds

In a preferred embodiment, this invention relates to catalyst compounds, and catalyst systems comprising such compounds, represented by the formula (A):

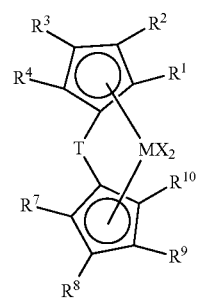

(A)

where:
M is Hf or Zr;
each $R^1$, $R^2$, and $R^4$ is independently hydrogen, alkoxide, or a $C_1$ to $C_{40}$ substituted or unsubstituted hydrocarbyl group (preferably a $C_1$ to $C_{20}$ substituted or unsubstituted hydrocarbyl group);
$R^3$ is independently hydrogen, alkoxide or a $C_1$ to $C_{40}$ substituted or unsubstituted hydrocarbyl group (preferably a $C_1$ to $C_{20}$ substituted or unsubstituted hydrocarbyl group), or is —$R^{20}$—$SiR'_3$ or —$R^{20}$—$CR'_3$ where $R^{20}$ is hydrogen, or a $C_1$ to $C_4$ hydrocarbyl, and each R' is independently hydrogen or a $C_1$ to $C_{20}$ substituted or unsubstituted hydrocarbyl, provided that at least one R' is not H;
each $R^7$, $R^8$, and $R^{10}$ is independently hydrogen, alkoxide or a $C_1$ to $C_{40}$ substituted or unsubstituted hydrocarbyl group (preferably a $C_1$ to $C_{20}$ substituted or unsubstituted hydrocarbyl group);
$R^9$ is —$R^{20}$—$SiR'_3$ or —$R^{20}$—$CR'_3$ where $R^{20}$ is hydrogen or a $C_1$ to $C_4$ hydrocarbyl (preferably $R^{20}$ is $CH_2$), and each R' is independently hydrogen a $C_1$ to $C_{20}$ substituted or unsubstituted hydrocarbyl, (preferably R' is alkyl, such as Me, or aryl, such as phenyl), provided that at least one R' is not H, alternately 2 R' are not H, alternately 3 R' are not H;
T is a bridging group, such as $CR^{21}R^{22}$, where $R^{21}$ and $R^{22}$ are independently hydrogen, halogen, or a $C_1$-$C_{20}$ containing hydrocarbyl, substituted hydrocarbyl, and optionally $R^{21}$ and $R^{22}$ join to form a substituted or unsubstituted, saturated, partially unsaturated or aromatic, cyclic or polycyclic substituent, optionally $R^{21}$ and $R^{22}$ are the same or different; and
each X is, independently, a univalent anionic ligand, or two X are joined and bound to the metal atom to form a metallocycle ring, or two X are joined to form a chelating ligand, a diene ligand, or an alkylidene ligand (preferably halogen or C1 to C12 alkyl or aryl, such as Cl, Me, Et, Ph).

In a preferred embodiment of the invention, M is Hf, alternately M is Zr.

In a preferred embodiment of the invention, each $R^1$, $R^2$, and $R^4$ is independently hydrogen, or a substituted $C_1$ to $C_{12}$ hydrocarbyl group or an unsubstituted $C_1$ to $C_{12}$ hydrocarbyl group, preferably hydrogen, methyl, ethyl, propyl, butyl, pentyl, hexyl, or an isomer thereof.

In a preferred embodiment of the invention, each $R^3$ is independently hydrogen, or a substituted $C_1$ to $C_{12}$ hydrocarbyl group or an unsubstituted $C_1$ to $C_{12}$ hydrocarbyl group, preferably hydrogen, methyl, ethyl, propyl, butyl, pentyl, hexyl, or an isomer thereof or $R^3$ is —$R^{20}$—$SiR'_3$ or —$R^{20}$—$CR'_3$ where $R^{20}$ is a $C_1$ to $C_4$ hydrocarbyl (preferably methyl, ethyl, propyl, butyl), and R' is a $C_1$ to $C_{20}$ substituted or unsubstituted hydrocarbyl, preferably a substituted $C_1$ to $C_{12}$ hydrocarbyl group or an unsubstituted $C_1$ to $C_{12}$ hydrocarbyl group, preferably methyl, ethyl, propyl, butyl, pentyl, hexyl, or an isomer thereof.

In a preferred embodiment of the invention, each $R^7$, $R^8$, and $R^{10}$ is independently hydrogen, or a substituted $C_1$ to $C_{12}$ hydrocarbyl group or an unsubstituted $C_1$ to $C_{12}$ hydrocarbyl group, preferably hydrogen, methyl, ethyl, propyl, butyl, pentyl, hexyl, or an isomer thereof.

In a preferred embodiment of the invention, $R^9$, is —$R^{20}$—$SiR'_3$ or —$R^{20}$—$CR'_3$ where $R^{20}$ is a $C_1$ to $C_4$ hydrocarbyl (preferably methyl, ethyl, propyl, butyl), and R' is a $C_1$ to $C_{20}$ substituted or unsubstituted hydrocarbyl, preferably a substituted $C_1$ to $C_{12}$ hydrocarbyl group or an unsubstituted $C_1$ to $C_{12}$ hydrocarbyl group, preferably methyl, ethyl, propyl, butyl, pentyl, hexyl, or an isomer thereof.

Alternately, $R^9$ and optionally $R^3$ are, independently, —$R^{20}$—$CMe_3$, or —$R^{20}$—$SiMe_3$ where $R^{20}$ is a $C_1$ to $C_4$ hydrocarbyl (preferably methyl, ethyl, propyl, butyl), preferably —$CH_2$—$CMe_3$, or —$CH_2$—$SiMe_3$.

Alternately, each X may be, independently, a halide, a hydride, an alkyl group, an alkenyl group or an arylalkyl group.

Alternately, each X is, independently, selected from the group consisting of hydrocarbyl radicals having from 1 to 20 carbon atoms, aryls, hydrides, amides, alkoxides, sulfides, phosphides, halides, dienes, amines, phosphines, ethers, and a combination thereof (two X's may form a part of a fused ring or a ring system), preferably each X is independently selected from halides, aryls and $C_1$ to $C_5$ alkyl groups, preferably each X is a phenyl, methyl, ethyl, propyl, butyl, pentyl, bromo, or chloro group.

Preferably, T is a bridging group containing at least one Group 13, 14, 15, or 16 element, in particular boron or a Group 14, 15 or 16 element. Examples of suitable bridging groups include P(=S)R', P(=Se)R', P(=O)R', $R'_2C$, $R'_2Si$, $R'_2Ge$, $R'_2CCR'_2$, $R'_2CCR'_2CR'_2$, $R'_2CCR'_2CR'_2CR'_2$, R'C=CR', R'C=CR'CR'_2, $R'_2CCR'$=CR'CR'_2, R'C=CR'CR'=CR', R'C=CR'CR'_2CR'_2, $R'_2CSiR'_2$, $R'_2SiSiR'_2$, $R'_2SiOSiR'_2$, $R'_2CSiR'_2CR'_2$, $R'_2SiCR'_2SiR'_2$, R'C=CR'SiR'_2, $R'_2CGeR'_2$, $R'_2GeGeR'_2$, $R'_2CGeR'_2CR'_2$, $R'_2GeCR'_2GeR'_2$, $R'_2SiGeR'_2$, R'C=CR'GeR'2, R'B, $R'_2C$—BR', $R'_2C$—BR'—$CR'_2$, $R'_2C$—O—$CR'_2$, $R'_2CR'_2C$—O—$CR'_2CR'_2$, $R'_2C$—O—$CR'_2CR'_2$, $R'_2C$—O—CR'=CR', $R'_2C$—S—$CR'_2$, $R'_2CR'_2C$—S—$CR'_2CR'_2$, $R'_2C$—S—$CR'_2CR'_2$, $R'_2C$—S—CR'=CR', $R'_2C$—Se—$CR'_2$, $R'_2CR'_2C$—Se—$CR'_2CR'_2$, $R'_2C$—Se—$CR'_2CR'_2$, $R'_2C$—Se—CR'=CR', $R'_2C$—N=CR', $R'_2C$—NR'—$CR'_2$, $R'_2C$—NR'—$CR'_2CR'_2$, $R'_2C$—NR'—CR'=CR', $R'_2CR'_2C$—NR'—$CR'_2CR'_2$, $R'_2C$—P=CR', $R'_2C$-PR'—$CR'_2$, O, S, Se, Te, NR', PR', AsR', SbR', O—O, S—S, R'N—NR', R'P—PR', O—S, O—NR', O—PR', S—NR', S—PR', and R'N—PR', where R' is hydrogen or a $C_1$-$C_{20}$ containing hydrocarbyl, substituted hydrocarbyl, halocarbyl, substituted halocarbyl, silylcarbyl or germylcarbyl substituent and optionally two or more adjacent R' may join to form a substituted or unsubstituted, saturated, partially unsaturated or aromatic, cyclic or polycyclic substituent. Preferred examples for the bridging group T include $CH_2$, $CH_2CH_2$, $SiMe_2$, $SiPh_2$, SiMePh, $Si(CH_2)_3$, $Si(CH_2)_4$, O, S, NPh, PPh, NMe, PMe, NEt, NPr, NBu, PEt, PPr, $Me_2SiOSiMe_2$, and PBu.

In a preferred embodiment of the invention in any embodiment of any formula described herein, T is represented by the formula $R^a{}_2J$ or $(R^a{}_2J)_2$, where J is C, Si, or Ge, and each $R^a$ is, independently, hydrogen, halogen, $C_1$ to $C_{20}$ hydrocarbyl (such as methyl, ethyl, propyl, butyl, pentyl, hexyl, heptyl, octyl, nonyl, decyl, undecyl, or dodecyl) or a $C_1$ to $C_{20}$ substituted hydrocarbyl, and two $R^a$ can form a cyclic structure including aromatic, partially saturated, or saturated cyclic or fused ring system. Preferably, T is a bridging group comprising carbon or silica, such as dialkylsilyl, preferably T is selected from $CH_2$, $CH_2CH_2$, $C(CH_3)_2$, $SiMe_2$, $SiPh_2$, SiMePh, silylcyclobutyl ($Si(CH_2)_3$), $(Ph)_2C$, $(p$-$(Et)_3SiPh)_2C$, $Me_2SiOSiMe_2$, and cyclopentasilylene ($Si(CH_2)_4$).

In a preferred embodiment of the invention, the molar ratio of rac to meso in the catalyst compound is from 1:1 to 100:1, preferably 5:1 to 90:1, preferably 7:1 to 80:1, preferably 5:1 or greater, or 7:1 or greater, or 20:1 or greater, or 30:1 or greater, or 50:1 or greater. In an embodiment of the invention, the catalyst comprises greater than 55 mol % of the racemic isomer, or greater than 60 mol % of the racemic isomer, or greater than 65 mol % of the racemic isomer, or greater than 70 mol % of the racemic isomer, or greater than 75 mol % of the racemic isomer, or greater than 80 mol % of the racemic isomer, or greater than 85 mol % of the racemic isomer, or greater than 90 mol % of the racemic isomer, or greater than 92 mol % of the racemic isomer, or greater than 95 mol % of the racemic isomer, or greater than 97 mol % of the racemic isomer, based on the total amount of the racemic and meso isomer, if any, formed. In a particular embodiment of the invention, the metallocene transition metal compound formed consists essentially of the racemic isomer.

Amounts of rac and meso isomers are determined by proton NMR. $^1$H NMR data are collected at 23° C. in a 5 mm probe using a 400 MHz Bruker spectrometer with deuterated methylene chloride. (Note that some of the examples herein may use deuterated benzene, but for purposes of the claims, methylene chloride shall be used.) Data is recorded using a maximum pulse width of 45°, 5 seconds between pulses and signal averaging 16 transients. The spectrum is normalized to protonated methylene chloride in the deuterated methylene chloride, which is expected to show a peak at 5.32 ppm.

Catalyst compounds that are particularly useful in this invention include one or more of: rac/meso $Me_2Si(Me_3SiCH_2Cp)_2HfMe_2$; $racMe_2Si(Me_3SiCH_2Cp)_2HfMe_2$; rac/meso $Ph_2Si(Me_3SiCH_2Cp)_2HfMe_2$; $Me_2Si(Me_4Cp)(Me_3SiCH_2Cp)HfMe_2$; $Ph_2Si(Me_4Cp)(Me_3SiCH_2Cp)HfMe_2$; rac/meso $Me_2Si(Me_3SiCH_2Cp)_2ZrMe_2$; $Me_2Si(Me_4Cp)(Me_3SiCH_2Cp)ZrMe_2$; $Ph_2Si(Me_4Cp)(Me_3SiCH_2Cp)ZrMe_2$; rac/meso $(CH_2)_3Si(Me_3SiCH_2Cp)_2HfMe_2$; rac/meso $(CH_2)_4Si(Me_3SiCH_2Cp)_2HfMe_2$; rac/meso $(C_6F_5)_2Si(Me_3SiCH_2Cp)_2HfMe_2$; rac/meso $(CH_2)_3Si(Me_3SiCH_2Cp)_2ZrMe_2$; rac/meso $(CH_2)_4Si(Me_3SiCH_2Cp)_2ZrMe_2$; rac/meso $(C_6F_5)_2Si(Me_3SiCH_2Cp)_2ZrMe_2$; $(CH_2)_4Si(Me_4Cp)(Me_3SiCH_2Cp)HfMe_2$; $(CH_2)_4Si(Me_4Cp)(Me_3SiCH_2Cp)ZrMe_2$; $(CH_2)_3Si(Me_4Cp)(Me_3SiCH_2Cp)HfMe_2$; $(CH_2)_3Si(Me_4Cp)(Me_3SiCH_2Cp)ZrMe_2$; $(C_6F_5)_2Si(Me_4Cp)(Me_3SiCH_2Cp)HfMe_2$; $(C_6F_5)_2Si(Me_4Cp)(Me_3SiCH_2Cp)ZrMe_2$; rac/meso $Me_2Ge(Me_3SiCH_2Cp)_2HfMe_2$; rac/meso $Me_2Si(Me_2PhSiCH_2Cp)_2HfMe_2$; rac/ meso Ph₂Si(Me₂PhSiCH₂Cp)₂HfMe₂; Me₂Si(Me₄Cp)(Me₂PhSiCH₂Cp)HfMe₂; Ph₂Si(Me₄Cp)(Me₂PhSiCH₂Cp)HfMe₂; rac/meso Me₂Si(Me₂PhSiCH₂Cp)₂ZrMe₂; Me₂Si(Me₄Cp)(Me₂PhSiCH₂Cp)ZrMe₂; Ph₂Si(Me₄Cp)(Me₂PhSiCH₂Cp)ZrMe₂; rac/meso (CH₂)₃Si(Me₂PhSiCH₂Cp)₂HfMe₂; rac/meso (CH₂)₄Si(Me₂PhSiCH₂Cp)₂HfMe₂; rac/meso (C₆F₅)₂Si(Me₂PhSiCH₂Cp)₂HfMe₂; rac/meso (CH₂)₃Si(Me₂PhSiCH₂Cp)₂ZrMe₂; rac/meso (CH₂)₄Si(Me₂PhSiCH₂Cp)₂ZrMe₂; rac/meso (C₆F₅)₂Si(Me₂PhSiCH₂Cp)₂ZrMe₂; (CH₂)₄Si(Me₄Cp)(Me₂PhSiCH₂Cp)HfMe₂; (CH₂)₄Si(Me₄Cp)(Me₂PhSiCH₂Cp)ZrMe₂; (CH₂)₃Si(Me₄Cp)(Me₂PhSiCH₂Cp)HfMe₂; (CH₂)₃Si(Me₄Cp)(Me₂PhSiCH₂Cp)ZrMe₂; (C₆F₅)₂Si(Me₄Cp)(Me₂PhSiCH₂Cp)HfMe₂; (C₆F₅)₂Si(Me₄Cp)(Me₂PhSiCH₂Cp)ZrMe₂; rac/meso Me₂Ge(Me₂PhSiCH₂Cp)₂HfMe₂; rac/meso Me₂Si(MePh₂SiCH₂Cp)₂HfMe₂; rac/meso Ph₂Si(MePh₂SiCH₂Cp)₂HfMe₂; Me₂Si(Me₄Cp)(MePh₂SiCH₂Cp)HfMe₂; Ph₂Si(Me₄Cp)(MePh₂SiCH₂Cp)HfMe₂; rac/meso Me₂Si(MePh₂SiCH₂Cp)₂ZrMe₂; Me₂Si(Me₄Cp)(MePh₂SiCH₂Cp)ZrMe₂; Ph₂Si(Me₄Cp)(MePh₂SiCH₂Cp)ZrMe₂; rac/meso (CH₂)₃Si(MePh₂SiCH₂Cp)₂HfMe₂; rac/meso (CH₂)₄Si(MePh₂SiCH₂Cp)₂HfMe₂; rac/meso (C₆F₅)₂Si(MePh₂SiCH₂Cp)₂HfMe₂; rac/meso (CH₂)₃Si(MePh₂SiCH₂Cp)₂ZrMe₂; rac/meso (CH₂)₄Si(MePh₂SiCH₂Cp)₂ZrMe₂; rac/meso (C₆F₅)₂Si(MePh₂SiCH₂Cp)₂ZrMe₂; (CH₂)₄Si(Me₄Cp)(MePh₂SiCH₂Cp)HfMe₂; (CH₂)₄Si(Me₄Cp)(MePh₂SiCH₂Cp)ZrMe₂; (CH₂)₃Si(Me₄Cp)(MePh₂SiCH₂Cp)HfMe₂; (CH₂)₃Si(Me₄Cp)(MePh₂SiCH₂Cp)ZrMe₂; (C₆F₅)₂Si(Me₄Cp)(MePh₂SiCH₂Cp)HfMe₂; (C₆F₅)₂Si(Me₄Cp)(MePh₂SiCH₂Cp)ZrMe₂; rac/meso Me₂Ge(MePh₂SiCH₂Cp)₂HfMe₂; rac/meso Me₂Si(Ph₃SiCH₂Cp)₂HfMe₂; rac/meso Ph₂Si(Ph₃SiCH₂Cp)₂HfMe₂; Me₂Si(Me₄Cp)(Ph₃SiCH₂Cp)HfMe₂; Ph₂Si(Me₄Cp)(Ph₃SiCH₂Cp)HfMe₂; rac/meso Me₂Si(Ph₃SiCH₂Cp)₂ZrMe₂; Me₂Si(Me₄Cp)(Ph₃SiCH₂Cp)ZrMe₂; Ph₂Si(Me₄Cp)(Ph₃SiCH₂Cp)ZrMe₂; rac/meso (CH₂)₃Si(Ph₃SiCH₂Cp)₂HfMe₂; rac/meso (CH₂)₄Si(Ph₃SiCH₂Cp)₂HfMe₂; rac/meso (C₆F₅)₂Si(Ph₃SiCH₂Cp)₂HfMe₂; rac/meso (CH₂)₃Si(Ph₃SiCH₂Cp)₂ZrMe₂; rac/meso (CH₂)₄Si(Ph₃SiCH₂Cp)₂ZrMe₂; rac/meso (C₆F₅)₂Si(Ph₃SiCH₂Cp)₂ZrMe₂; (CH₂)₄Si(Me₄Cp)(Ph₃SiCH₂Cp)HfMe₂; (CH₂)₄Si(Me₄Cp)(Ph₃SiCH₂Cp)ZrMe₂; (CH₂)₃Si(Me₄Cp)(Ph₃SiCH₂Cp)HfMe₂; (CH₂)₃Si(Me₄Cp)(Ph₃SiCH₂Cp)ZrMe₂; (C₆F₅)₂Si(Me₄Cp)(Ph₃SiCH₂Cp)HfMe₂; (C₆F₅)₂Si(Me₄Cp)(Ph₃SiCH₂Cp)ZrMe₂; rac/meso Me₂Ge(Ph₃SiCH₂Cp)₂HfMe₂; rac/meso Me₂Si(Cy₃SiCH₂Cp)₂HfMe₂; racMe₂Si(Cy₃SiCH₂Cp)₂HfMe₂; rac/meso Ph₂Si(Cy₃SiCH₂Cp)₂HfMe₂; Me₂Si(Me₄Cp)(Cy₃SiCH₂Cp)HfMe₂; Ph₂Si(Me₄Cp)(Cy₃SiCH₂Cp)HfMe₂; rac/meso Me₂Si(Cy₃SiCH₂Cp)₂ZrMe₂; Me₂Si(Me₄Cp)(Cy₃SiCH₂Cp)ZrMe₂; Ph₂Si(Me₄Cp)(Cy₃SiCH₂Cp)ZrMe₂; rac/meso (CH₂)₃Si(Cy₃SiCH₂Cp)₂HfMe₂; rac/meso (CH₂)₄Si(Cy₃SiCH₂Cp)₂HfMe₂; rac/meso (C₆F₅)₂Si(Cy₃SiCH₂Cp)₂HfMe₂; rac/meso (CH₂)₃Si(Cy₃SiCH₂Cp)₂ZrMe₂; rac/meso (CH₂)₄Si(Cy₃SiCH₂Cp)₂ZrMe₂; rac/meso (C₆F₅)₂Si(Cy₃SiCH₂Cp)₂ZrMe₂; (CH₂)₄Si(Me₄Cp)(Cy₃SiCH₂Cp)HfMe₂; (CH₂)₄Si(Me₄Cp)(Cy₃SiCH₂Cp)ZrMe₂; (CH₂)₃Si(Me₄Cp)(Cy₃SiCH₂Cp)HfMe₂; (CH₂)₃Si(Me₄Cp)(Cy₃SiCH₂Cp)ZrMe₂; (C₆F₅)₂Si(Me₄Cp)(Cy₃SiCH₂Cp)HfMe₂; (C₆F₅)₂Si(Me₄Cp)(Cy₃SiCH₂Cp)ZrMe₂; rac/meso Me₂Ge(Cy₃SiCH₂Cp)₂HfMe₂; rac/meso Me₂Si(Cy₂MeSiCH₂Cp)₂HfMe₂; rac/meso Ph₂Si(Cy₂MeSiCH₂Cp)₂HfMe₂; Me₂Si(Me₄Cp)(Cy₂MeSiCH₂Cp)HfMe₂; Ph₂Si(Me₄Cp)(Cy₂MeSiCH₂Cp)HfMe₂; rac/meso Me₂Si(Cy₂MeSiCH₂Cp)₂ZrMe₂; Me₂Si(Me₄Cp)(Cy₂MeSiCH₂Cp)ZrMe₂; Ph₂Si(Me₄Cp)(Cy₂MeSiCH₂Cp)ZrMe₂; rac/meso (CH₂)₃Si(Cy₂MeSiCH₂Cp)₂HfMe₂; rac/meso (CH₂)₄Si(Cy₂MeSiCH₂Cp)₂HfMe₂; rac/meso (C₆F₅)₂Si(Cy₂MeSiCH₂Cp)₂HfMe₂; rac/meso (CH₂)₃Si(Cy₂MeSiCH₂Cp)₂ZrMe₂; rac/meso (CH₂)₄Si(Cy₂MeSiCH₂Cp)₂ZrMe₂; rac/meso (C₆F₅)₂Si(Cy₂MeSiCH₂Cp)₂ZrMe₂; (CH₂)₄Si(Me₄Cp)(Cy₂MeSiCH₂Cp)HfMe₂; (CH₂)₄Si(Me₄Cp)(Cy₂MeSiCH₂Cp)ZrMe₂; (CH₂)₃Si(Me₄Cp)(Cy₂MeSiCH₂Cp)HfMe₂; (CH₂)₃Si(Me₄Cp)(Cy₂MeSiCH₂Cp)ZrMe₂; (C₆F₅)₂Si(Me₄Cp)(Cy₂MeSiCH₂Cp)HfMe₂; (C₆F₅)₂Si(Me₄Cp)(Cy₂MeSiCH₂Cp)ZrMe₂; rac/meso Me₂Ge(Cy₂MeSiCH₂Cp)₂HfMe₂; rac/meso Me₂Si(CyMe₂SiCH₂Cp)₂HfMe₂; rac/meso Ph₂Si(CyMe₂SiCH₂Cp)₂HfMe₂; Me₂Si(Me₄Cp)(CyMe₂SiCH₂Cp)HfMe₂; Ph₂Si(Me₄Cp)(CyMe₂SiCH₂Cp)HfMe₂; rac/meso Me₂Si(CyMe₂SiCH₂Cp)₂ZrMe₂; Me₂Si(Me₄Cp)(CyMe₂SiCH₂Cp)ZrMe₂; Ph₂Si(Me₄Cp)(CyMe₂SiCH₂Cp)ZrMe₂; rac/meso (CH₂)₃Si(CyMe₂SiCH₂Cp)₂HfMe₂; rac/meso (CH₂)₄Si(CyMe₂SiCH₂Cp)₂HfMe₂; rac/meso (C₆F₅)₂Si(CyMe₂SiCH₂Cp)₂HfMe₂; rac/meso (CH₂)₃Si(CyMe₂SiCH₂Cp)₂ZrMe₂; rac/meso (CH₂)₄Si(CyMe₂SiCH₂Cp)₂ZrMe₂; rac/meso (C₆F₅)₂Si(CyMe₂SiCH₂Cp)₂ZrMe₂; (CH₂)₄Si(Me₄Cp)(CyMe₂SiCH₂Cp)HfMe₂; (CH₂)₄Si(Me₄Cp)(CyMe₂SiCH₂Cp)ZrMe₂; (CH₂)₃Si(Me₄Cp)(CyMe₂SiCH₂Cp)HfMe₂; (CH₂)₃Si(Me₄Cp)(CyMe₂SiCH₂Cp)ZrMe₂; (C₆F₅)₂Si(Me₄Cp)(CyMe₂SiCH₂Cp)HfMe₂; (C₆F₅)₂Si(Me₄Cp)(CyMe₂SiCH₂Cp)ZrMe₂; rac/meso Me₂Ge(CyMe₂SiCH₂Cp)₂HfMe₂; rac/meso Me₂Si(Cy₂PhSiCH₂Cp)₂HfMe₂; rac/meso Ph₂Si(Cy₂PhSiCH₂Cp)₂HfMe₂; Me₂Si(Me₄Cp)(Cy₂PhSiCH₂Cp)HfMe₂; Ph₂Si(Me₄Cp)(Cy₂PhSiCH₂Cp)HfMe₂; rac/meso Me₂Si(Cy₂PhSiCH₂Cp)₂ZrMe₂; Me₂Si(Me₄Cp)(Cy₂PhSiCH₂Cp)ZrMe₂; Ph₂Si(Me₄Cp)(Cy₂PhSiCH₂Cp)ZrMe₂; rac/meso (CH₂)₃Si(Cy₂PhSiCH₂Cp)₂HfMe₂; rac/meso (CH₂)₄Si(Cy₂PhSiCH₂Cp)₂HfMe₂; rac/meso (C₆F₅)₂Si(Cy₂PhSiCH₂Cp)₂HfMe₂; rac/meso (CH₂)₃Si(Cy₂PhSiCH₂Cp)₂ZrMe₂; rac/meso (CH₂)₄Si(Cy₂PhSiCH₂Cp)₂ZrMe₂; rac/meso (C₆F₅)₂Si(Cy₂PhSiCH₂Cp)₂ZrMe₂; (CH₂)₄Si(Me₄Cp)(Cy₂PhSiCH₂Cp)HfMe₂; (CH₂)₄Si(Me₄Cp)(Cy₂PhSiCH₂Cp)ZrMe₂; (CH₂)₃Si(Me₄Cp)(Cy₂PhSiCH₂Cp)HfMe₂; (CH₂)₃Si(Me₄Cp)(Cy₂PhSiCH₂Cp)ZrMe₂; (C₆F₅)₂Si(Me₄Cp)(Cy₂PhSiCH₂Cp)HfMe₂; (C₆F₅)₂Si(Me₄Cp)(Cy₂PhSiCH₂Cp)ZrMe₂; rac/meso Me₂Ge(Cy₂PhSiCH₂Cp)₂HfMe₂; rac/meso Me₂Si(CyPh₂SiCH₂Cp)₂HfMe₂; rac/meso Ph₂Si(CyPh₂SiCH₂Cp)₂HfMe₂; Me₂Si(Me₄Cp)(CyPh₂SiCH₂Cp)HfMe₂; Ph₂Si(Me₄Cp)(CyPh₂SiCH₂Cp)HfMe₂; rac/meso Me₂Si(CyPh₂SiCH₂Cp)₂ZrMe₂; Me₂Si(Me₄Cp)(CyPh₂SiCH₂Cp)ZrMe₂; Ph₂Si(Me₄Cp)(CyPh₂SiCH₂Cp)ZrMe₂; rac/meso (CH₂)₃Si(CyPh₂SiCH₂Cp)₂HfMe₂; rac/meso (CH₂)₄Si(CyPh₂SiCH₂Cp)₂HfMe₂; rac/meso (C₆F₅)₂Si(CyPh₂SiCH₂Cp)₂HfMe₂; rac/meso (CH₂)₃Si(CyPh₂SiCH₂Cp)₂ZrMe₂; rac/meso (CH₂)₄Si (CyPh$_2$SiCH$_2$Cp)$_2$ZrMe$_2$; rac/meso (C$_6$F$_5$)$_2$Si
(CyPh$_2$SiCH$_2$Cp)$_2$ZrMe$_2$; (CH$_2$)$_4$Si(Me$_4$Cp)
(CyPh$_2$SiCH$_2$Cp)HfMe$_2$; (CH$_2$)$_4$Si(Me$_4$Cp)
(CyPh$_2$SiCH$_2$Cp)ZrMe$_2$; (CH$_2$)$_3$Si(Me$_4$Cp)
(CyPh$_2$SiCH$_2$Cp)HfMe$_2$; (CH$_2$)$_3$Si(Me$_4$Cp)
(CyPh$_2$SiCH$_2$Cp)ZrMe$_2$; (C$_6$F$_5$)$_2$Si(Me$_4$Cp)
(CyPh$_2$SiCH$_2$Cp)HfMe$_2$; (C$_6$F$_5$)$_2$Si(Me$_4$Cp)
(CyPh$_2$SiCH$_2$Cp)ZrMe$_2$, and rac/meso Me$_2$Ge(CyPh$_2$SiCH$_2$Cp)$_2$HfMe$_2$.

In a preferred embodiment in any of the processes described herein, one catalyst compound is used, e.g., the catalyst compounds are not different. For purposes of this invention, one catalyst compound is considered different from another if they differ by at least one atom. For example, "bisindenyl zirconium dichloride" is different from "(indenyl)(2-methylindenyl) zirconium dichloride" which is different from "(indenyl)(2-methylindenyl) hafnium dichloride." Catalyst compounds that differ only by isomer are considered the same for purposes if this invention, e.g., rac-dimethylsilylbis(2-methyl 4-phenylindenyl)hafnium dimethyl is considered to be the same as meso-dimethylsilylbis(2-methyl 4-phenylindenyl)hafnium dimethyl.

Methods to Prepare the Catalyst Compounds

The catalyst compounds described herein, may generally be prepared as illustrated in the following scheme 1 showing a general synthetic route for ansa (bridged) cyclopentadienyl ligands (where R'=Me, Ph):

precursor compound. Furthermore, peak assignments and integral values support the formation of (Me$_3$Si)CH$_2$CpLi.

C$_2$ Symmetric Ansa Ligands Synthesis

Salt elimination reaction between Me$_2$SiCl$_2$ and two equivalents of (Me$_3$Si)CH$_2$CpLi afforded a pale yellow oil of Me$_2$Si((Me$_3$Si) CH$_2$CpH)$_2$ in nearly quantitative yield. This reaction was reproducible in multigram scale. The $^1$H NMR assignments for this compound confirm the successful installation of Me$_2$Si— bridge. For instance, characteristic Me$_2$Si— and Me$_3$Si-protons each appeared as a single resonance at −0.15 and 0.05 ppm, respectively, diastereotopic methylene protons resonated as multiplets in the range of 1.81-1.87 ppm, Cp-CH protons which are directly connected to bridging Me$_2$Si— displayed as two separate singlets at 3.26 and 3.37 ppm, and all other Cp-CH protons ascribed as multiplets between 5.99 and 6.82 ppm. The corresponding Me$_2$Ge((Me$_3$Si) CH$_2$CpH)$_2$ compound was synthesized using similar synthetic protocols as described above for Me$_2$Si((Me$_3$Si) CH$_2$CpH)$_2$ compound (Scheme 1). $^1$H NMR spectrum of germyl version is identical to that of corresponding silyl version, but Me$_2$Ge— protons (δ=−0.01 ppm) are slightly downfield shifted as compared to Me$_2$Si— protons (δ=−0.15 ppm).

In the case of Ph$_2$Si((Me$_3$Si) CH$_2$CpH)$_2$, direct salt metathesis produced a mono substituted compound of Ph$_2$Si((Me$_3$Si) CH$_2$CpH)C$_1$, even in harsh reaction conditions, because of enhanced Lewis acidic character of diphenyl

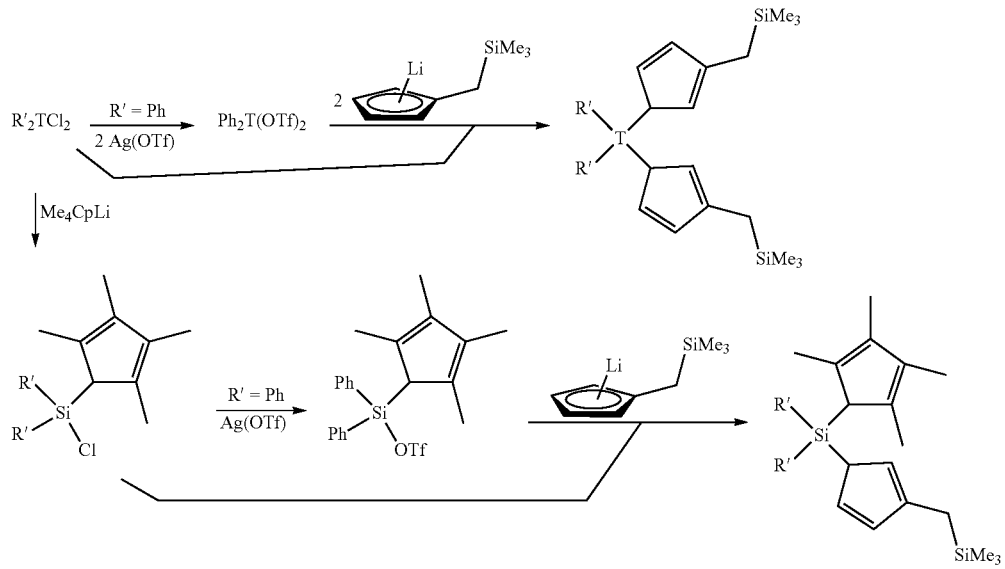

Synthesis of Ansa (Bridged) Ligands and their Precursor Compounds

Cyclopentadienyl ligand precursor of (trimethylsilyl)methylcyclopentadienyl, (Me$_3$Si)CH$_2$CpH, has been quantitatively prepared by treatment of (trimethylsilyl)methyl trifluoromethanesulfonate with potassium cyclopentadienide in diethyl ether at room temperature. Characteristic Me$_3$Si— protons appeared as a single resonance at −0.05 ppm, whereas methylene protons resonate as a doublet at 1.77 ppm in $^1$H NMR spectrum. Deprotonation of (Me$_3$Si)CH$_2$CpH with two equivalents of n-butyl lithium in diethyl ether led to the formation of the corresponding lithium salt of (Me$_3$Si)CH$_2$CpLi as an off-white solid in 84.6% yield. The absence of a resonance at around 3.0 ppm in $^1$H NMR spectrum suggests that the complete deprotonation of parent substitution at silicon center as compared with electron rich alkyl substitutions. Thereafter two strongly bound chlorides at silicon atom replaced by relatively easy leaving group of trifluoromethanesulfonate (—OTf) anion were used. In this connection, Ph$_2$Si(OTf)$_2$ was synthesized by treatment of Ph$_2$SiCl2 with two equivalents of silver trifluoromethanesulfonate at room temperature in dark conditions. The reaction between Ph$_2$Si(OTf)$_2$ and two equivalents of (Me$_3$Si)CH$_2$CpLi produced a pale yellow oil of desired compound, Ph$_2$Si((Me$_3$Si) CH$_2$CpH)$_2$, in quantitative yield (Scheme 1). $^1$H NMR of this compound further supports the chemical formulation and structural assignments in solution.

C$_1$ Symmetric Ansa Ligand Synthesis

Asymmetric or C$_1$ symmetric silyl-bridged cyclopentadienyl ligand of Me$_2$Si(Me$_4$CpH)(Me$_3$SiCH$_2$CpH) was synthesized in two step synthetic protocols. The first monosubstituted Me$_2$Si(Me$_4$CpH)C$_1$ was prepared by salt metathesis route between Me$_2$SiCl$_2$ and Me$_4$Cp-Li at room temperature, and then consecutive ligand substitution reaction with (Me$_3$Si)CH$_2$CpLi afforded a thick pale yellow oil of Me$_2$Si (Me$_4$CpH)(Me$_3$SiCH$_2$CpH) in moderate yield. The corresponding diphenyl version of Ph$_2$Si(Me$_4$CpH) (Me$_3$SiCH$_2$CpH) was synthesized in three step procedure. The monosubstitution of Ph$_2$Si(Me$_4$CpH)Cl was achieved under milder reaction conditions. As was seen for previous C$_2$-symmetric Ph$_2$Si((Me$_3$Si) CH$_2$CpH)$_2$ ligand synthesis, Ph$_2$Si(Me$_4$CpH)Cl was first converted to Ph$_2$Si(Me$_4$CpH) (OTf) and then substituted with (Me$_3$Si)CH$_2$CpLi to form a thick yellow oil of Ph$_2$Si(Me$_4$CpH)(Me$_3$SiCH$_2$CpH) in quantitative yield (Scheme 1). The $^1$H NMR spectrum of this compound is consistent with their structural assignments. Both C$_1$ and C$_2$ symmetric ligands synthesized above are conveniently deprotonated with n-butyl lithium at −25° C., and all the corresponding lithium salts were thoroughly characterized by $^1$H NMR spectroscopy. Absence of two cyclopentadienyl protons at 3.2-3.6 ppm range further support the compounds formation.

Synthesis of C$_1$ and C$_2$ Bridged Metallocenes

A salt metathesis route was adopted to synthesis hafnocene and zirconocene dichloride derivatives. The corresponding dimethyl metallocenes (A-I) were synthesized using stoichiometric amount of MeMgBr solution at −25° C. or milder conditions. The last two steps of catalyst compounds synthesis follow similar synthetic procedures unless otherwise noted, therefore one representative example (Catalyst compound A) is described in detail. Salt elimination reaction between lithium salt of Me$_2$Si((Me$_3$Si) CH$_2$Cp)$_2$ Li$_2$ and HfCl$_4$ under milder reaction conditions resulted to form a pale yellow crystalline solid of a rac-meso-Me$_2$Si((Me$_3$Si)CH$_2$Cp)$_2$HfCl$_2$ compound in nearly quantitative yield. $^1$H NMR spectrum of this compound integrates for 1:1 ratio of meso and rac isomers. The corresponding dimethyl hafnocene, Me$_2$Si((Me$_3$Si) CH$_2$Cp)$_2$ HfMe$_2$, was synthesized by direct methyl substitution with methylmagnesium bromide under milder reaction conditions. The reaction completion is confirmed by appearance of dimethyl resonances with appropriate intensities as compared to all other proton resonances in $^1$H NMR spectrum. Similar to Me$_2$Si((Me$_3$Si)CH$_2$Cp)$_2$HfCl$_2$, Me$_2$Si ((Me$_3$Si)CH$_2$Cp)$_2$HfMe$_2$ exhibits 1:1 ratio of meso and rac isomers. For example, characteristic HfMe$_2$ for rac isomer shows a single resonance at δ=−0.24 ppm, whereas meso isomer exhibits two resonances with equal intensity at δ=−0.24 and −0.20 ppm, respectively (check experimental section for complete assignments). Catalyst compound B is separated from A by fractional recrystallization techniques in hexane at −25° C.

A general synthetic route for silyl-bridged metallocenes (where M=Hf, Zr; T=Ge, Si; R'=Me, Ph; R$_2$=Me$_3$SiCH$_2$, Me; R$_1$=R$_3$=R$_4$=Me) is illustrated in the scheme below:

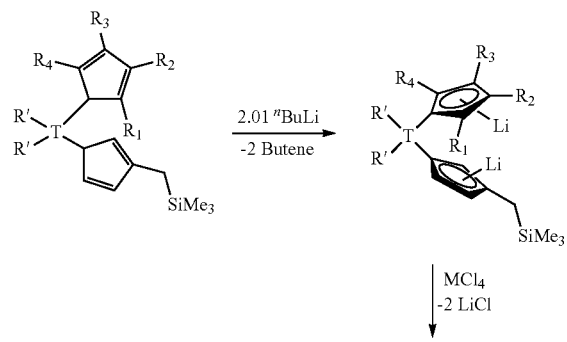

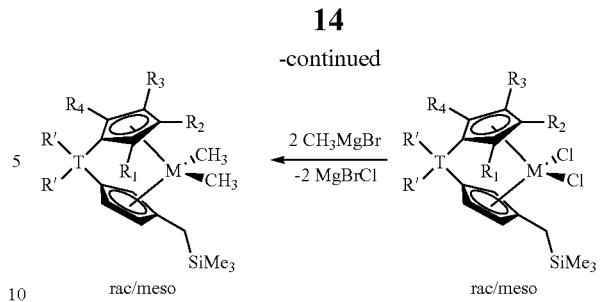

Activators

The catalyst systems described herein typically comprises a catalyst complex as described above and an activator such as alumoxane or a non-coordinating anion and may be formed by combining the catalyst components described herein with activators in any manner known from the literature including combining them with supports, such as silica. The catalyst systems may also be added to or generated in solution polymerization or bulk polymerization (in the monomer). Catalyst systems of the present disclosure may have one or more activators and one, two or more catalyst components. Activators are defined to be any compound which can activate any one of the catalyst compounds described above by converting the neutral metal compound to a catalytically active metal compound cation. Non-limiting activators, for example, include alumoxanes, aluminum alkyls, ionizing activators, which may be neutral or ionic, and conventional-type cocatalysts. Preferred activators typically include alumoxane compounds, modified alumoxane compounds, and ionizing anion precursor compounds that abstract a reactive, σ-bound, metal ligand making the metal compound cationic and providing a charge-balancing non-coordinating or weakly coordinating anion, e.g., a non-coordinating anion.

Alumoxane Activators

Alumoxane activators are utilized as activators in the catalyst systems described herein. Alumoxanes are generally oligomeric compounds containing —Al(R$^1$)—O— subunits, where R$^1$ is an alkyl group. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the abstractable ligand is an alkyl, halide, alkoxide or amide. Mixtures of different alumoxanes and modified alumoxanes may also be used. It may be preferable to use a visually clear methylalumoxane. A cloudy or gelled alumoxane can be filtered to produce a clear solution or clear alumoxane can be decanted from the cloudy solution. A useful alumoxane is a modified methyl alumoxane (MMAO) cocatalyst type 3A (commercially available from Akzo Chemicals, Inc. under the trade name Modified Methylalumoxane type 3A, covered under patent number U.S. Pat. No. 5,041,584).

When the activator is an alumoxane (modified or unmodified), some embodiments select the maximum amount of activator typically at up to a 5000-fold molar excess Al/M over the catalyst compound (per metal catalytic site). The minimum activator-to-catalyst-compound is a 1:1 molar ratio. Alternate preferred ranges include from 1:1 to 500:1, alternately from 1:1 to 200:1, alternately from 1:1 to 100:1, or alternately from 1:1 to 50:1.

In an alternate embodiment, little or no alumoxane is used in the polymerization processes described herein. Preferably, alumoxane is present at zero mol %, alternately the alumoxane is present at a molar ratio of aluminum to catalyst compound transition metal less than 500:1, preferably less than 300:1, preferably less than 100:1, preferably less than 1:1.

Ionizing/Non Coordinating Anion Activators

The term "non-coordinating anion" (NCA) means an anion which either does not coordinate to a cation or which is only weakly coordinated to a cation thereby remaining sufficiently labile to be displaced by a neutral Lewis base. "Compatible" non-coordinating anions are those which are not degraded to neutrality when the initially formed complex decomposes. Further, the anion will not transfer an anionic substituent or fragment to the cation so as to cause it to form a neutral transition metal compound and a neutral by-product from the anion. Non-coordinating anions useful in accordance with this invention are those that are compatible, stabilize the transition metal cation in the sense of balancing its ionic charge at +1, and yet retain sufficient lability to permit displacement during polymerization. Ionizing activators useful herein typically comprise an NCA, particularly a compatible NCA. It is within the scope of this invention to use an ionizing activator, neutral or ionic. It is also within the scope of this invention to use neutral or ionic activators alone or in combination with alumoxane or modified alumoxane activators. For descriptions of useful activators please see U.S. Pat. Nos. 8,658,556 and 6,211,105.

Preferred activators include N,N-dimethylanilinium tetrakis(perfluoronaphthyl)borate, N,N-dimethylanilinium tetrakis(perfluorobiphenyl)borate, N,N-dimethylanilinium tetrakis(perfluorophenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, triphenylcarbenium tetrakis(perfluorophenyl)borate, [Me$_3$NH$^+$][B(C$_6$F$_5$)$_4^-$]; 1-(4-(tris(pentafluorophenyl)borate)-2,3,5,6-tetrafluorophenyl)pyrrolidinium; and 4-(tris(pentafluorophenyl)borate)-2,3,5,6-tetrafluoropyridine.

In a preferred embodiment, the activator comprises a triaryl carbonium (such as triphenylcarbenium tetraphenylborate, triphenylcarbenium tetrakis(pentafluorophenyl)borate, triphenylcarbenium tetrakis-(2,3,4,6-tetrafluorophenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate).

In another embodiment, the activator comprises one or more of trialkylammonium tetrakis(pentafluorophenyl)borate, N,N-dialkylanilinium tetrakis(pentafluorophenyl)borate, N,N-dimethyl-(2,4,6-trimethylanilinium) tetrakis(pentafluorophenyl)borate, trialkylammonium tetrakis-(2,3,4,6-tetrafluorophenyl) borate, N,N-dialkylanilinium tetrakis-(2,3,4,6-tetrafluorophenyl)borate, trialkylammonium tetrakis(perfluoronaphthyl)borate, N,N-dialkylanilinium tetrakis(perfluoronaphthyl)borate, trialkylammonium tetrakis(perfluorobiphenyl)borate, N,N-dialkylanilinium tetrakis(perfluorobiphenyl)borate, trialkylammonium tetrakis(3,5-bis(trifluoromethyl)phenyl)borate, N,N-dialkylanilinium tetrakis(3,5-bis(trifluoromethyl)phenyl)borate, N,N-dialkyl-(2,4,6-trimethylanilinium) tetrakis(3,5-bis(trifluoromethyl)phenyl)borate, di-(i-propyl)ammonium tetrakis(pentafluorophenyl)borate, (where alkyl is methyl, ethyl, propyl, n-butyl, sec-butyl, or t-butyl).

In another embodiment, the activator is one or more of N,N-dimethylanilinium tetrakis(pentafluorophenyl)aluminate, and N,N-dimethyl-(2,4,6-trimethylanilinium) tetrakis(perfluoronaphthyl)aluminate.

In an embodiment the, activator is represented by the formula:

$$(Z)_d^+(A^{d-}),$$

wherein Z is (L-H) or a reducible Lewis Acid, L is an neutral Lewis base; H is hydrogen; (L-H)$^+$ is a Bronsted acid; A$^{d-}$ is a non-coordinating anion having the charge d−; and d is an integer from 1 to 3, preferably Z is (Ar$_3$C$^+$), where Ar is aryl or aryl substituted with a heteroatom, a C$_1$ to C$_{40}$ hydrocarbyl, or a substituted C$_1$ to C$_{40}$ hydrocarbyl.

The typical activator-to-catalyst ratio, e.g., all NCA activators-to-catalyst ratio is about a 1:1 molar ratio. Alternate preferred ranges include from 0.1:1 to 100:1, alternately from 0.5:1 to 200:1, alternately from 1:1 to 500:1 alternately from 1:1 to 1000:1. A particularly useful range is from 0.5:1 to 10:1, preferably 1:1 to 5:1.

It is also within the scope of the present disclosure that the catalyst compounds can be combined with combinations of alumoxanes and NCA's (see for example, U.S. Pat. Nos. 5,153,157 and 5,453,410; EP 0 573 120 B1; and PCT Publication Nos. WO 94/07928 and WO 95/14044 (the disclosures of which are incorporated herein by reference in their entirety) which discuss the use of an alumoxane in combination with an ionizing activator).

Optional Scavengers or Co-Activators

In addition to these activator compounds, scavengers or co-activators may be used. Aluminum alkyl or organoaluminum compounds which may be utilized as scavengers or co-activators include, for example, trimethylaluminum, triethylaluminum, triisobutylaluminum, tri-n-hexylaluminum, tri-n-octylaluminum, and diethyl zinc.

Optional Support Materials

In embodiments herein, the catalyst system may comprise an inert support material. Preferably, the supported material is a porous support material, for example, talc, and inorganic oxides. Other support materials include zeolites, clays, organoclays, or any other organic or inorganic support material and the like, or mixtures thereof.

Preferably, the support material is an inorganic oxide in a finely divided form. Suitable inorganic oxide materials for use in catalyst systems herein include Groups 2, 4, 13, and 14 metal oxides, such as silica, alumina, and mixtures thereof. Other inorganic oxides that may be employed either alone or in combination with the silica, or alumina are magnesia, titania, zirconia, and the like. Other suitable support materials, however, can be employed, for example, finely divided functionalized polyolefin, such as finely divided polyethylene. Particularly useful supports include magnesia, titania, zirconia, montmorillonite, phyllosilicate, zeolites, talc, clays, and the like. Also, combinations of these support materials may be used, for example, silica-chromium, silica-alumina, silica-titania, and the like. Preferred support materials include Al$_2$O$_3$, ZrO$_2$, SiO$_2$, and combinations thereof, more preferably SiO$_2$, Al$_2$O$_3$, or SiO$_2$/Al$_2$O$_3$.

It is preferred that the support material, most preferably an inorganic oxide, has a surface area in the range of from about 10 to about 700 m$^2$/g, pore volume in the range of from about 0.1 to about 4.0 cc/g and average particle size in the range of from about 5 to about 500 μm. More preferably, the surface area of the support material is in the range of from about 50 to about 500 m$^2$/g, pore volume of from about 0.5 to about 3.5 cc/g and average particle size of from about 10 to about 200 μm. Most preferably, the surface area of the support material is in the range of from about 100 to about 400 m$^2$/g, pore volume from about 0.8 to about 3.0 cc/g and average particle size is from about 5 to about 100 μm. The average pore size of the support material useful in the invention is in the range of from 10 to 1000 Å, preferably 50 to about 500 Å, and most preferably 75 to about 350 Å. In some embodiments, the support material is a high surface area, amorphous silica (surface area=300 m$^2$/gm; pore volume of 1.65 cm$^3$/gm). Preferred silicas are marketed under the trade names of DAVISON 952 or DAVISON 955 by the Davison Chemical Division of W.R. Grace and Company. In other embodiments DAVISON 948 is used.

In a particularly useful embodiment, the support material is fluorided. Fluoriding agent containing compounds may be any compound containing a fluorine atom. Particularly desirable are inorganic fluorine containing compounds are selected from the group consisting of $NH_4BF_4$, $(NH_4)_2SiF_6$, $NH_4PF_6$, $NH_4F$, $(NH_4)_2TaF_7$, $NH_4NbF_4$, $(NH_4)_2GeF_6$, $(NH_4)_2SmF_6$, $(NH_4)_2TiF_6$, $(NH_4)_2ZrF_6$, $MoF_6$, $ReF_6$, $GaF_3$, $SO_2ClF$, $F_2$, $SiF_4$, $SF_6$, $ClF_3$, $ClF_5$, $BrF_5$, $IF_7$, $NF_3$, $HF$, $BF_3$, $NHF_2$ and $NH_4HF_2$. Of these, ammonium hexafluorosilicate and ammonium tetrafluoroborate are useful. Combinations of these compounds may also be used.

Ammonium hexafluorosilicate and ammonium tetrafluoroborate fluorine compounds are typically solid particulates as are the silicon dioxide supports. A desirable method of treating the support with the fluorine compound is to dry mix the two components by simply blending at a concentration of from 0.01 to 10.0 millimoles F/g of support, desirably in the range of from 0.05 to 6.0 millimoles F/g of support, and most desirably in the range of from 0.1 to 3.0 millimoles F/g of support. The fluorine compound can be dry mixed with the support either before or after charging to a vessel for dehydration or calcining the support. Accordingly, the fluorine concentration present on the support is in the range of from 0.1 to 25 wt %, alternately from 0.19 to 19 wt %, alternately from 0.6 to 3.5 wt %, based upon the weight of the support.

The above catalyst components described herein are generally deposited on the support material at a loading level of 10-100 micromoles of metal per gram of solid support; alternately 20-80 micromoles of metal per gram of solid support; or 40-60 micromoles of metal per gram of support. But greater or lesser values may be used, and typically the total amount of solid catalyst complex does not exceed the support's pore volume.

The support material should be dry, that is, free of absorbed water. Drying of the support material can be effected by heating or calcining at about 100° C. to about 1000° C., preferably at least about 600° C. When the support material is silica, it is heated to at least 200° C., preferably about 200° C. to about 850° C., and most preferably at about 600° C.; and for a time of about 1 minute to about 100 hours, from about 12 hours to about 72 hours, or from about 24 hours to about 60 hours. The calcined support material must have at least some reactive hydroxyl (OH) groups to produce supported catalyst systems of this invention. The calcined support material is then contacted with at least one polymerization catalyst comprising at least one catalyst compound and an activator.

The support material, having reactive surface groups, typically hydroxyl groups, is slurried in a non-polar solvent and the resulting slurry is contacted with a solution of a catalyst compound and an activator. In some embodiments, the slurry of the support material is first contacted with the activator for a period of time in the range of from about 0.5 hours to about 24 hours, from about 2 hours to about 16 hours, or from about 4 hours to about 8 hours. The solution of the catalyst compound is then contacted with the isolated support/activator. In some embodiments, the supported catalyst system is generated in situ. In an alternate embodiment, the slurry of the support material is first contacted with the catalyst compound for a period of time in the range of from about 0.5 hours to about 24 hours, from about 2 hours to about 16 hours, or from about 4 hours to about 8 hours. The slurry of the supported catalyst compound is then contacted with the activator solution.

The mixture of the catalyst, activator and support is heated to about 0° C. to about 70° C., preferably to about 23° C. to about 60° C., or preferably at room temperature. Contact times typically range from about 0.5 hours to about 24 hours, from about 2 hours to about 16 hours, or from about 4 hours to about 8 hours.

Suitable non-polar solvents are materials in which all of the reactants used herein, i.e., the activator, and the catalyst compound, are at least partially soluble and which are liquid at reaction temperatures. Preferred non-polar solvents are alkanes, such as isopentane, hexane, n-heptane, octane, nonane, and decane, although a variety of other materials including cycloalkanes, such as cyclohexane, aromatics, such as benzene, toluene, and ethylbenzene, may also be employed.

Polymerization Processes

In embodiments herein, the invention relates to polymerization processes where monomer (such as propylene), and optionally comonomer, are contacted with a catalyst system comprising an activator and at least one catalyst compound, as described above. The catalyst compound and activator may be combined in any order, and are combined typically prior to contacting with the monomer.

Monomers useful herein include substituted or unsubstituted $C_2$ to $C_{40}$ alpha olefins, preferably $C_2$ to $C_{20}$ alpha olefins, preferably $C_2$ to $C_{12}$ alpha olefins, preferably ethylene, propylene, butene, pentene, hexene, heptene, octene, nonene, decene, undecene, dodecene and isomers thereof. In a preferred embodiment of the invention, the monomer comprises propylene and an optional comonomers comprising one or more ethylene or $C_4$ to $C_{40}$ olefins, preferably $C_4$ to $C_{20}$ olefins, or preferably $C_6$ to $C_{12}$ olefins. The $C_4$ to $C_{40}$ olefin monomers may be linear, branched, or cyclic. The $C_4$ to $C_{40}$ cyclic olefins may be strained or unstrained, monocyclic or polycyclic, and may optionally include heteroatoms and/or one or more functional groups. In another preferred embodiment, the monomer comprises ethylene and an optional comonomers comprising one or more $C_3$ to $C_{40}$ olefins, preferably $C_4$ to $C_{20}$ olefins, or preferably $C_6$ to $C_{12}$ olefins. The $C_3$ to $C_{40}$ olefin monomers may be linear, branched, or cyclic. The $C_3$ to $C_{40}$ cyclic olefins may be strained or unstrained, monocyclic or polycyclic, and may optionally include heteroatoms and/or one or more functional groups.

Exemplary $C_2$ to $C_{40}$ olefin monomers and optional comonomers include ethylene, propylene, butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof, preferably hexene, heptene, octene, nonene, decene, dodecene, cyclooctene, 1,5-cyclooctadiene, 1-hydroxy-4-cyclooctene, 1-acetoxy-4-cyclooctene, 5-methylcyclopentene, cyclopentene, dicyclopentadiene, norbornene, norbornadiene, and their respective homologs and derivatives, preferably norbornene, norbornadiene, and dicyclopentadiene.

In a preferred embodiment, one or more dienes are present in the polymerization produced herein at up to 10 wt %, preferably at 0.00001 to 1.0 wt %, preferably 0.002 to 0.5 wt %, even more preferably 0.003 to 0.2 wt %, based upon the total weight of the composition. In some embodiments, 500 ppm or less of diene is added to the polymerization, preferably 400 ppm or less, preferably or 300 ppm or less. In other embodiments, at least 50 ppm of diene is added to the polymerization, or 100 ppm or more, or 150 ppm or more.

Preferred diolefin monomers useful in this invention include any hydrocarbon structure, preferably $C_4$ to $C_{30}$, having at least two unsaturated bonds, wherein at least two of the unsaturated bonds are readily incorporated into a polymer by either a stereospecific or a non-stereospecific catalyst(s). It is further preferred that the diolefin monomers be selected from alpha, omega-diene monomers (i.e., di-vinyl monomers). More preferably, the diolefin monomers are linear di-vinyl monomers, most preferably those containing from 4 to 30 carbon atoms. Examples of preferred dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, particularly preferred dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (Mw less than 1000 g/mol). Preferred cyclic dienes include cyclopentadiene, vinylnorbornene, norbornadiene, ethylidene norbornene, divinylbenzene, dicyclopentadiene or higher ring containing diolefins with or without substituents at various ring positions.

Polymerization processes of this invention can be carried out in any manner known in the art. Any suspension, homogeneous, bulk, solution, slurry, or gas phase polymerization process known in the art can be used. Such processes can be run in a batch, semi-batch, or continuous mode.

A solution polymerization is a polymerization process in which the polymer is dissolved in a liquid polymerization medium, such as an inert solvent or monomer(s) or their blends. A solution polymerization is typically homogeneous. A homogeneous polymerization is one where the polymer product is dissolved in the polymerization medium. Such systems are preferably not turbid as described in J. Vladimir Oliveira, C. Dariva and J. C. Pinto, Ind. Eng. Chem. Res. 29, 2000, 4627. A homogeneous polymerization process is preferably a process where at least 90 wt % of the product is soluble in the reaction media. Solution polymerization processes and homogeneous polymerization processes are useful herein.

A bulk homogeneous polymerization process may also be used herein. A bulk polymerization is a polymerization process in which the monomers and/or comonomers being polymerized are used as a solvent or diluent using little or no inert solvent as a solvent or diluent. A small fraction of inert solvent might be used as a carrier for catalyst and scavenger. A bulk polymerization system contains less than 25 wt % of inert solvent or diluent, preferably less than 10 wt %, preferably less than 1 wt %, preferably 0 wt %. A bulk process is preferably a process where monomer concentration in all feeds to the reactor is 70 vol % or more. Alternately, no solvent or diluent is present or added in the reaction medium, (except for the small amounts used as the carrier for the catalyst system or other additives, or amounts typically found with the monomer; e.g., propane in propylene).

A slurry polymerization process may also be used. As used herein the term "slurry polymerization process" means a polymerization process where a supported catalyst is employed and monomers are polymerized on the supported catalyst particles. At least 95 wt % of polymer products derived from the supported catalyst are in granular form as solid particles (not dissolved in the diluent). A slurry polymerization process generally operates between 1 to about 50 atmosphere pressure range (15 psi to 735 psi, 103 kPa to 5068 kPa) or even greater and temperatures in the range of 0° C. to about 120° C. In a slurry polymerization, a suspension of solid, particulate polymer is formed in a liquid polymerization diluent medium to which monomer and comonomers, along with catalyst system as described herein, are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, preferably a branched alkane. The medium employed is typically liquid under the conditions of polymerization and relatively inert. When a propane medium is used, the process is often operated above the reaction diluent critical temperature and pressure. Preferably, a hexane or an isobutane medium is employed. Preferably, the olefins and catalyst system are contacted in a slurry loop reactor.

A gas polymerization process may also be used. As used herein the term "gas phase polymerization process" preferably means a polymerization process where a gaseous stream containing one or more monomers is continuously cycled through a fluidized bed in the presence of a catalyst system under reactive conditions. The gaseous stream is withdrawn from the fluidized bed and recycled back into the reactor. Simultaneously, polymer product is withdrawn from the reactor and fresh monomer is added to replace the polymerized monomer. (See, for example, U.S. Pat. Nos. 4,543,399; 4,588,790; 5,028,670; 5,317,036; 5,352,749; 5,405,922; 5,436,304; 5,453,471; 5,462,999; 5,616,661; and 5,668,228; all of which are fully incorporated herein by reference.)

Suitable diluents/solvents for polymerization include non-coordinating, inert liquids. Examples include straight and branched-chain hydrocarbons, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof, such as can be found commercially (Isopar™); perhalogenated hydrocarbons, such as perfluorinated $C_{4-10}$ alkanes, chlorobenzene, and aromatic and alkylsubstituted aromatic compounds, such as benzene, toluene, mesitylene, and xylene. Suitable solvents also include liquid olefins which may act as monomers or comonomers including ethylene, propylene, 1-butene, 1-hexene, 1-pentene, 3-methyl-1-pentene, 4-methyl-1-pentene, 1-octene, 1-decene, and mixtures thereof. In a preferred embodiment, aliphatic hydrocarbon solvents are used as the solvent, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof. In another embodiment, the solvent is not aromatic, preferably aromatics are present in the solvent at less than 1 wt %, preferably less than 0.5 wt %, preferably less than 0 wt % based upon the weight of the solvents.

In a preferred embodiment, the feed concentration of the monomers and comonomers for the polymerization is 60 vol % solvent or less, preferably 40 vol % or less, or preferably 20 vol % or less, based on the total volume of the feedstream. Preferably, the polymerization is run in a bulk process.

Preferred polymerizations can be run at any temperature and/or pressure suitable to obtain the desired ethylene polymers. Typical temperatures and/or pressures include a temperature in the range of from about 0° C. to about 300° C., preferably about 20° C. to about 200° C., preferably about 35° C. to about 150° C., preferably from about 40° C. to about 120° C., preferably from about 45° C. to about 80° C.; and at a pressure in the range of from about 0.35 MPa to about 10 MPa, preferably from about 0.45 MPa to about 6 MPa, or preferably from about 0.5 MPa to about 4 MPa.

In a typical polymerization, the run time of the reaction is up to 300 minutes, preferably in the range of from about 5 to 250 minutes, or preferably from about 10 to 120 minutes.

In some embodiments, hydrogen is present in the polymerization reactor at a partial pressure of 0.001 to 50 psig (0.007 to 345 kPa), preferably 0.01 to 25 psig (0.07 to 172 kPa), more preferably 0.1 to 10 psig (0.7 to 70 kPa).

In embodiments of the invention, the activity of the catalyst is at least 50 g/mmol/hour, preferably 500 or more g/mmol/hour, preferably 5000 or more g/mmol/hr, preferably 50,000 or more g/mmol/hr. In an alternate embodiment, the conversion of olefin monomer is at least 10%, based upon polymer yield and the weight of the monomer entering the reaction zone, preferably 20% or more, preferably 30% or more, preferably 50% or more, preferably 80% or more.

In a preferred embodiment, little or no alumoxane is used in the process to produce the polymers. Preferably, alumoxane is present at zero mol %, alternately the alumoxane is present at a molar ratio of aluminum to transition metal less than 500:1, preferably less than 300:1, preferably less than 100:1, preferably less than 1:1.

In a preferred embodiment, little or no scavenger is used in the process to produce the ethylene polymer. Preferably, scavenger (such as tri alkyl aluminum) is present at zero mol %, alternately the scavenger is present at a molar ratio of scavenger metal to transition metal of less than 100:1, preferably less than 50:1, preferably less than 15:1, preferably less than 10:1.

In a preferred embodiment, the polymerization: 1) is conducted at temperatures of 0° C. to 300° C. (preferably 25° C. to 150° C., preferably 40° C. to 120° C., preferably 45° C. to 80° C.); 2) is conducted at a pressure of atmospheric pressure to 10 MPa (preferably 0.35 to 10 MPa, preferably from 0.45 to 6 MPa, preferably from 0.5 to 4 MPa); 3) is conducted in an aliphatic hydrocarbon solvent (such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof; preferably aromatics are present in the solvent at less than 1 wt %, preferably less than 0.5 wt %, preferably at 0 wt % based upon the weight of the solvents); 4) wherein the catalyst system used in the polymerization may comprise less than 0.5 mol %, preferably 0 mol % alumoxane, alternately the alumoxane is present at a molar ratio of aluminum to transition metal less than 500:1, preferably less than 300:1, preferably less than 100:1, preferably less than 1:1; 5) the polymerization preferably occurs in one reaction zone; 6) the productivity of the catalyst compound is at least 80,000 g/mmol/hr (preferably at least 150,000 g/mmol/hr, preferably at least 200,000 g/mmol/hr, preferably at least 250,000 g/mmol/hr, preferably at least 300,000 g/mmol/hr); 7) optionally scavengers (such as tri-alkyl aluminum compounds) are absent (e.g., present at zero mol %, alternately the scavenger is present at a molar ratio of scavenger metal to transition metal of less than 100:1, preferably less than 50:1, preferably less than 15:1, preferably less than 10:1); and 8) optionally hydrogen is present in the polymerization reactor at a partial pressure of 0.001 to 50 psig (0.007 to 345 kPa) (preferably from 0.01 to 25 psig (0.07 to 172 kPa), more preferably 0.1 to 10 psig (0.7 to 70 kPa)). In a preferred embodiment, the catalyst system used in the polymerization comprises no more than one catalyst compound. A "reaction zone" also referred to as a "polymerization zone" is a vessel where polymerization takes place, for example a batch reactor. When multiple reactors are used in either series or parallel configuration, each reactor is considered as a separate polymerization zone. For a multi-stage polymerization in both a batch reactor and a continuous reactor, each polymerization stage is considered as a separate polymerization zone. In a preferred embodiment, the polymerization occurs in one reaction zone. Room temperature is 23° C. unless otherwise noted.

Other additives may also be used in the polymerization, as desired, such as one or more scavengers, promoters, modifiers, chain transfer agents (such as diethyl zinc), reducing agents, oxidizing agents, hydrogen, aluminum alkyls, or silanes.

Chain Transfer Agents

Chain transfer agents useful herein are typically alkylalumoxanes, a compound represented by the formula $AlR_3$, $ZnR_2$ (where each R is, independently, a $C_1$-$C_8$ aliphatic radical, preferably methyl, ethyl, propyl, butyl, pentyl, hexyl octyl or an isomer thereof) or a combination thereof, such as diethyl zinc, methylalumoxane, trimethylaluminum, triisobutylaluminum, trioctylaluminum, or a combination thereof.

Polyolefin Products

This invention also relates to compositions of matter produced by the methods described herein.

In a preferred embodiment, the process described herein produces ethylene homopolymers or ethylene copolymers, such as ethylene-alphaolefin (preferably $C_3$ to $C_{20}$) copolymers (such as ethylene-hexene copolymers or ethylene-octene copolymers) having: an Mw/Mn of greater than 1 to 6 (preferably greater than 1 to 3).

Likewise, the process of this invention produces olefin polymers, preferably polyethylene and polypropylene homopolymers and copolymers. In a preferred embodiment, the polymers produced herein are homopolymers of ethylene or propylene, are copolymers of ethylene preferably having from 0 to 25 mol % (alternately from 0.5 to 20 mol %, alternately from 1 to 15 mol %, preferably from 3 to 10 mol %) of one or more $C_3$ to $C_{20}$ olefin comonomer (preferably $C_3$ to $C_{12}$ alpha-olefin, preferably propylene, butene, hexene, octene, decene, dodecene, preferably propylene, butene, hexene, octene), or are copolymers of propylene preferably having from 0 to 25 mol % (alternately from 0.5 to 20 mol %, alternately from 1 to 15 mol %, preferably from 3 to 10 mol %) of one or more of $C_2$ or $C_4$ to $C_{20}$ olefin comonomer (preferably ethylene or $C_4$ to $C_{12}$ alpha-olefin, preferably ethylene, butene, hexene, octene, decene, dodecene, preferably ethylene, butene, hexene, octene).

In a preferred embodiment, the monomer is ethylene and the comonomer is hexene, preferably from 1 to 15 mol % hexene, alternately 1 to 10 mol %.

Typically, the polymers produced herein have an Mw of 5,000 to 1,000,000 g/mol (preferably 25,000 to 750,000 g/mol, preferably 50,000 to 500,000 g/mol), and/or an Mw/Mn of greater than 1 to 40 (alternately 1.2 to 20, alternately 1.3 to 10, alternately 1.4 to 5, 1.5 to 4, alternately 1.5 to 3).

In a preferred embodiment, the polymer produced herein has a unimodal or multimodal molecular weight distribution as determined by Gel Permeation Chromatography (GPC) as described in the Experimental section below. By "unimodal" is meant that the GPC trace has one peak or two or more inflection points. By "multimodal" is meant that the GPC trace has at least two peaks or more than 2 inflection points. An inflection point is that point where the second derivative of the curve changes in sign (e.g., from negative to positive or vice versa).

Polymers produced by the processes of this invention also have a g'(vis) of 0.945 or more (preferably 0.95 or more, preferably 0.96 or more, preferably 0.98 or more, preferably 0.99 or more, and, optionally, preferably less than or equal to 1.0).

Unless otherwise indicated Mw, Mn, MWD, and g'(vis) are determined by the GPC method described in the Experimental section below.

In a preferred embodiment, the polymer produced herein has a composition distribution breadth index (CDBI) of 50% or more, preferably 60% or more, preferably 70% or more. CDBI is a measure of the composition distribution of monomer within the polymer chains and is measured by the procedure described in PCT Publication No. WO 93/03093, published Feb. 18, 1993, specifically columns 7 and 8, as well as in Wild et al, J. Poly. Sci., Poly. Phys. Ed., Vol. 20, p. 441 (1982) and U.S. Pat. No. 5,008,204, including that fractions having a weight average molecular weight (Mw) below 15,000 are ignored when determining CDBI.

Polymers produced by the processes of this invention may also have a reverse commoner index (RCI,m) of 50 or less (such as 1 to 50), alternately 40 or less, alternately 30 or less, alternately 20 or less. RCI,m is determined according the GPC procedure described in the Experimental section below.

Polymers produced by the processes of this invention may also have an EXE triad content of at least 0.030, alternately at least 0.035, alternately at least 0.040, as determined by the $^{13}$C NMR procedure described in the Experimental section below, where E=ethylene and X=comonomer (such as $C_4$ to $C_{14}$ alpha olefin, particularly butene, hexene, octene, decene and/or dodecene).

Polymers produced by the processes of this invention may also have an XXX triad content of 0.005 or less, alternately 0.002 or less, alternately 0.001 or less, as determined by the $^{13}$C NMR procedure described in the Experimental section below, where X=comonomer (such as $C_4$ to $C_{14}$ alpha olefin, particularly butene, hexene, octene, decene and/or dodecene).

In a useful embodiment of the invention, polymers ethylene hexene copolymers produced by the processes of this invention have an EHE triad content of at least 0.030, alternately at least 0.035, alternately at least 0.040, and an HHH triad content of 0.005 or less, alternately 0.002 or less, alternately 0.001 or less, as determined by the $^{13}$C NMR procedure described in the Experimental section below, where E=ethylene and H=hexene.

Polymers produced by the processes of this invention may also have a density of 0.910 or more, preferably 0.910 to 0.94 g/cc, preferably 0.915 to 0.935 g/cc, preferably 0.915 to 0.930 g/cc. Density is determined measured as specified by ASTM D-1505 using chips cut from plaques compression molded in accordance with ASTM D-4703-07, aged in for 40 hrs at 23° C. plus or minus 2° C., unless specifically stated otherwise.

Polymers produced by the processes of this invention may also have a total unsaturation (also referred to as unsaturation content) content of 0.04 per 1000 C, preferably 0.08 per 1000 C, preferably 0.2 per 1000 C, as determined by $^1$H NMR as described in the Experimental section below.

Polymers produced by the processes of this invention may also have a terminal unsaturation content of between 0.2 and 0.04 unsaturations per 1000 C, preferably between 0.12 and 0.07 unsaturations per 1000 C, preferably as determined by $^1$H NMR as described in the Experimental section below.

Polymers produced by the processes of this invention may also have an internal unsaturation content of at least 0.7 per 1000 C, alternately between 0.7 and 0.35 per 1000 C, preferably between 0.8 and 0.25 per 1000 C, as determined by $^1$H NMR as described in the Experimental section below.

Polymers produced by the processes of this invention may also have ratio of internal unsaturation content to terminal unsaturation content of at least 1, alternately of 1 to 3, preferably 1 to 2.5, as determined by $^1$H NMR as described in the Experimental section below.

Terminal unsaturation is defined to be the sum of all vinyls, vinylidenes and Vy5 (see Table F) and is determined by $^1$H NMR as described in the Experimental section below.

Internal unsaturation is defined to be Vy1 and Vy2 and Trisubstituted (I) (see Table F) and is determined by $^1$H NMR as described in the Experimental section below.

Total unsaturation is defined to be the sum of the internal unsaturation and the terminal unsaturation and is determined by $^1$H NMR as described in the Experimental section below.

In a useful embodiment of the invention, polymers produced by the processes of this invention comprise ethylene and at least 2 mol % (alternately from 2 to 15 mol %, alternately from 3 to 12 mol %) of one or more $C_4$ to $C_{14}$ alpha olefin comonomers, where the polymer has an EXE triad content, as determined by $^{13}$CNMR, of at least 0.030, a XXX triad content, as determined by $^{13}$C NMR, of less than 0.0005, and an RCI,m of 50 or less. Preferably, the ethylene hexene copolymer also has a density of 0.910 to 0.930 g/cc and or a g'(vis) of 0.945 or more. Preferably, the ethylene hexene copolymer also has an unsaturation content of 0.1 to 0.4 and or an internal unsaturation content of 0.07 to 00.25 and/or a ratio of internal unsaturation content to terminal unsaturation content of 1 to 2.7.

In a useful embodiment of the invention, polymers produced by the processes of this invention comprise: 1) 6 wt % or more (preferably 10 wt % or more, preferably 14 wt % or more) of the polymer that elutes below 60° C.; 2) 40 to 60 wt % (preferably 45 to 60 wt %, preferably 50 to 60 wt %) of the polymer that elutes above 80° C., as determined by preparative temperature rising elution fraction (TREF) as described in the Experimental section below; and 3) the polymer comprises at least 0.07 internal unsaturations per 1000 carbons (preferably at least 0.1, preferably at least 0.2) as determined by $^1$H NMR as described in the Experimental section below.

In a useful embodiment of the invention, polymers produced by the processes of this invention have a melting point, Tm, of 100° C. or more, alternately of 110° C. or more, alternately of 115° C. or more as determined by DSC.

Tm, Hf, Tc, and Hc are measured using the DSC procedure as follows: Samples weighing approximately 5 to 10 mg were sealed in aluminum sample pans. The DSC data are recorded by first cooling the sample to −50° C. and then gradually heating it to 200° C. at a rate of 10° C./minute. The sample is kept at 200° C. for 5 minutes before a second cooling-heating cycle was applied. Both the first and second cycle thermal events are recorded. The melting temperature (Tm) and heat of fusion (Hf) are measured and reported during the second heating cycle (or second melt). The crystallization temperature (Tc) and heat of crystallization (Hc) are measured and reported during the first heating cycle (or first melt). Prior to the DSC measurement, the sample is aged (typically by holding it at ambient temperature for a period of 5 days) or annealed to maximize the level of crystallinity.

Blends

In another embodiment, the polymer (preferably the polyethylene or polypropylene) produced herein is combined with one or more additional polymers prior to being formed into a film, molded part or other article. Other useful polymers include polyethylene, isotactic polypropylene, highly isotactic polypropylene, syndiotactic polypropylene, random copolymer of propylene and ethylene, and/or butene, and/or hexene, polybutene, ethylene vinyl acetate, LDPE, LLDPE, HDPE, ethylene vinyl acetate, ethylene methyl acrylate, copolymers of acrylic acid, polymethylmethacrylate or any other polymers polymerizable by a high-pressure free radical process, polyvinylchloride, polybutene-1, isotactic polybutene, ABS resins, ethylene-propylene rubber (EPR), vulcanized EPR, EPDM, block copolymer, styrenic block copolymers, polyamides, polycarbonates, PET resins, cross linked polyethylene, copolymers of ethylene and vinyl alcohol (EVOH), polymers of aromatic monomers such as polystyrene, poly-1 esters, polyacetal, polyvinylidine fluoride, polyethylene glycols, and/or polyisobutylene.

In a preferred embodiment, the polymer (preferably the polyethylene or polypropylene) is present in the above blends, at from 10 to 99 wt %, based upon the weight of the polymers in the blend, preferably 20 to 95 wt %, even more preferably at least 30 to 90 wt %, even more preferably at least 40 to 90 wt %, even more preferably at least 50 to 90 wt %, even more preferably at least 60 to 90 wt %, even more preferably at least 70 to 90 wt %.

The blends described above may be produced by mixing the polymers of the invention with one or more polymers (as described above), by connecting reactors together in series to make reactor blends or by using more than one catalyst in the same reactor to produce multiple species of polymer. The polymers can be mixed together prior to being put into the extruder or may be mixed in an extruder.

The blends may be formed using conventional equipment and methods, such as by dry blending the individual components and subsequently melt mixing in a mixer, or by mixing the components together directly in a mixer, such as, for example, a Banbury mixer, a Haake mixer, a Brabender internal mixer, or a single or twin-screw extruder, which may include a compounding extruder and a side-arm extruder used directly downstream of a polymerization process, which may include blending powders or pellets of the resins at the hopper of the film extruder. Additionally, additives may be included in the blend, in one or more components of the blend, and/or in a product formed from the blend, such as a film, as desired. Such additives are well known in the art, and can include, for example: fillers; antioxidants (e.g., hindered phenolics such as IRGANOX™ 1010 or IRGANOX™ 1076 available from Ciba-Geigy); phosphites (e.g., IRGAFOS™ 168 available from Ciba-Geigy); anti-cling additives; tackifiers, such as polybutenes, terpene resins, aliphatic and aromatic hydrocarbon resins, alkali metal and glycerol stearates, and hydrogenated rosins; UV stabilizers; heat stabilizers; anti-blocking agents; release agents; anti-static agents; pigments; colorants; dyes; waxes; silica; fillers; talc; and the like.

Films

Any of the foregoing polymers, such as the foregoing ethylene polymers and/or propylene polymers, or any blends thereof, may be used in a variety of end-use applications. Such applications include, for example, mono- or multi-layer blown, extruded, and/or shrink films. These films may be formed by any number of well-known extrusion or coextrusion techniques, such as a blown bubble film processing technique, wherein the composition can be extruded in a molten state through an annular die and then expanded to form a uni-axial or biaxial orientation melt prior to being cooled to form a tubular, blown film, which can then be axially slit and unfolded to form a flat film. Films may be subsequently unoriented, uniaxially oriented, or biaxially oriented to the same or different extents. One or more of the layers of the film may be oriented in the transverse and/or longitudinal directions to the same or different extents. The uniaxially orientation can be accomplished using typical cold drawing or hot drawing methods. Biaxial orientation can be accomplished using tenter frame equipment or a double bubble processes and may occur before or after the individual layers are brought together. For example, a polyethylene layer can be extrusion coated or laminated onto an oriented polypropylene layer or the polyethylene and polypropylene can be coextruded together into a film then oriented. Likewise, oriented polypropylene could be laminated to oriented polyethylene or oriented polyethylene could be coated onto polypropylene then optionally the combination could be oriented even further. Typically, the films are oriented in the Machine Direction (MD) at a ratio of up to 15, preferably between 5 and 7, and in the Transverse Direction (TD) at a ratio of up to 15, preferably 7 to 9. However, in another embodiment, the film is oriented to the same extent in both the MD and TD directions.

The films may vary in thickness depending on the intended application; however, films of a thickness from 1 to 50 µm are usually suitable. Films intended for packaging are usually from 10 to 50 µm thick. The thickness of the sealing layer is typically 0.2 to 50 µm. There may be a sealing layer on both the inner and outer surfaces of the film or the sealing layer may be present on only the inner or the outer surface.

In another embodiment, one or more layers may be modified by corona treatment, electron beam irradiation, gamma irradiation, flame treatment, or microwave. In a preferred embodiment, one or both of the surface layers is modified by corona treatment.

Experimental

All molecular weights are weight average unless otherwise noted. All molecular weights are reported in g/mol unless otherwise noted.

Melt index (MI) also referred to as I2, reported in g/10 min, is determined according to ASTM D1238, 190° C., 2.16 kg load.

High load melt index (HLMI) also referred to as I21, reported in g/10 min, is determined according to ASTM D1238, 190° C., 21.6 kg load.

Melt index ratio (MIR) is MI divided by HLMI as determined by ASTM D1238.

$^1$H NMR $^1$H NMR data is collected at 120° C. using a 10 mm CryoProbe with a Bruker spectrometer at a $^1$H frequency of 400 MHz (available from Bruker Corporation, United Kingdom). Data are recorded using a maximum pulse width of 45°, 5 seconds between pulses and signal averaging 512 transients. Samples are prepared by dissolving 80 mg of sample in 3 mL of solvent heated at 140° C. Peak assignments are determined referencing the solvent of tetrachloroethane-1,2 $d_2$ at 5.98 ppm. The polyolefins are unique with respect to higher levels of internal unsaturation structures, which even exceeds the amount of end groups heretofore thought theoretically possible for a polymer. Without wishing to be bound by any particular theory, a possible internal unsaturation structures formation mechanism is disclosed at *Macromolecules,* 2005, 38, 6988, where internal vinylenes have been attributed to occur through the following mechanism.

centrations are determined by spectral integration and normalized to give the mole fraction of each triad: ethylene-ethylene-ethylene (EEE), ethylene-ethylene-Hexene (EEH), ethylene-Hexene-ethylene (EHE), Hexene-ethylene-ethylene (HEE), Hexene-ethylene-Hexene (HEH), Hexene-Hexene-Hexene (HHH). The observed triad concentrations are converted into the following diad concentrations: ethylene-ethylene (EE), Hexene-Hexene (HH) and ethylene-Hexene (EH). The diad concentrations are determined by the following equations, where A represents one monomer and B the other.

[AA]=[AAA]+[AAB]/2

[AB]=2*[ABA]+[BBA]

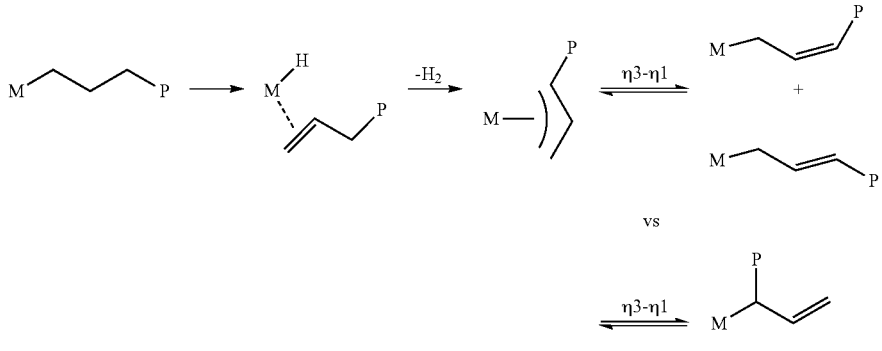

For purposes of this invention and the claims thereto, unsaturations in a polymer and specifically percent internal unsaturation are determined by $^1$H NMR with reference to: *Macromolecules,* 2005, 38, 6988 *and Macromolecules,* 2014, 47, 3782 (both incorporated by reference herein) including, but not limited to, the assignments used therein. Specifically, percent internal unsaturation is determined by adding Vy1+Vy2+ trisubstituted olefins. $^1$H NMR data was collected at 393K in a 10 mm probe using a Bruker spectrometer with a $^1$H frequency of at least 400 MHz (available from Agilent Technologies, Santa Clara, Calif.). Data are recorded using a maximum pulse width of 45° C., 5 seconds between pulses and signal averaging 512 transients. Spectral signals are integrated and the number of unsaturation types per 1000 carbons are calculated by multiplying the different groups by 1000 and dividing the result by the total number of carbons.

The $^{13}$C NMR spectroscopic analysis is conducted as follows: Polymer samples for $^{13}$C NMR spectroscopy are dissolved in $d_2$-1,1,2,2-tetrachloroethane at concentrations between 10 to 15 wt % prior to being inserted into the spectrometer magnet. $^{13}$C NMR data is collected at 120° C. in a 10 mm probe using a Varian spectrometer with a $^1$Hydrogen frequency of 700 MHz. A 90° pulse, an acquisition time adjusted to give a digital resolution between 0.1 and 0.12 Hz, at least a 10 second pulse acquisition delay time with continuous broadband proton decoupling using swept square wave modulation without gating, is employed during the entire acquisition period. The spectra is acquired using time averaging to provide a signal to noise level adequate to measure the signals of interest. $^{13}$C NMR Chemical Shift Assignments and calculations involved in characterizing polymers are made as outlined in the work of M. R. Seger and G. Maciel, "Quantitative $^{13}$C NMR Analysis of Sequence Distributions in Poly(ethylene-co-1-Hexene)," Anal. Chem., 2004, 76, pp. 5734-5747. Triad con- The diad concentrations are then used to establish $r_1 r_2$ as follows:

$$r_1 r_2 = 4 * \frac{EE * HH}{(EH)^2}.$$

Mole percent 1-Hexene (Mol % comonomer) is determined as follows:

Mole Percent Hexene=(HHH+HHE+EHE)*100.

Run Number is determined as follows:

Run Number=(HEH+½*HEE)*100.

Average ethylene run length is calculated by dividing the comonomer content by the run number.

Average Ethylene Run Length=(HEH+EEH+EEE)/ (run number).

"Butyls" per 1000 carbons is calculated by dividing the 1-Hexene-centered triads by the sum of twice the ethylene-centered triads plus six times the 1-Hexene-centered triads and the resultant quotient multiplying by 1000.

Butyls per 1000 Carbons =

$$\frac{HHH + HHE + EHE}{6*(HHH + HHE + EHE) + 2(HEH + EEH + EEE)} *1000$$

In ethylene copolymers where the comonomer is not hexene, the same procedure as above is employed and the H in the above examples would represent the comonomer. For example, in an ethylene-butene copolymer the H would represent the butene monomer, in an ethylene-octene copolymer the H would represent the octene monomer, etc.

Likewise, in situations where there is more than one comonomer, then the H in the formulae above would represent all the comonomers.

Molecular Weight, Comonomer Composition and Long Chain Branching Determination by GPC-IR Hyphenated with Multiple Detectors (GPC-4D)

Unless otherwise indicated, the distribution and the moments of molecular weight (Mw, Mn, Mz, Mw/Mn, etc.), the monomer and comonomer content (C2, C3, C6, etc.) and the branching index (g') are determined by using a high temperature Gel Permeation Chromatography (Polymer Char GPC-IR) equipped with a multiple-channel band-filter based Infrared detector IR5, an 18-angle light scattering detector and a viscometer. Three Agilent PLgel 10-μm Mixed-B LS columns are used to provide polymer separation. Aldrich reagent grade 1,2,4-trichlorobenzene (TCB) with 300 ppm antioxidant butylated hydroxytoluene (BHT) is used as the mobile phase. The TCB mixture is filtered through a 0.1-μm Teflon filter and degassed with an online degasser before entering the GPC instrument. The nominal flow rate is 1.0 ml/min and the nominal injection volume is 200 μL. The whole system including transfer lines, columns, and detectors are contained in an oven maintained at 145° C. Given amount of polymer sample is weighed and sealed in a standard vial with 80-μL flow marker (Heptane) added to it. After loading the vial in the autosampler, polymer is automatically dissolved in the instrument with 8 ml added TCB solvent. The polymer is dissolved at 160° C. with continuous shaking for about 1 hour for most polyethylene samples or 2 hours for polypropylene samples. The TCB densities used in concentration calculation are 1.463 g/ml at room temperature and 1.284 g/ml at 145° C. The sample solution concentration is from 0.2 to 2.0 mg/ml, with lower concentrations being used for higher molecular weight samples. The concentration (c), at each point in the chromatogram is calculated from the baseline-subtracted IR5 broadband signal intensity (I), using the following equation: c=βI, where β is the mass constant. The mass recovery is calculated from the ratio of the integrated area of the concentration chromatography over elution volume and the injection mass which is equal to the pre-determined concentration multiplied by injection loop volume. The conventional molecular weight (IR MW) is determined by combining universal calibration relationship with the column calibration which is performed with a series of monodispersed polystyrene (PS) standards ranging from 700 to 10M gm/mole. The MW at each elution volume is calculated with following equation:

$$\log M = \frac{\log(K_{PS}/K)}{\alpha + 1} + \frac{\alpha_{PS} + 1}{\alpha + 1} \log M_{PS},$$

where the variables with subscript "PS" stand for polystyrene while those without a subscript are for the test samples. In this method, $\alpha_{PS}$=0.67 and $K_{PS}$=0.000175, while α and K for other materials are as calculated and published in literature (Sun, T. et al. *Macromolecules,* 2001, 34, 6812), except that for purposes of this invention and claims thereto, α=0.695 and K=0.000579 for linear ethylene polymers, α=0.705 and K=0.0002288 for linear propylene polymers, α=0.695 and K=0.000181 for linear butene polymers, α is 0.695 and K is 0.000579*(1−0.0087*w2b+0.000018*(w2b)^2) for ethylene-butene copolymer where w2b is a bulk weight percent of butene comonomer, α is 0.695 and K is 0.000579*(1−0.0075*w2b) for ethylene-hexene copolymer where w2b is a bulk weight percent of hexene comonomer, and α is 0.695 and K is 0.000579*(1−0.0077*w2b) for ethylene-octene copolymer where w2b is a bulk weight percent of octene comonomer. Concentrations are expressed in g/cm³, molecular weight is expressed in g/mole, and intrinsic viscosity (hence K in the Mark-Houwink equation) is expressed in dL/g unless otherwise noted.

The comonomer composition is determined by the ratio of the IR5 detector intensity corresponding to $CH_2$ and $CH_3$ channel calibrated with a series of PE and PP homo/copolymer standards whose nominal value are predetermined by NMR or FTIR. In particular, this provides the methyls per 1000 total carbons ($CH_3$/1000TC) as a function of molecular weight. The short-chain branch (SCB) content per 1000TC (SCB/1000TC) is then computed as a function of molecular weight by applying a chain-end correction to the $CH_3$/1000TC function, assuming each chain to be linear and terminated by a methyl group at each end. The weight % comonomer is then obtained from the following expression in which f is 0.3, 0.4, 0.6, 0.8, and so on for C3, C4, C6, C8, and so on co-monomers, respectively.

w2=f*SCB/1000TC,

The bulk composition of the polymer from the GPC-IR and GPC-4D analyses is obtained by considering the entire signals of the $CH_3$ and $CH_2$ channels between the integration limits of the concentration chromatogram. First, the following ratio is obtained.

$$\text{Bulk } IR \text{ ratio} = \frac{\text{Area of } CH_3 \text{ signal within integration limits}}{\text{Area of } CH_2 \text{ signal within integration limits}},$$

Then the same calibration of the $CH_3$ and $CH_2$ signal ratio, as mentioned previously in obtaining the $CH_3$/1000TC as a function of molecular weight, is applied to obtain the bulk $CH_3$/1000TC. A bulk methyl chain ends per 1000TC (bulk $CH_3$ end/1000TC) is obtained by weight-averaging the chain-end correction over the molecular-weight range. Then w2b=f*bulk CH3/1000TC, bulk SCB/1000TC=bulk $CH_3$/1000TC−bulk $CH_3$ end/1000TC, and bulk SCB/1000TC is converted to bulk w2 in the same manner as described above.

The LS detector is the 18-angle Wyatt Technology High Temperature DAWN HELEOSII. The LS molecular weight (M) at each point in the chromatogram is determined by analyzing the LS output using the Zimm model for static light scattering (*Light Scattering from Polymer Solutions*; Huglin, M. B., Ed.; Academic Press, 1972).

$$\frac{K_o c}{\Delta R(\theta)} = \frac{1}{MP(\theta)} + 2A_2 c,$$

Here, ΔR(θ) is the measured excess Rayleigh scattering intensity at scattering angle θ, c is the polymer concentration determined from the IR5 analysis, $A_2$ is the second virial coefficient, P(θ) is the form factor for a monodisperse random coil, and $K_o$ is the optical constant for the system:

$$K_o = \frac{4\pi^2 n^2 (dn/dc)^2}{\lambda^4 N_A},$$

where $N_A$ is Avogadro's number, and (dn/dc) is the refractive index increment for the system. The refractive index, n=1.500 for TCB at 145° C. and λ=665 nm. For analyzing polyethylene homopolymers, ethylene-hexene copolymers, and ethylene-octene copolymers, dn/dc=0.1048 ml/mg and $A_2$=0.0015; for analyzing ethylene-butene copolymers, dn/dc=0.1048*(1−0.00126*w2) ml/mg and $A_2$=0.0015 where w2 is weight percent butene comonomer.

A high temperature Agilent (or Viscotek Corporation) viscometer, which has four capillaries arranged in a Wheatstone bridge configuration with two pressure transducers, is used to determine specific viscosity. One transducer measures the total pressure drop across the detector, and the other, positioned between the two sides of the bridge, measures a differential pressure. The specific viscosity, $\eta_s$, for the solution flowing through the viscometer is calculated from their outputs. The intrinsic viscosity, [η], at each point in the chromatogram is calculated from the equation [η]=$\eta_s$/c, where c is concentration and is determined from the IR5 broadband channel output. The viscosity MW at each point is calculated as M=$K_{PS}M^{\alpha_{PS}+1}$/[η], where $\alpha_{ps}$ is 0.67 and $K_{ps}$ is 0.000175.

The branching index ($g'_{vis}$) is calculated using the output of the GPC-IR5-LS-VIS method above as follows. The average intrinsic viscosity, $[\eta]_{avg}$, of the sample is calculated by:

$$[\eta]_{avg} = \frac{\sum c_i [\eta]_i}{\sum c_i},$$

where the summations are over the chromatographic slices, i, between the integration limits. The branching index $g'_{vis}$ is defined $$g'_{vis} = \frac{[\eta]_{avg}}{KM_v^\alpha},$$

where $M_v$ is the viscosity-average molecular weight based on molecular weights determined by LS analysis and the K and α are for the reference linear polymer, which are, for purposes of this invention and claims thereto, α=0.695 and K=0.000579 for linear ethylene polymers, α=0.705 and K=0.0002288 for linear propylene polymers, α=0.695 and K=0.000181 for linear butene polymers, α is 0.695 and K is 0.000579*(1−0.0087*w2b+0.000018*(w2b)^2) for ethylene-butene copolymer where w2b is a bulk weight percent of butene comonomer, α is 0.695 and K is 0.000579*(1−0.0075*w2b) for ethylene-hexene copolymer where w2b is a bulk weight percent of hexene comonomer, and α is 0.695 and K is 0.000579*(1−0.0077*w2b) for ethylene-octene copolymer where w2b is a bulk weight percent of octene comonomer. Concentrations are expressed in g/cm³, molecular weight is expressed in g/mole, and intrinsic viscosity (hence K in the Mark-Houwink equation) is expressed in dL/g unless otherwise noted. Calculation of the w2b values is as discussed above.

The reversed-co-monomer index (RCI,m) is computed from x2 (mol % co-monomer C3, C4, C6, C8, etc.), as a function of molecular weight, where x2 is obtained from the following expression in which n is the number of carbon atoms in the comonomer (3 for C3, 4 for C4, 6 for C6, etc.).

$$x2 = \frac{200 \, w2}{-100 \, n - 2 \, w2 + n \, w2},$$

Then the molecular-weight distribution, W(z) where $z = \log_{10} M$, is modified to W'(z) by setting to 0 the points in W that are less than 5% of the maximum of W; this is to effectively remove points for which the S/N in the composition signal is low. Also, points of W' for molecular weights below 2000 gm/mole are set to 0. Then W' is renormalized so that $$1 = \int_{-\infty}^{\infty} W' dz,$$

and a modified weight-average molecular weight ($M_w'$) is calculated over the effectively reduced range of molecular weights as follows:

$$M_w' = \int_{-\infty}^{\infty} 10^z * W' dz.$$

The RCI,m is then computed as $$RCI,m = \int_{-\infty}^{\infty} x2 (10^z - M_w') W' dz.$$

A reversed-co-monomer index (RCI,w) is also defined on the basis of the weight fraction co-monomer signal (w2/100) and is computed as follows:

$$RCI, w = \int_{-\infty}^{\infty} \frac{w2}{100} (10^z - M_w') W' dz.$$

Note that in the above definite integrals the limits of integration are the widest possible for the sake of generality; however, in reality the function is only integrated over a finite range for which data is acquired, considering the function in the rest of the non-acquired range to be 0. Also, by the manner in which W' is obtained, it is possible that W' is a discontinuous function, and the above integrations need to be done piecewise.

Three co-monomer distribution ratios are also defined on the basis of the % weight (w2) comonomer signal, denoted as CDR-1,w, CDR-2,w, and CDR-3,w, as follows:

$$CDR-1, w = \frac{w2(Mz)}{w2(Mw)},$$

$$CDR-2, w = \frac{w2(Mz)}{w2\left(\frac{Mw+Mn}{2}\right)},$$

$$CDR-3, w = \frac{w2\left(\frac{Mz+Mw}{2}\right)}{w2\left(\frac{Mw+Mn}{2}\right)},$$

where w2(Mw) is the % weight co-monomer signal corresponding to a molecular weight of Mw, w2(Mz) is the % weight co-monomer signal corresponding to a molecular weight of Mz, w2[(Mw+Mn)/2)] is the % weight co-monomer signal corresponding to a molecular weight of (Mw+Mn)/2, and w2[(Mz+Mw)/2] is the % weight co-monomer signal corresponding to a molecular weight of Mz+Mw/2, where Mw is the weight-average molecular weight, Mn is the number-average molecular weight, and Mz is the z-average molecular weight.

Accordingly, the co-monomer distribution ratios can be also defined utilizing the % mole co-monomer signal, CDR-1,m, CDR-2,m, CDR-3,m, as $$CDR-1, m = \frac{x2(Mz)}{x2(Mw)},$$

$$CDR-2, m = \frac{x2(Mz)}{x2\left(\frac{Mw+Mn}{2}\right)},$$

$$CDR-3, m = \frac{x2\left(\frac{Mz+Mw}{2}\right)}{x2\left(\frac{Mw+Mn}{2}\right)},$$

where x2(Mw) is the % mole co-monomer signal corresponding to a molecular weight of Mw, x2(Mz) is the % mole co-monomer signal corresponding to a molecular weight of Mz, x2[(Mw+Mn)/2)] is the % mole co-monomer signal corresponding to a molecular weight of (Mw+Mn)/2, and x2[(Mz+Mw)/2] is the % mole co-monomer signal corresponding to a molecular weight of Mz+Mw/2, where Mw is the weight-average molecular weight, Mn is the number-average molecular weight, and Mz is the z-average molecular weight.

Temperature Rising Elution Fractionation

Preparative TREF (Temperature Rising Elution Fractionation) fractionation of the polymers in the example section below was performed by Polymer Char (a.k.a. Polymer Characterization, S.A.), Valencia Spain. Polymer Char's procedure used a commercial preparative TREF instrument (Model MC2, Polymer Char S.A.) to fractionate the resin into Chemical Composition Fractions. This procedure employs a sequential TREF separation. Approximately 1 gram of resin is dissolved in 100 ml of xylene, stabilized with 600 ppm of butylated hydroxy toluene (BHT), at 130° C. for one hour. The solution is crystallized by slowly cooling it down to 30° C. or to subambient temperatures using a cooling rate of 0.2° C. The cooled sample is heated at its lowest temperature (30° C. or to subambient temperatures) for 45 minutes and then the first fraction (the most amorphous) is collected into an external bottle, the rest of the polymer remains in the vessel as it has been retained by the filter. Subsequent fractions are obtained by increasing the temperature stepwise, by about 3° C. per step, to within a specified temperature range (such as a peak temperature), heated within that specified temperature range for 45 minutes and repeating the same isolation procedure as for the first fraction. Once all the fractions are isolated in the external bottles, the polymer is precipitated by adding acetone and cooling the bottles. Then the mixture is filtered using an external filtration system and recovering the physical fractionated polymer.

Experiments

All manipulations were done in a nitrogen purged glove box unless stated otherwise. Anhydrous solvents were purchased from Aldrich and purged with nitrogen prior to use. 30 wt % methylalumoxane (MAO) in toluene was purchased from Albemarle. Tri-n-octylaluminum was purchased from Akzo Nobel. Ethylene containing 300 ppm hydrogen used in the polymerizations was purchased from Air Liquide and used without purification. Isobutane and nitrogen used in the polymerizations were treated with 3A sieves and a supported copper catalyst prior to use to remove water and oxygen. Deuterated solvents were purchased from Cambridge Isotope Laboratories and dried over 3A molecular sieves and purged with nitrogen prior to use. $^1$H NMR spectra were obtained as described above.

Bridged Catalyst Complexes A-I (Shown in FIG. 1)

All manipulations were performed in an inert $N_2$ purged glove box unless otherwise stated. All anhydrous solvents were purchased from Fisher Chemical and were degassed and dried over molecular sieves prior to use. Deuterated solvents were purchased from Cambridge Isotope Laboratories and dried over molecular sieves prior to use. n-Butyl lithium (2.5 M solution in hexane), dimethylsilyl dichloride ($Me_2SiCl_2$), diphenylsilyl dichloride ($Ph_2SiCl_2$), lithium tetramethylcyclopentadienide ($Me_4Cp$-Li) and methylmagnesium bromide (3.0 M solution in diethyl ether) were purchased from Sigma-Aldrich. Hafnium tetrachloride ($HfCl_4$) 99+%, zirconium tetrachloride ($ZrCl_4$) 99+% and (trimethylsilyl)methyl trifluoromethanesulfonate were procured from Strem Chemicals and TCI America, respectively, and used as received. Potassium cyclopentadienide (KCp) was prepared according to the procedure described in A. *J Organomet. Chem.*, 1975, 84, $C_1$-$C_4$. The $^1$H NMR measurements were obtained as described above.

Synthesis of (Trimethylsilyl)
methylcyclopentadiene, $(Me_3Si)CH_2CpH$

A neat (trimethylsilyl)methyl trifluoromethanesulfonate (25.0 g, 105.8 mmol) was dissolved in 300 mL of diethyl ether and cooled to −25° C., to this a solid potassium cyclopentadienide (11.14 g, 106.9 mmol) was slowly added over a period of 10-15 minutes. The resulting mixture was stirred overnight at room temperature. Volatiles from the reaction mixture were carefully removed under dynamic vacuum to avoid evaporating the volatile (trimethylsilyl) methylcyclopentadiene, $(Me_3Si)CH_2CpH$. The reaction flask (250 mL round bottom flask) and frit with celite were weighted to calculate yield of the product after extraction. The crude materials were extracted into pentane (3×50 mL) and used without any further purification. Based on above mathematical method, the yield is calculated as 15.47 g (95.2%). The $^1$H NMR spectrum was recorded for the crude material to ensure the product formation. $^1$H NMR (400 MHz, $C_6D_6$): δ −0.05 (9H, s, Si—$CH_3$), 1.77 (2H, d, $J_{HH}$=1.2 Hz, $Me_3Si$—$CH_2$), 2.83 (1H, sex, $J_{HH}$=1.5 Hz, Cp-CH), 5.80-6.49 (4H, m, Cp-CH) ppm.

Synthesis of Lithium (trimethylsilyl)
methylcyclopentadienide, $(Me_3Si)CH_2CpLi$ A hexane solution of n-butyl lithium (41.5 mL, 103.8 mmol, 2.5 M solution in diethyl ether) was added drop-wise to a precooled solution (pentane and diethyl ether, 100/100 mL) of $(Me_3Si)CH_2CpH$ (15.47 g, 101.7 mmol) over a period of 40-50 minutes at −25° C. The resulting mixture was gradually brought to room temperature and then continuously stirred overnight. Volatiles were removed in vacuo and remaining crude materials were thoroughly washed with pentane. The final materials were dried under vacuum to obtain a colorless crystalline solid of $(Me_3Si)CH_2CpLi$ in 13.6 g (84.6%) yield. $^1$H NMR (400 MHz, THF-$d_8$): δ −0.09 (9H, s, Si—$CH_3$), 1.84 (2H, s, $Me_3Si$—$CH_2$), 5.36 (2H, t, $J_{HH}$=2.6 Hz, Cp-H), 5.47 (2H, t, $J_{HH}$=2.6 Hz, Cp-CH) ppm.

Synthesis of Dimethylsilyl-bis((trimethylsilyl)
methylcyclopentadiene), $Me_2Si((Me_3Si)CH_2CpH)_2$ A neat $Me_2SiCl_2$ (2.50 g, 19.4 mmol) was dissolved in 100 mL of THF and cooled to −25° C. A solid $(Me_3Si)$ $CH_2CpLi$ (6.133 g, 38.8 mmol) was added to the above mixture and the resulting mixture was stirred overnight at room temperature to ensure completion of the reaction. Volatiles from the reaction mixture were removed in vacuo and subsequently triturated with pentane to remove trace of THF. The crude materials were extracted into pentane and followed by solvent removal under vacuum afforded a thick yellow viscous oil of $Me_2Si((Me_3Si)CH_2CpH)_2$ in 7.0 g (100%) yield. $^1H$ NMR (400 MHz, $C_6D_6$): δ −0.15 (6H, bs, $SiMe_2-CH_3$), 0.05 (18H, s, $SiMe_3-CH_3$), 1.81-1.87 (4H, m, $Me_3Si-CH_2$), 3.26 (1H, s, Cp-CH), 3.37 (1H, s, Cp-CH), 5.99-6.82 (6H, m, Cp-CH) ppm.

Synthesis of Lithium dimethylsilyl-bis((trimethylsilyl) methylcyclopentadienide) dimethoxyethane Complex, $Me_2Si((Me_3Si)CH_2Cp)_2Li_2$-dme A hexane solution of n-butyl lithium (1.7 mL, 4.2 mmol, 2.5 M solution) was added drop-wise to a precooled solution of $Me_2Si((Me_3Si)CH_2CpH)_2$ (750 mg, 2.1 mmol) in 10 mL of dimethoxyethane over a period of 5-10 minutes at −25° C. The resulting mixture was gradually warmed to room temperature and then continuously stirred overnight. Volatiles from the reaction mixture were removed in vacuo, and triturated with pentane to remove DME. The crude materials were thoroughly washed with pentane to remove any soluble impurities, and dried under vacuum to give the colorless crystalline solid of $Me_2Si((Me_3Si)CH_2Cp)_2Li_2$.dme in 830 mg (93.0%) yield. $^1H$ NMR (400 MHz, THF-$d_8$): δ 0.2 (18H, s, $SiMe_3-CH_3$), 0.93 (6H, bs, $SiMe_2-CH_3$), 2.26 (4H, s, $Me_3Si-CH_2$), 2.57 (4H, s, dme-$CH_2$), 2.77 (6H, s, dme-$OCH_3$), 5.94-6.15 (6H, m, Cp-CH) ppm.

Synthesis of Lithium dimethylsilyl-bis((trimethylsilyl) methylcyyclopentadienide), $Me_2Si((Me_3Si)CH_2Cp)_2Li_2$ A hexane solution of n-butyl lithium (15.7 mL, 39.2 mmol, 2.5 M solution) was added drop wise to a precooled solution of $Me_2Si((Me_3Si)CH_2CpH)_2$ (7.0 g, 19.4 mmol) in 100 mL of THF over a period of 25-30 minutes at −25° C. The resulting mixture was gradually warmed to room temperature and then continuously stirred overnight. Volatiles from the reaction mixture were removed in vacuo, and triturated with pentane. The crude materials were thoroughly washed with pentane to remove any soluble impurities, and dried under vacuum to obtain the colorless crystalline solid of $Me_2Si((Me_3Si)CH_2Cp)_2Li_2$ in 7.3 g (91.7%) yield. $^1H$ NMR (400 MHz, THF-$d_8$): δ −0.09 (18H, s, $SiMe_3-CH_3$), 0.18 (6H, s, $SiMe_2-CH_3$), 1.85 (4H, s, $Me_3Si-CH_2$), 5.50 (2H, dd, $J_{HH}$=2.2 Hz, Cp-CH), 5.65 (2H, t, $J_{HH}$=2.1 Hz, Cp-CH), 5.76 (2H, dd, $J_{HH}$=2.2 Hz, Cp-CH) ppm.

Synthesis of Rac-meso-dimethylsilyl-bis((trimethylsilyl) methylcyclopentadienide)hafnium dichloride, $Me_2Si((Me_3Si)CH_2Cp)_2HfCl_2$ A solid $HfCl_4$ (570 mg, 1.8 mmol) was added to a precooled diethyl ether (20 mL) solution of $Me_2Si((Me_3Si)CH_2Cp)_2Li_2$.dme (830 mg, 1.8 mmol) at −25° C. The resulting mixture was stirred overnight at room temperature. Volatiles from the reaction mixture were removed in vacuo, and then extracted into dichloromethane. Solvent removal under vacuum gave a yellow crystalline solid of $Me_2Si((Me_3Si)CH_2-Cp)_2HfCl_2$ in 1.02 g (94.0%) yield. The $^1H$ NMR spectrum of final material integrated a ~1:1 ratio of rac/meso isomers. $^1H$ NMR (400 MHz, $CD_2Cl_2$): δ −0.05 (18H, s, $SiMe_3-CH_3$), −0.04 (18H, s, $SiMe_3-CH_3$), −0.64 (3H, s, $SiMe_2-CH_3$, meso), −0.65 (6H, s, $SiMe_2-CH_3$, rac), −0.68 (3H, s, $SiMe_2-CH_3$, meso), 2.08-2.18 (8H, m, $Me_3Si-CH_2$), 5.14 (2H, t, $J_{HH}$=2.6 Hz, Cp-H), 5.28 (2H, t, $J_{HH}$=2.6 Hz, Cp-H), 5.64 (2H, t, $J_{HH}$=2.7 Hz, Cp-H), 5.77 (2H, t, $J_{HH}$=2.7 Hz, Cp-CH), 6.19 (2H, t, $J_{HH}$=2.7 Hz, Cp-CH), 6.34 (2H, t, $J_{HH}$=2.7 Hz, Cp-CH) ppm.

Synthesis of Rac-meso-dimethylsilyl-bis((trimethylsilyl) methylcyclopentadienide)hafnium dichloride, $Me_2Si((Me_3Si)CH_2Cp)_2HfCl_2$ A solid $HfCl_4$ (5.686 g, 17.8 mmol) was added to a precooled diethyl ether (120 mL) solution of $Me_2Si(Me_3SiCH_2Cp)_2Li_2$ (7.30 g, 17.8 mmol) at −25° C. The resulting mixture was stirred overnight at room temperature. Insoluble materials were filtered out and volatiles from the filtrate were removed in vacuo. The crude materials were washed with cold pentane to remove soluble impurities. The resulting materials were dried under vacuum to obtain the yellow crystalline solid of $Me_2Si((Me_3Si)CH_2Cp)_2HfCl_2$ in 10.5 g (97.0%) yield. The $^1H$ NMR spectrum of purified compound integrated a ~1:1 ratio of rac/meso isomers. $^1H$ NMR (400 MHz, $CD_2Cl_2$): δ −0.05 (18H, s, $SiMe_3-CH_3$), −0.04 (18H, s, $SiMe_3-CH_3$), −0.64 (3H, s, $SiMe_2-CH_3$, meso), −0.65 (6H, s, $SiMe_2-CH_3$, rac), −0.68 (3H, s, $SiMe_2-CH_3$, meso), 2.08-2.18 (8H, m, $Me_3Si-CH_2$), 5.14 (2H, t, $J_{HH}$=2.6 Hz, Cp-CH), 5.28 (2H, t, $J_{HH}$=2.6 Hz, Cp-CH), 5.64 (2H, t, $J_{HH}$=2.7 Hz, Cp-CH), 5.77 (2H, t, $J_{HH}$=2.7 Hz, Cp-CH), 6.19 (2H, t, $J_{HH}$=2.7 Hz, Cp-CH), 6.34 (2H, t, $J_{HH}$=2.7 Hz, Cp-CH) ppm.

Complex A: Synthesis of Rac-meso-dimethylsilyl-bis((trimethylsilyl) methylcyclopentadienide)hafnium dimethyl, $Me_2Si((Me_3Si)CH_2Cp)_2HfMe_2$ An ethereal solution of MeMgBr (11.6 mL, 34.6 mmol) was added drop wise to a precooled diethyl ether solution of $Me_2Si((Me_3Si)CH_2-Cp)_2HfCl_2$ (10.5 g, 17.3 mmol) over a period of 10-15 minutes at −25° C. The resulting mixture was stirred overnight at room temperature to ensure completion of the reaction. Insoluble materials were filtered through a pad of celite. Volatiles from the filtrate were removed under vacuum, and then the crude materials were extracted into pentane. Solvent removal in vacuo afforded a sticky yellow material of $Me_2Si((Me_3Si)CH_2-Cp)_2HfMe_2$ in 8.3 g (84.6%) yield. The $^1H$ NMR spectrum of final material integrated a ~1:1 ratio of rac/meso isomers. $^1H$ NMR (400 MHz, $C_6D_6$): δ −0.25 (3H, s, Hf—$CH_3$, meso), δ-0.24 (6H, s, Hf—$CH_3$, rac), −0.20 (3H, s, Hf—$CH_3$, meso), 0.03 (18H, s, $SiMe_3-CH_3$), 0.04 (18H, s, $SiMe_3-CH_3$), 0.19 (3H, s, $SiMe_2-CH_3$, meso), 0.20 (6H, s, $SiMe_2-CH_3$, rac), 0.22 (3H, s, $SiMe_2-CH_3$, meso), 2.06 (4H, s, $Me_3Si-CH_2$, rac), 2.09 (4H, d, $J_{HH}$=3.1 Hz, $Me_3Si-CH_2$, meso), 5.03 (2H, t, $J_{HH}$=2.2 Hz, Cp-CH, meso), 5.10 (2H, t, $J_{HH}$=2.2 Hz, Cp-CH, rac), 5.34 (2H, t, $J_{HH}$=2.6 Hz, Cp-CH, rac), 5.44 (2H, t, $J_{HH}$=2.6 Hz, Cp-CH, meso), 6.26 (2H, t, $J_{HH}$=2.6 Hz, Cp-CH, meso), 6.31 (2H, t, $J_{HH}$=2.6 Hz, Cp-CH, rac) ppm.

Complex B: Isolation of Rac-dimethylsilyl-bis ((trimethylsilyl) methylcyclopentadienide)hafnium dimethyl, $Me_2Si((Me_3Si)CH_2Cp)_2HfMe_2$ A ~1:1 ratio of rac/meso isomers of $Me_2Si((Me_3Si)CH_2Cp)_2HfMe_2$ (8.3 g) was dissolved in 100 mL hexane and concentrated to 30 mL. Concentrated solution of the mixture was placed overnight at −25° C. Rac-isomer was crystallized as colorless single crystals in 2.0 g (25.0%) yield. X-ray quality single crystals of rac-isomer were grown in a separate vial from its concentrated hexane solution overnight at −25° C. $^1$H NMR (400 MHz, $C_6D_6$): δ −0.24 (6H, s, Hf—$CH_3$), 0.04 (18H, s, $SiMe_3$-$CH_3$), 0.20 (6H, s, $SiMe_2$-$CH_3$), 2.06 (4H, s, $Me_3Si$—$CH_2$), 5.10 (2H, t, $J_{HH}$=2.2 Hz, Cp-CH), 5.34 (2H, dd, $J_{HH}$=2.2 and 2.6 Hz, Cp-CH), 6.31 (2H, dd, $J_{HH}$=2.2 and 2.6 Hz, Cp-CH) ppm.

Synthesis of Diphenylsilyl-bis(trifluoromethanesulfonate), $Ph_2Si(OTf)_2$

A neat $Ph_2SiCl_2$ (1.0 g, 4.0 mmol) was dissolved in 100 mL of DCM and cooled to −25° C., and to this a solid silver trifluoromethanesulfonate (2.1 g, 4.0 mmol) was added over a period of 2-3 minutes. The resulting mixture was covered with aluminum foil and stirred overnight at room temperature. Insoluble byproduct AgCl was filtered out and volatiles from the filtrate were removed in vacuo to afford a colorless crystalline solid of $Ph_2Si(OTf)_2$ in 1.9 g (98.0%) yield. $^1$H NMR (400 MHz, $CD_2Cl_2$): δ 7.50-7.55 (4H, m, Ar—CH), 7.65-7.70 (2H, m, Ar—CH), 7.73-7.75 (4H, m, Ar—CH) ppm.

Synthesis of Diphenylsilyl-bis-((trimethylsilyl) methylcyclopentadiene), $Ph_2Si((Me_3Si)CH_2CpH)_2$ A solid $Ph_2Si(OTf)_2$ (900 mg, 1.8 mmol) was slurried in 15 mL of diethyl ether and cooled to −25° C., and to this a solid $(Me_3Si)CH_2CpLi$ (580 mg, 3.6 mmol) was added over a period of 3-5 minutes. The resulting mixture was stirred overnight at room temperature to ensure completion of the reaction. All volatiles from the reaction mixture were removed in vacuo and triturated with hexane. The crude materials were then extracted into hexane and followed by solvent removal afforded a pale yellow oil of $Ph_2Si((Me_3Si)CH_2CpH)_2$ in 870 mg (99.6%) yield. $^1$H NMR (400 MHz, $C_6D_6$): δ 0.01-0.06 (18H, m, $SiMe_3$-$CH_3$), 1.79-1.88 (4H, m, $Me_3Si$—$CH_2$), 3.92 (1H, bs, Cp-CH), 4.06 (1H, bs, Cp-CH), 6.13-6.92 (6H, m, Cp-CH), 7.24-7.30 (6H, m, Ar—CH), 7.71-7.80 (4H, m, Ar—CH) ppm.

Synthesis of Lithium diphenylsilyl-bis-((trimethylsilyl) methylcyclopentadienide), $Ph_2Si((Me_3Si)CH_2Cp)_2Li_2$ A neat $Ph_2Si((Me_3Si)CH_2CpH)_2$ (870 mg, 1.8 mmol) was dissolved in 15 mL of THF and cooled to −25° C., and to this a hexane solution of n-butyl lithium (1.5 mL, 3.62 mmol, 2.5 M solution in diethyl ether) was added over a period of 3-5 minutes. The resulting mixture was gradually warmed to room temperature and continuously stirred overnight. All volatiles from the reaction mixture were removed in vacuo, and triturated with hexane. The crude materials were thoroughly washed with hexane to remove soluble impurities, and dried under vacuum to give an off-white solid of $Ph_2Si((Me_3Si)CH_2Cp)_2Li_2$ in 890 mg (99.5%) yield. $^1$H NMR (400 MHz, THF-$d_8$): δ 0.13 (18H, s, $SiMe_3$-$CH_3$), 2.92 (4H, m, $Me_3Si$—$CH_2$), 5.57-6.80 (6H, m, Cp-CH), 7.29 (6H, bs, Ar—CH), 7.98 (4H, bs, Ar—CH) ppm.

Synthesis of Diphenylsilyl-bis-((trimethylsilyl) methylcyclopentadienide)hafnium dichloride, $Ph_2Si((Me_3Si)CH_2Cp)_2HfCl_2$ A solid $HfCl_4$ (573 mg, 1.8 mmol) was slurried in 15 mL of diethyl ether and cooled to −25° C., and to this a solid $Ph_2Si((Me_3Si)CH_2Cp)_2Li_2$ (890 mg, 1.8 mmol) was added. The resulting mixture was stirred overnight at room temperature. Insoluble materials were removed by filtration and volatiles from the filtrate were removed in vacuo to afford a pale yellow greasy material of $Ph_2Si((Me_3Si)CH_2Cp)_2HfCl_2$ in 1.18 g (89.5%) yield. $^1$H NMR (400 MHz, $CD_2Cl_2$): δ 0.01 (9H, s, $SiMe_3$-$CH_3$), 0.02 (9H, s, $SiMe_3$-$CH_3$), 2.07-2.24 (4H, m, $Me_3Si$—$CH_2$), 5.25 (1H, t, $J_{HH}$=2.4 Hz, Cp-CH), 5.42 (1H, t, $J_{HH}$=2.4 Hz, Cp-CH), 5.78 (1H, t, $J_{HH}$=2.4 Hz, Cp-CH), 5.94 (1H, t, $J_{HH}$=2.4 Hz, Cp-CH), 6.29 (1H, t, $J_{HH}$=2.4 Hz, Cp-CH), 6.44 (1H, t, $J_{HH}$=2.4 Hz, Cp-CH), 7.48-7.55 (6H, m, Ar—CH), 7.90-7.98 (4H, m, Ar—CH) ppm.

Complex C: Synthesis of Rac-meso-diphenylsilyl-bis-((trimethylsilyl) methyl-cyclopentadienide)hafnium dimethyl, $Ph_2Si((Me_3Si)CH_2Cp)_2HfMe_2$ A neat $Ph_2Si((Me_3Si)CH_2Cp)_2HfCl_2$ (1.18 g, 1.6 mmol) was dissolved in 20 mL of diethyl ether and cooled to −25° C., and to this an ethereal solution of MeMgBr (1.1 mL, 3.26 mmol) was added over a period of 3-5 minutes. The resulting mixture was gradually warmed to room temperature and continuously stirred 2 hours. Volatiles were removed under reduced pressure and triturated with hexane. The crude materials were then extracted into hexane and solvent removal afforded a pale thick viscous oil of $Ph_2Si((Me_3Si)CH_2Cp)_2HfMe_2$ in 720 mg (79.3%) yield. The $^1$H NMR spectrum of purified compound integrated a ~1:1 ratio of rac/meso isomers. $^1$H NMR (400 MHz, $C_6D_6$): δ −0.26 (3H, s, Hf—$CH_3$, meso), −0.25 (6H, s, Hf—$CH_3$, rac), −0.22 (3H, s, Hf—$CH_3$, meso), 0.05 (18H, s, $SiMe_3$-$CH_3$), 0.06 (18H, s, $SiMe_3$-$CH_3$), 1.97-2.10 (4H, m, $Me_3Si$—$CH_2$), 5.24 (2H, t, $J_{HH}$=2.2 Hz, Cp-CH), 5.33 (2H, t, $J_{HH}$=2.2 Hz, Cp-CH), 5.59 (2H, t, $J_{HH}$=2.6 Hz, Cp-CH), 5.71 (2H, t, $J_{HH}$=2.6 Hz, Cp-CH), 6.23 (2H, dd, $J_{HH}$=2.2 Hz, 2.6 Hz, Cp-CH), 6.34 (2H, dd, $J_{HH}$=2.2 Hz, 2.6 Hz, Cp-CH), 7.16-7.21 (12H, m, Ar—CH), 7.84-7.95 (8H, m, Ar—CH) ppm.

Synthesis of Dimethylsilyl-(2,3,4,5-tetramethyl-2,4-cyclopentadien-1-yl)(trimethylsilylmethylcyclopentadiene), $Me_2Si(Me_4CpH)(Me_3SiCH_2CpH)$ A solid $Me_3SiCH_2CpLi$ (500 mg, 3.2 mmol) was added to a precooled ethereal solution of $Me_2Si(Me_4CpH)C_1$ (680 mg, 3.2 mmol) at −25° C. The resulting mixture was stirred overnight at room temperature to ensure completion of the reaction. Volatiles from the reaction mixture were removed in vacuo and subsequently triturated with pentane. The crude materials were extracted into pentane and followed by solvent removal under reduced pressure afforded a thick yellow oil of $Me_2Si(Me_4CpH)(Me_3SiCH_2CpH)$ in 670 mg (64.1%) yield. $^1$H NMR (400 MHz, $C_6D_6$): δ 0.06 (6H, s, $SiMe_2$-$CH_3$), 0.14 (9H, s, $SiMe_3$-$CH_3$), 1.71 (6H, s, Cp-$CH_3$), 1.83 (2H, s, $Me_3Si$—$CH_2$), 1.92 (6H, s, Cp-$CH_3$), 2.81 (1H, bs, Cp-CH), 2.89 (1H, bs, Cp-CH), 5.90-6.50 (3H, m, Cp-CH) ppm.

Synthesis of Lithium dimethylsilyl-(tetramethylcyclopentadienide)-(trimethylsilylmethylcyclopentadienide), $Me_2Si(Me_4Cp)(Me_3SiCH_2Cp)Li_2$ A hexane solution of n-butyl lithium (1.6 mL, 4.0 mmol, 2.5 M solution) was added drop wise to a precooled solution of $Me_2Si(Me_4CpH)(Me_3SiCH_2CpH)$ (650 mg, 2.0 mmol) in 10 mL of THF over a period of 5-10 minutes at −25° C. The resulting mixture was gradually warmed to room temperature and then continuously stirred overnight. Volatiles from the reaction mixture were removed in vacuo, and triturated with pentane. The crude materials were thoroughly washed with pentane to remove any soluble impurities, and dried under vacuum to obtain the colorless crystalline solid of Me$_2$Si(Me$_4$Cp)(Me$_3$SiCH$_2$Cp)Li$_2$ in 440 mg (64.9%) yield. $^1$H NMR (400 MHz, THF-d$_8$): δ −0.11 (9H, s, SiMe$_3$-CH$_3$), 0.12 (3H, s, SiMe$_2$-CH$_3$), 0.33 (3H, s, SiMe$_2$-CH$_3$), 1.83 (2H, s, Me$_3$Si—CH$_2$), 1.85 (6H, s, Cp-CH$_3$), 2.00 (6H, s, Cp-CH$_3$), 5.46 (1H, t, J$_{HH}$=2.4 Hz, Cp-CH), 5.58 (1H, t, J$_{HH}$=2.0 Hz, Cp-CH), 5.65 (1H, bs, Cp-CH) ppm.

Synthesis of Dimethylsilyl-(tetramethylcyclopentadienide)-(trimethylsilylmethylcyclopentadienide) hafnium dichloride, Me$_2$Si(Me$_4$Cp)-(Me$_3$SiCH$_2$Cp)HfCl$_2$ A solid HfCl$_4$ (410 mg, 1.3 mmol) was added to a precooled ethereal (10 mL) solution of Me$_2$Si(Me$_4$Cp)(Me$_3$SiCH$_2$Cp)Li$_2$ (440 mg, 1.3 mmol) at −25° C. The resulting mixture was stirred overnight at room temperature. Insoluble materials were filtered out and volatiles from the filtrate were removed in vacuo. The crude materials were washed with cold pentane to remove soluble impurities. The resulting materials were dried under vacuum to obtain the pale yellow crystalline solid of Me$_2$Si(Me$_4$Cp)(Me$_3$SiCH$_2$Cp)HfCl$_2$ in 280 mg (37.5%) yield. $^1$H NMR (400 MHz, CD$_2$Cl$_2$): δ −0.03 (9H, s, SiMe$_3$-CH$_3$), 0.79 (3H, s, SiMe$_2$-CH$_3$), 0.82 (3H, s, SiMe$_2$-CH$_3$), 1.92 (3H, s, Cp-CH$_3$), 1.99 (3H, s, Cp-CH$_3$), 2.03 (3H, s, Cp-CH$_3$), 2.07 (3H, s, Cp-CH$_3$), 2.12 (2H, d, J$_{HH}$=2.2 Hz, Me$_3$Si—CH$_2$), 5.03 (1H, t, J$_{HH}$=2.4 Hz, Cp-CH), 5.56 (1H, t, J$_{HH}$=2.7 Hz, Cp-CH), 6.32 (1H, t, J$_{HH}$=2.2 Hz, Cp-CH) ppm.

Complex D: Synthesis of Dimethylsilyl-(tetramethylcyclopentadienide)(trimethylsilylmethylcyclopentadienide) hafnium dimethyl, Me$_2$Si(Me$_4$Cp) (Me$_3$SiCH$_2$Cp)HfMe$_2$ An ethereal solution of MeMgBr (0.33 mL, 0.98 mmol) was added drop wise to a precooled diethyl ether solution of Me$_2$Si(Me$_4$Cp)(Me$_3$SiCH$_2$Cp)HfCl$_2$ (280 mg, 0.48 mmol) over a period of 3-5 minutes at −25° C. The resulting mixture was stirred overnight at room temperature to ensure completion of the reaction. Volatiles were removed in vacuo, and the crude materials were then extracted into pentane. Solvent removal afforded a sticky yellow material of Me$_2$Si(Me$_4$Cp)(Me$_3$SiCH$_2$Cp)HfMe$_2$ in 170 mg (66%) yield. $^1$H NMR (400 MHz, C$_6$D$_6$): δ −0.46 (3H, s, Hf—CH$_3$), −0.43 (3H, s, Hf—CH$_3$), 0.03 (9H, s, SiMe$_3$-CH$_3$), 0.41 (3H, s, SiMe$_2$-CH$_3$), 0.39 (3H, s, SiMe$_2$-CH$_3$), 1.71 (3H, s, Cp-CH$_3$), 1.76 (3H, s, Cp-CH$_3$), 2.00 (3H, s, Cp-CH$_3$), 2.02 (3H, s, Cp-CH$_3$), 2.06 (2H, bs, Me$_3$Si—CH$_2$), 4.99 (1H, t, J$_{HH}$=2.3 Hz, Cp-CH), 5.29 (1H, t, J$_{HH}$=2.6 Hz, Cp-CH), 6.33 (1H, t, J$_{HH}$=2.3 Hz, Cp-CH) ppm.

Synthesis of Diphenylsilyl-(2,3,4,5-tetramethyl-2,4-cyclopentadien-1-yl) chloride, Ph$_2$Si(Me$_4$CpH)C$_1$ A neat Ph$_2$SiCl$_2$ (10.188 g, 40.24 mmol) was dissolved in 200 mL of THF and cooled to −25° C., and to this a solid Me$_4$Cp-Li (5.156 g, 40.24 mmol) was added over a period of 5-10 minutes. The resulting mixture was stirred overnight at room temperature. Volatiles from the reaction mixture were removed in vacuo and triturated with hexane. The crude materials were extracted into hexane and further solvent removal in reduced pressure resulted a yellow oil of Ph$_2$Si(Me$_4$CpH)C$_1$ in 13.5 g (99.0%) yield. $^1$H NMR (400 MHz, C$_6$D$_6$): δ 1.58 (6H, s, Cp-CH$_3$), 1.81 (6H, s, Cp-CH$_3$), 3.53 (1H, bs, Cp-CH), 7.07-7.14 (6H, m, Ar—H), 7.57-7.60 (4H, m, Ar—H) ppm.

Synthesis of Diphenylsilyl-(2,3,4,5-tetramethyl-2,4-cyclopentadien-1-yl)(trifluoromethanesulfonate), Ph$_2$Si(Me$_4$CpH)(OTf)

A neat Ph$_2$Si(Me$_4$CpH)C$_1$ (8.46 g, 25.0 mmol) was dissolved in 200 mL of DCM and cooled to −25° C., and to this a solid silver trifluoromethanesulfonate (6.413 g, 25.0 mmol) was added over a period of 10-15 minutes. The resulting mixture was covered with aluminum foil and stirred overnight at room temperature. Insoluble byproduct AgCl was filtered out and volatiles from the filtrate were removed in vacuo to afford an orange semisolid of Ph$_2$Si(Me$_4$CpH)(OTf) in 10.3 g (91.1%) yield. $^1$H NMR (400 MHz, C$_6$D$_6$): δ 1.47 (6H, s, Cp-CH$_3$), 1.94 (6H, s, Cp-CH$_3$), 3.76 (1H, bs, Cp-CH), 7.12-7.14 (2H, m, Ar—H), 7.20-7.24 (4H, m, Ar—H), 7.60-7.65 (4H, m, Ar—H) ppm.

Synthesis of Diphenylsilyl-(2,3,4,5-tetramethyl-2,4-cyclopentadien-1-yl)((trimethylsilyl) methylcyclopentadiene), Ph$_2$Si(Me$_4$CpH)(Me$_3$SiCH$_2$CpH)

A solid Me$_3$SiCH$_2$CpLi (519 mg, 3.28 mmol) was added to a precooled ethereal solution of Ph$_2$Si(Me$_4$CpH)(OTf) (1.486 g, 3.28 mmol) at −25° C. The resulting mixture was stirred overnight at room temperature to ensure completion of the reaction. Volatiles from the reaction mixture were removed in vacuo and subsequently triturated with pentane. The crude materials were extracted into pentane and followed by solvent removal under reduced pressure afforded a thick yellow oil of Ph$_2$Si(Me$_4$CpH)(Me$_3$SiCH$_2$CpH) in 1.46 g (97.9%) yield. $^1$H NMR (400 MHz, C$_6$D$_6$): δ −0.13-0.08 (9H, m, SiMe$_3$-CH$_3$), 1.61-1.98 (14H, m, Cp-CH$_3$ and Me$_3$Si—CH$_2$), 3.67 (1H, bs, Cp-CH), 4.15 (1H, bs, Cp-CH), 5.76-6.70 (3H, m, Cp-CH), 7.25-7.31 (6H, m, Ar—H), 7.50-7.55 (1H, m, Ar—H), 7.70-7.74 (1H, m, Ar—H), 7.81-7.89 (2H, m, Ar—H) ppm.

Synthesis of Lithium diphenylsilyl-(tetramethylcyclopentadienide)-((trimethylsilyl) methylcyclopentadienide), Ph$_2$Si(Me$_4$Cp)(Me$_3$SiCH$_2$Cp)Li$_2$ A hexane solution of n-butyl lithium (2.6 mL, 6.5 mmol, 2.5 M solution) was added drop wise to a precooled solution of Ph$_2$Si(Me$_4$CpH)(Me$_3$SiCH$_2$CpH) (1.46 g, 3.2 mmol) in 30 mL of diethyl ether over a period of 5-10 minutes at −25° C. The resulting mixture was gradually warmed to room temperature and then continuously stirred overnight. Volatiles from the reaction mixture were removed in vacuo and triturated with pentane. The crude materials were thoroughly washed with pentane to remove any soluble impurities, and dried under vacuum to obtain the colorless crystalline solid of Ph$_2$Si(Me$_4$Cp)(Me$_3$SiCH$_2$Cp)Li$_2$ in 1.40 g (93.8%) yield. $^1$H NMR (400 MHz, THF-d$_8$): δ −0.04 (9H, s, SiMe$_3$-CH$_3$), 1.62 (4H, s, Cp-CH$_3$), 1.69 (2H, s, Me$_3$Si—CH$_2$), 1.73 (2H, s, Cp-CH$_3$), 1.94 (6H, s, Cp-CH$_3$), 5.61 (1H, t, J$_{HH}$=2.6 Hz, Cp-CH), 5.73 (1H, t, J$_{HH}$=2.2 Hz, Cp-CH), 5.84 (1H, t, J$_{HH}$=2.6 Hz, Cp-CH), 7.07-7.11 (4H, m, Ar—H), 7.19-7.23 (2H, m, Ar—H), 7.53-7.56 (1H, m, Ar—H), 7.65-7.70 (3H, m, Ar—H) ppm.

Synthesis of Diphenylsilyl-(tetramethylcyclopentadienide)-((trimethylsilyl) methylcyclopentadienide) hafnium dichloride. Ph$_2$Si(Me$_4$Cp)-(Me$_3$SiCH$_2$Cp)HfCl$_2$ A solid HfCl$_4$ (960 mg, 3.0 mmol) was added to a precooled ethereal (10 mL) solution of Ph$_2$Si(Me$_4$Cp)

(Me$_3$SiCH$_2$Cp)Li$_2$ (1.40 g, 3.0 mmol) at −25° C. The resulting mixture was stirred overnight at room temperature. Insoluble materials were filtered out and volatiles from the filtrate were removed in vacuo. The crude materials were washed with cold pentane to remove soluble impurities. The resulting materials were dried under vacuum to obtain the pale yellow crystalline solid of Ph$_2$Si(Me$_4$Cp)(Me$_3$SiCH$_2$Cp)HfCl$_2$ in 2.0 g (95.0%) yield. $^1$H NMR (400 MHz, CD$_2$Cl$_2$): δ −0.06 (9H, s, SiMe$_3$-CH$_3$), 1.52 (3H, s, Cp-CH$_3$), 1.58 (3H, s, Cp-CH$_3$), 2.03 (3H, s, Cp-CH$_3$), 2.08 (3H, s, Cp-CH$_3$), 2.18 (2H, bs, Me$_3$Si—CH$_2$), 5.25 (1H, t, J$_{HH}$=2.2 Hz, Cp-CH), 5.82 (1H, t, J$_{HH}$=2.6 Hz, Cp-CH), 6.47 (1H, t, J$_{HH}$=2.2 Hz, Cp-CH), 7.44-7.48 (6H, m, Ar—H), 7.94-8.01 (4H, m, Ar—H) ppm.

Complex E: Synthesis of Diphenylsilyl-(tetramethylcyclopentadienide) ((trimethylsilyl) methylcyclopentadienide) hafnium dimethyl, Ph$_2$Si(Me$_4$Cp)(Me$_3$SiCH$_2$Cp)HfMe$_2$ An ethereal solution of MeMgBr (3.63 mL, 5.8 mmol) was added drop wise to a precooled diethyl ether solution of Ph$_2$Si(Me$_4$Cp)(Me$_3$SiCH$_2$Cp)HfCl$_2$ (2.0 g, 2.85 mmol) over a period of 5-10 minutes at −25° C. The resulting mixture was stirred overnight at room temperature to ensure completion of the reaction. Volatiles were removed in vacuo and the crude materials were then extracted into pentane. Solvent removal afforded an off-white crystalline material of Ph$_2$Si(Me$_4$Cp)(Me$_3$SiCH$_2$Cp)HfMe$_2$ in 1.2 g (63.6%) yield. $^1$H NMR (400 MHz, C$_6$D$_6$): δ −0.41 (3H, s, Hf—CH$_3$), −0.38 (3H, s, Hf—CH$_3$), 0.15 (9H, s, SiMe$_3$-CH$_3$), 1.52 (3H, s, Cp-CH$_3$), 1.55 (3H, s, Cp-CH$_3$), 2.03 (3H, s, Cp-CH$_3$), 2.04 (3H, s, Cp-CH$_3$), 2.11 (2H, bs, Me$_3$Si—CH$_2$), 5.36 (1H, t, J$_{HH}$=2.2 Hz, Cp-CH), 5.69 (1H, t, J$_{HH}$=2.6 Hz, Cp-CH), 6.48 (1H, t, J$_{HH}$=2.2 Hz, Cp-CH), 7.19-7.23 (6H, m, Ar—H), 7.96-8.07 (4H, m, Ar—H) ppm.

Synthesis of Rac-meso-dimethylsilyl-bis((trimethylsilyl) methylcyclopentadienide)zirconium dichloride, Me$_2$Si((Me$_3$SiCH$_2$Cp)$_2$ZrCl$_2$ A solid ZrCl$_4$.dme (2.1 g, 6.5 mmol) was added to a precooled diethyl ether (60 mL) solution of Me$_2$Si(Me$_3$SiCH$_2$Cp)$_2$Li$_2$ (2.67 g, 6.5 mmol) at −25° C. The resulting mixture was stirred overnight at room temperature. Insoluble materials were filtered out and volatiles from the filtrate were removed in vacuo. The resulting materials were dried under vacuum to obtain a pale yellow crystalline solid of Me$_2$Si((Me$_3$Si)CH$_2$Cp)$_2$ZrCl$_2$ in 3.2 g (94.5%) yield. The $^1$H NMR spectrum of purified compound integrated a ~1:1 ratio of rac/meso isomers. $^1$H NMR (400 MHz, CD$_2$Cl$_2$): δ −0.03 (18H, s, SiMe$_3$-CH$_3$), −0.02 (18H, s, SiMe$_3$-CH$_3$), −0.65 (3H, s, SiMe$_2$-CH$_3$, meso), −0.67 (6H, s, SiMe$_2$-CH$_3$, rac), −0.70 (3H, s, SiMe$_2$-CH$_3$, meso), 2.05-2.19 (8H, m, Me$_3$Si—CH$_2$), 5.23 (2H, t, J$_{HH}$=2.4 Hz, Cp-CH), 5.37 (2H, t, J$_{HH}$=2.4 Hz, Cp-CH), 5.73 (2H, t, J$_{HH}$=2.7 Hz, Cp-CH), 5.88 (2H, t, J$_{HH}$=2.7 Hz, Cp-CH), 6.32 (2H, t, J$_{HH}$=2.7 Hz, Cp-CH), 6.45 (2H, t, J$_{HH}$=2.7 Hz, Cp-CH) ppm.

Complex F: Synthesis of Rac-meso-dimethylsilyl-bis((trimethylsilyl) methylcyclopentadienide)zirconium dimethyl, Me$_2$Si((Me$_3$SiCH$_2$Cp)$_2$ZrMe$_2$ An ethereal solution of MeMgBr (4.6 mL, 13.83 mmol) was added drop wise to a precooled diethyl ether solution (100 mL) of Me$_2$Si((Me$_3$Si)CH$_2$-Cp)$_2$ZrCl$_2$ (3.565 g, 6.84 mmol) over a period of 5-10 minutes at −25° C. The resulting mixture was stirred overnight at room temperature to ensure completion of the reaction. Volatiles from the filtrate were removed under vacuum, and then the crude materials were extracted into pentane. Solvent removal in vacuo afforded a semi-crystalline yellow material of Me$_2$Si((Me$_3$Si)CH$_2$-Cp)$_2$ZrMe$_2$ in 2.6 g (79.2%) yield. The $^1$H NMR spectrum of final material integrated a ~1:1 ratio of rac/meso isomers. $^1$H NMR (400 MHz, C$_6$D$_6$): δ −0.07 (3H, s, Zr—CH$_3$, meso), −0.07 (6H, s, Zr—CH$_3$, rac), −0.03 (3H, s, Zr—CH$_3$, meso), 0.04 (18H, s, SiMe$_3$-CH$_3$), 0.05 (18H, s, SiMe$_3$-CH$_3$), 0.16 (3H, s, SiMe$_2$-CH$_3$, meso), 0.18 (6H, s, SiMe$_2$-CH$_3$, rac), 0.20 (3H, s, SiMe$_2$-CH$_3$, meso), 2.06 (4H, s, Me$_3$Si—CH$_2$, rac), 2.10 (4H, s, Me$_3$Si—CH$_2$, meso), 5.10 (2H, t, J$_{HH}$=2.2 Hz, Cp-CH, meso), 5.16 (2H, t, J$_{HH}$=2.2 Hz, Cp-CH, rac), 5.41 (2H, t, J$_{HH}$=2.6 Hz, Cp-CH, rac), 5.51 (2H, t, J$_{HH}$=2.6 Hz, Cp-CH, meso), 6.37 (2H, t, J$_{HH}$=2.6 Hz, Cp-CH, meso), 6.41 (2H, t, J$_{HH}$=2.6 Hz, Cp-CH, rac) ppm.

Synthesis of Dimethylsilyl-(tetramethylcyclopentadienide)-((trimethylsilyl) methylcyclopentadienide) zirconium dichloride. Me$_2$Si(Me$_4$Cp)(Me$_3$SiCH$_2$Cp)ZrCl$_2$ A solid ZrCl$_4$.dme (727 mg, 2.25 mmol) was added to a precooled ethereal (20 mL) solution of Me$_2$Si(Me$_4$Cp)(Me$_3$SiCH$_2$Cp)Li$_2$ (770 mg, 2.25 mmol) at −25° C. The resulting mixture was stirred overnight at room temperature. During the time, the reaction mixture turned to orange along with colorless LiCl solid byproduct. Insoluble materials were filtered out and volatiles from filtrate were removed in vacuo. The resulting materials were dried under vacuum to obtain the yellowish-orange solid of Me$_2$Si(Me$_4$Cp)(Me$_3$SiCH$_2$Cp)ZrCl$_2$ in 1.07 g (96.5%) yield. $^1$H NMR (400 MHz, CD$_2$Cl$_2$): δ −0.02 (9H, s, SiMe$_3$-CH$_3$), 0.80 (3H, s, SiMe$_2$-CH$_3$), 0.83 (3H, s, SiMe$_2$-CH$_3$), 1.85 (3H, s, Cp-CH$_3$), 1.92 (3H, s, Cp-CH$_3$), 2.01 (3H, s, Cp-CH$_3$), 2.05 (3H, s, Cp-CH$_3$), 2.12 (2H, d, J$_{HH}$=6.6 Hz, Me$_3$Si—CH$_2$), 5.09 (1H, t, J$_{HH}$=2.6 Hz, Cp-CH), 5.62 (1H, t, J$_{HH}$=2.8 Hz, Cp-CH), 6.42 (1H, t, J$_{HH}$=2.6 Hz, Cp-CH) ppm.

Complex G: Synthesis of Dimethylsilyl-(tetramethylcyclopentadienide) ((trimethylsilyl) methylcyclopentadienide)zirconium dimethyl, Me$_2$Si(Me$_4$Cp)(Me$_3$SiCH$_2$Cp)ZrMe$_2$ An ethereal solution of MeMgBr (1.5 mL, 4.4 mmol) was added drop wise to a precooled diethyl ether solution of Me$_2$Si(Me$_4$Cp)(Me$_3$SiCH$_2$Cp)ZrCl$_2$ (1.07 g, 2.18 mmol) over a period of 3-5 minutes at −25° C. The resulting mixture was stirred overnight at room temperature to ensure completion of the reaction. Volatiles were removed in vacuo, and the crude materials were then extracted into pentane. Solvent removal afforded a beige material of Me$_2$Si(Me$_4$Cp)(Me$_3$SiCH$_2$Cp)ZrMe$_2$ in 840 mg (85.6%) yield. $^1$H NMR (400 MHz, C$_6$D$_6$): δ −0.30 (3H, s, Zr—CH$_3$), −0.28 (3H, s, Zr—CH$_3$), −0.04 (9H, s, SiMe$_3$-CH$_3$), 0.38 (3H, s, SiMe$_2$-CH$_3$), 0.40 (3H, s, SiMe$_2$-CH$_3$), 1.67 (3H, s, Cp-CH$_3$), 1.72 (3H, s, Cp-CH$_3$), 2.00 (3H, s, Cp-CH$_3$), 2.02 (3H, s, Cp-CH$_3$), 2.06 (1H, s, Me$_3$Si—CH$_2$), 2.07 (1H, s, Me$_3$Si—CH$_2$), 5.02 (1H, t, J$_{HH}$=2.2 Hz, Cp-CH), 5.33 (1H, t, J$_{HH}$=2.6 Hz, Cp-CH), 6.43 (1H, t, J$_{HH}$2.4 Hz, Cp-CH) ppm.

Synthesis of Diphenylsilyl-(tetramethylcyclopentadienide)-((trimethylsilyl) methylcyclopentadienide) zirconium dichloride dimethoxyethane complex, Ph$_2$Si(Me$_4$Cp)-(Me$_3$SiCH$_2$Cp)ZrCl$_2$-dme A solid ZrCl$_4$.dme (742 mg, 2.3 mmol) was added to a precooled ethereal (20 mL) solution of Ph$_2$Si(Me$_4$Cp)

(Me$_3$SiCH$_2$Cp)Li$_2$ (1.044 g, 2.3 mmol) at −2° C. The resulting mixture was stirred overnight at room temperature. Insoluble materials were filtered out and volatiles from the filtrate were removed in vacuo. The resulting materials were dried under vacuum to obtain the pale yellow crystalline solid of Ph$_2$Si(Me$_4$Cp)(Me$_3$SiCH$_2$Cp)ZrCl$_2$-dme in 904 mg (55.7%) yield. $^1$H NMR (400 MHz, CD$_2$Cl$_2$): δ 0.07 (9H, s, SiMe$_3$-CH$_3$), 1.45 (3H, s, Cp-CH$_3$), 1.51 (3H, s, Cp-CH$_3$), 2.01 (3H, s, Cp-CH$_3$), 2.05 (3H, s, Cp-CH$_3$), 2.07 (2H, s, Me$_3$Si—CH$_2$), 3.39 (6H, s, dme-OCH$_3$), 3.54 (4H, s, dme-CH$_2$), 5.30 (1H, t, $J_{HH}$=2.2 Hz, Cp-CH), 5.88 (1H, t, $J_{HH}$=2.8 Hz, Cp-CH), 6.56 (1H, t, $J_{HH}$=2.6 Hz, Cp-CH), 7.43-7.47 (6H, m, Ar—H), 7.94-8.02 (4H, m, Ar—H) ppm.

Complex H: Synthesis of Diphenylsilyl-(tetramethylcyclopentadienide) ((trimethylsilyl) methylcyclopentadienide)zirconium dimethyl, Ph$_2$Si(Me$_4$Cp)(Me$_3$SiCH$_2$Cp)ZrMe$_2$ An ethereal solution of MeMgBr (1.62 mL, 2.59 mmol) was added drop wise to a precooled diethyl ether solution of Ph$_2$Si(Me$_4$Cp)(Me$_3$SiCH$_2$Cp)ZrCl$_2$ (904 mg, 1.28 mmol) over a period of 3-5 minutes at −25° C. The resulting mixture was stirred overnight at room temperature to ensure completion of the reaction. Volatiles were removed in vacuo, and the crude materials were then extracted into pentane. Solvent removal afforded an organic viscous material of Ph$_2$Si(Me$_4$Cp)(Me$_3$SiCH$_2$Cp)ZrMe$_2$ in 650 mg (88.4%) yield. $^1$H NMR (400 MHz, C$_6$D$_6$): δ −0.29 (3H, s, Zr—CH$_3$), −0.27 (3H, s, Zr—CH$_3$), 0.11 (9H, s, SiMe$_3$-CH$_3$), 1.43 (3H, s, Cp-CH$_3$), 1.47 (3H, s, Cp-CH$_3$), 1.99 (3H, s, Cp-CH$_3$), 2.00 (3H, s, Cp-CH$_3$), 2.04 (2H, s, Me$_3$Si—CH$_2$), 5.35 (1H, t, $J_{HH}$=2.2 Hz, Cp-CH), 5.69 (1H, t, $J_{HH}$=2.6 Hz, Cp-CH), 6.54 (1H, t, $J_{HH}$=2.2 Hz, Cp-CH), 7.18-7.20 (6H, m, Ar—H), 7.92-8.02 (4H, m, Ar—H) ppm.

Synthesis of Dimethylgermyl-bis((trimethylsilyl) methylcyclopentadiene), Me$_2$Ge((Me$_3$Si)CH$_2$CpH)$_2$ A neat Me$_2$GeCl$_2$ (1.0 g, 5.76 mmol) was dissolved in 20 mL of THF and cooled to −25° C. A solid (Me$_3$Si)CH$_2$CpLi (1.821 g, 11.52 mmol) was added to the above mixture and the resulting mixture was stirred overnight at room temperature to ensure completion of the reaction. Volatiles from the reaction mixture were removed in vacuo and subsequently triturated with pentane to remove trace of THF. The crude materials were extracted into pentane and followed by solvent removal under vacuum afforded a thick yellow viscous oil of Me$_2$Ge((Me$_3$Si)CH$_2$CpH)$_2$ in 2.14 g (83.8%) yield. $^1$H NMR (400 MHz, C$_6$D$_6$): δ −0.01 (6H, bs, GeMe$_2$-CH$_3$), 0.05 (18H, s, SiMe$_3$-CH$_3$), 1.88 (4H, s, Me$_3$Si—CH$_2$), 3.50 (2H, bs, Cp-CH), 6.33 (6H, bs, Cp-CH) ppm.

Synthesis of Lithium dimethylgermyl-bis((trimethylsilyl) methylcyclopentadienide), Me$_2$Ge((Me$_3$Si)CH$_2$Cp)$_2$Li$_2$ A hexane solution of n-butyl lithium (3.92 mL, 9.8 mmol, 2.5 M solution) was added drop wise to a precooled solution of Me$_2$Ge((Me$_3$Si)CH$_2$CpH)$_2$ (2.14 g, 4.83 mmol) in 50 mL of THF over a period of 3-5 minutes at −25° C. The resulting mixture was gradually warmed to room temperature and then continuously stirred overnight. Volatiles from the reaction mixture were removed in vacuo, and triturated with pentane. The crude materials were thoroughly washed with pentane to remove any soluble impurities, and dried under vacuum to obtain the colorless crystalline solid of Me$_2$Ge((Me$_3$Si)CH$_2$Cp)$_2$Li$_2$ in 1.43 g (65.1%) yield. $^1$H NMR (400 MHz, THF-d$_8$): δ −0.05 (18H, s, SiMe$_3$-CH$_3$), 0.28 (6H, s, GeMe$_2$-CH$_3$), 1.90 (4H, s, Me$_3$Si—CH$_2$), 5.53-5.55 (2H, m, Cp-CH), 5.61-5.62 (2H, m, Cp-CH), 5.73-5.75 (2H, m, Cp-CH) ppm.

Synthesis of Rac-meso-dimethylgermyl-bis((trimethylsilyl) methylcyclopentadienide)hafnium dichloride, Me$_2$Ge((Me$_3$Si)CH$_2$Cp)$_2$HfCl$_2$ A solid HfCl$_4$ (1.005 g, 3.14 mmol) was added to a precooled diethyl ether (50 mL) solution of Me$_2$Ge((Me$_3$Si)CH$_2$Cp)$_2$Li$_2$ (1.43 g, 3.14 mmol) at −25° C. The resulting mixture was stirred overnight at room temperature. Insolubles were filtered out, and volatiles from filtrate were removed under reduced pressure to give a yellow crystalline solid of Me$_2$Ge((Me$_3$Si)CH$_2$-Cp)$_2$HfCl$_2$ in 1.74 g (84.9%) yield. The $^1$H NMR spectrum of final material integrated a ~1:1 ratio of rac/meso isomers. $^1$H NMR (400 MHz, CD$_2$Cl$_2$): δ −0.04 (18H, s, SiMe$_3$-CH$_3$), −0.03 (18H, s, SiMe$_3$-CH$_3$), 0.82 (3H, s, GeMe$_2$-CH$_3$, meso), 0.83 (6H, s, GeMe$_2$-CH$_3$, rac), 0.86 (3H, s, GeMe$_2$-CH$_3$, meso), 2.07-2.20 (8H, m, Me$_3$Si—CH$_2$), 5.18 (2H, t, $J_{HH}$=2.3 Hz, Cp-CH), 5.32 (2H, t, $J_{HH}$=2.8 Hz, Cp-CH), 5.67 (2H, t, $J_{HH}$=2.7 Hz, Cp-CH), 5.80 (2H, t, $J_{HH}$=2.7 Hz, Cp-CH), 6.19 (2H, t, $J_{HH}$=2.2 Hz, Cp-CH), 6.33 (2H, t, $J_{HH}$=2.2 Hz, Cp-CH) ppm.

Complex I: Synthesis of Rac-meso-dimethylgermyl-bis((trimethylsilyl) methylcyclopentadienide)hafnium dimethyl, Me$_2$Ge((Me$_3$Si)CH$_2$Cp)$_2$HfMe$_2$ An ethereal solution of MeMgBr (1.8 mL, 5.4 mmol) was added drop wise to a precooled diethyl ether solution of Me$_2$Ge((Me$_3$Si)CH$_2$-Cp)$_2$HfCl$_2$ (1.74 g, 2.7 mmol) over a period of 3-5 minutes at −25° C. The resulting mixture was stirred overnight at room temperature to ensure completion of the reaction. Volatiles from the reaction mixture were removed under vacuum, and then the crude materials were extracted into pentane. Solvent removal in vacuo afforded a sticky yellow material of Me$_2$Ge((Me$_3$Si)CH$_2$-Cp)$_2$HfMe$_2$ in 1.23 g (74.6%) yield. The $^1$H NMR spectrum of final material integrated a ~1:1 ratio of rac/meso isomers. $^1$H NMR (400 MHz, C$_6$D$_6$): δ −0.22 (6H, s, Hf—CH$_3$, rac), −0.21 (3H, s, Hf—CH$_3$, meso), −0.19 (3H, s, Hf—CH$_3$, meso), 0.04 (18H, s, SiMe$_3$-CH$_3$), 0.05 (18H, s, SiMe$_3$-CH$_3$), 0.28 (3H, s, GeMe$_2$-CH$_3$, meso), 0.30 (6H, s, GeMe$_2$-CH$_3$, rac), 0.33 (3H, s, GeMe$_2$-CH$_3$, meso), 2.07 (2H, s, Me$_3$Si—CH$_2$, meso), 2.08 (2H, s, Me$_3$Si—CH$_2$, meso), 2.12 (4H, s, Me$_3$Si—CH$_2$, rac), 5.09 (2H, t, $J_{HH}$=2.2 Hz, Cp-CH, meso), 5.13 (2H, t, $J_{HH}$=2.2 Hz, Cp-CH, rac), 5.35 (2H, t, $J_{HH}$=2.6 Hz, Cp-CH, rac), 5.44 (2H, t, $J_{HH}$=2.6 Hz, Cp-CH, meso), 6.26 (2H, t, $J_{HH}$=2.6 Hz, Cp-CH, meso), 6.30 (2H, t, $J_{HH}$=2.6 Hz, Cp-CH, rac) ppm.

Supported Catalyst X (Comparative)

Supported (nPrCp)$_2$HfMe$_2$ was made according to the general procedures described in U.S. Pat. No. 7,179,876 using SMAO-875C as a support. SMAO-875C was prepared as follows. In a 4 L stirred vessel in the drybox methylaluminoxane (MAO) (30 wt % in toluene) was added along with 2400 g of toluene. This solution was then stirred at 60 RPM for 5 minutes. Next, ES-70™ silica (PQ Corporation, Conshohocken, Pa.)) that had been calcined at 875° C. was added to the vessel. This slurry was heated to 100° C. and stirred at 120 RPM for 3 hours. The temperature was then lowered to 25° C. and cooled to temperature over 2 hours. Once cooled, the vessel was set to 8 RPM and placed under vacuum for 72 hours. After emptying the vessel and sieving the supported MAO, 1079 g was collected.

Supported Catalyst A

A 1.0 g amount of prepared SMAO 875C was stirred in 10 mL of toluene using a Celstir™ flask. rac-dimethylsilyl bis(trimethylsilylmethylene-cyclopentadienide) hafnium dimethyl (22.7 mg, 40 µmol) was added to the slurry and stirred for three hours. The mixture was filtered, washed with several 10 mL portions of hexane and then dried under vacuum, yielding 0.87 g of white silica.

Supported Catalyst B

A 0.81 g amount of prepared SMAO 875C was stirred in 10 mL of toluene using a Celstir™ flask. rac-dimethylsilyl bis(trimethylsilylmethylene-cyclopentadienide) hafnium dimethyl (18.6 mg, 33 µmol) was added to the slurry and stirred for three hours. The mixture was filtered, washed with several 10 mL portions of hexane and then dried under vacuum, yielding 0.74 g of white silica.

Supported Catalyst C

A 1.0 g amount of prepared SMAO 875C was stirred in 10 mL of toluene using a Celstir™ flask. Dimethylgermanium bis(trimethylsilylmethylene-cyclopentadienide) hafnium dimethyl (18.5 mg, 40 µmol) was added to the slurry and stirred for three hours. The mixture was filtered, washed with several 10 mL portions of hexane and then dried under vacuum, yielding 0.91 g of white silica.

Supported Catalyst D

A 1.0 g amount of prepared SMAO 875C was stirred in 10 mL of toluene using a Celstir™ flask. dimethylsilyl (tetramethylcyclopentadienide)(trimethylsilylmethylene-cyclopentadienide)hafnium dimethyl (21.2 mg, 40 µmol) was added to the slurry and stirred for three hours. The mixture was filtered, washed with several 10 mL portions of hexane and then dried under vacuum, yielding 0.81 g of white silica.

Supported Catalyst E

A 1.0 g amount of prepared SMAO 875C was stirred in 10 mL of toluene using a Celstir™ flask. dimethylsilyl (tetramethylcyclopentadienide)(trimethylsilylmethylene-cyclopentadienide)zirconium(IV) dimethyl (18.0 mg, 40 µmol) was added to the slurry and stirred for three hours. The mixture was filtered, washed with several 10 mL portions of hexane and then dried under vacuum, yielding 0.91 g of white silica.

1. Preparation of Fluorided Silica Support (F-D948)

1.18 g $(NH_4)_2SiF_6$ (6.6 mmol, 0.79 mmol F/g silica) was dissolved in 7.00 g water in a 20 ml glass vial. 50 g of Grace Davison D948™ silica ("D948") and 200 g of toluene were combined in a 250 ml Wheaton CELSTIR™ mixer. Under vigorous stirring, the aqueous stock solution of $(NH_4)_2SiF_6$ was added via a syringe to the toluene slurry of silica. The mixture was allowed to stir at room temperature for 16 hours. The slurry was filtered through a 110 ml Optichem™ disposable polyethylene frit, rinsed with 200 g pentane three times, then dried in air overnight to yield a white, free-flowing solid. The solid was transferred into a tube furnace, and was heated under constant nitrogen flow (temperature program: 25° C./h ramped to 150° C.; held at 150° C. for 4 hours; 50° C./h ramped to 200° C.; held at 200° C. for 4 hours; cooled down to room temperature). 46 g of F-D948 silica was collected.

2. Preparation of sMAO-F-D948 from F-D948 Silica

In a drybox, 45.1 g methylalumoxane (MAO) toluene solution (Albermarle, 13.6 wt % Al) and 120 g of anhydrous toluene were combined in a 250 ml Wheaton CELSTIR™ mixer. The stirring rate was set to 500 rpm. 36.0 g of F-D948 silica was slowly added to the Celstir mixer in 5 g increments. The resulting slurry was allowed to stir at room temperature for 15 minutes. Then the Celstir mixer was placed in a sand bath heated to 100° C. The slurry was heated at 100° C. for an additional 3 hours at a stirring rate of 200 rpm. The final slurry was filtered through a 110 ml Optichem disposable polyethylene frit. The solid collected in the frit was first rinsed with 120 g toluene, then 80 g pentane for 2 times. The solid was dried in-vacuo for 16 hours. 49.7 g of sMAO-F-D948 was obtained.

3. Preparation of Supported Catalysts with sMAO-F-D948

A 1.0 g amount of sMAO-F-D948 was stirred in 10 mL of toluene using a Celstir™ flask. Catalyst compound was added to the slurry and stirred for three hours. The mixture was filtered, washed with several 10 mL portions of hexane and then dried under vacuum. The data are reported in Table A below.

TABLE A

Supported Catalysts Preparations

| Supported Catalyst | Catalyst compound | Catalyst compound Mw (g/mol) | Weight (mg) of catalyst compound | Support sMAO-F-D948 (g) | Metal loading (umol/g) | Yield of Supported Cat (g) |
|---|---|---|---|---|---|---|
| $A_F$ | A | 567 | 11.3 | 0.5262 | 38.0 | 0.5064 |
| $B_F$ | B | 567 | 12.0 | 0.5251 | 40.3 | 0.5142 |
| $D_F$ | D | 537 | 11.1 | 0.5013 | 41.2 | 0.4814 |
| $C_F$ | C | 691 | 12.2 | 0.5052 | 34.9 | 0.4937 |
| $E_F$ | E | 661 | 13.7 | 0.4967 | 41.7 | 0.4603 |
| Hf | H | 574 | 9.0 | 0.4933 | 40.5 | 0.4705 |

Polymerization with Organosilica Support Catalyst Systems

A 2 L autoclave was heated to 110° C. and purged with $N_2$ for at least 30 minutes. It was charged with dry NaCl (350 g; Fisher, S271-10 dehydrated at 180° C. and subjected to several pump/purge cycles and finally passed through a 16 mesh screen prior to use) and SMAO 875C (5 g) at 105° C. and stirred for 30 minutes. The temperature was adjusted to 85° C. At a pressure of 2 psig $N_2$, dry, degassed 1-hexene (2.0 mL) was added to the reactor with a syringe then the reactor was charged with $N_2$ to a pressure of 20 psig. A mixture of $H_2$ and $N_2$ was flowed into reactor (200 SCCM; 10% $H_2$ in $N_2$) while stirring the bed.

Catalysts indicated in Table B were injected into the reactor with ethylene at a pressure of 220 psig; ethylene flow was allowed over the course of the run to maintain constant pressure in the reactor. 1-hexene was fed into the reactor as a ratio to ethylene flow (0.1 g/g). Hydrogen was fed to the reactor as a ratio to ethylene flow (0.5 mg/g). The hydrogen and ethylene ratios were measured by on-line GC analysis. Polymerizations were halted after 1 hour by venting the reactor, cooling to room temperature then exposing to air. The salt was removed by washing with water two times; the polymer was isolated by filtration, briefly washed with acetone and dried in air for at least for two days.

TABLE B

Gas Phase Polymerization of Ethylene and 1-Hexene

| Supported Catalyst | MI dg/min | MIR | Mw g/mol | Mn g/mol | Mw/Mn | Hexene wt % | Activity gP/gsup. Cat. | g'(vis) |
|---|---|---|---|---|---|---|---|---|
| X | 1.23 | 18 | 105,000 | 33,043 | 3.17 | 11.1 | 8000 | 0.984 |
| A | 2.52 | 25 | 86943 | 30000 | 2.90 | 10.10 | 11200 | 1.00 |
| B | 2.12 | 42 | 71922 | 23500 | 3.05 | 13.5 | 12246 | 0.991 |
| D | 2.5 | 28 | | | | | 11,210 | |
| H | 10.1 | NA | 40274 | 15077 | 2.67 | 9.57 | 31,000 | 0.972 |

Figure 2:
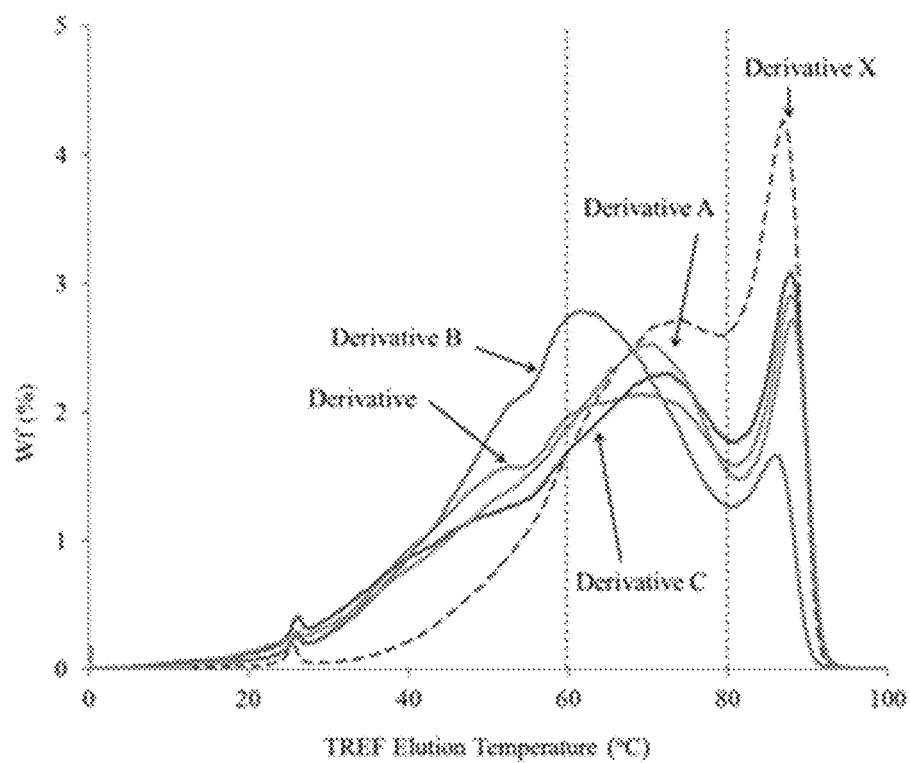
FIG. 2 is a Temperature Rising Elution Fractionation graph for examples in Table B.

The examples in Table B were then subjected to Temperature Rising Elution Fractionation. The resulting data (Supported Catalysts A, B, X and D, also referred to as derivatives A, B, X and D,) are shown in FIG. 2. The line labeled "derivative" that has no letter is D.

Polymerization with Fluorided Organosilica Support Catalyst Systems

Catalysts indicated in Table C were injected into the reactor with ethylene at a pressure of 220 psig; ethylene flow was allowed over the course of the run to maintain constant pressure in the reactor. 1-hexene was fed into the reactor as a ratio to ethylene flow (0.1 g/g). Hydrogen was fed to the reactor as a ratio to ethylene flow (0.5 mg/g). The hydrogen and ethylene ratios were measured by on-line GC analysis. Polymerizations were halted after 1 hour by venting the reactor, cooling to room temperature then exposing to air. The salt was removed by washing with water two times; the polymer was isolated by filtration, briefly washed with acetone and dried in air for at least for two days. Characterization data are reported in Tables C, D, and E.

TABLE C

Gas Phase Polymerization of Ethylene and 1-Hexene with Catalyst supported on Fluorided-Support (sMAO-F-D948)

| Supported Catalyst | MI dg/min | MIR | Mw g/mol | Mn g/mol | Mw/Mn | Hexene wt % | Activity gP/gsup. Cat. | g'(vis) | Tm(° C.) | CMR |
|---|---|---|---|---|---|---|---|---|---|---|
| A | 2.8 | 30 | 89383 | 32100 | 2.79 | 13.84 | 12988 | 1 | 117 | 8.0 |
| B | 2.3 | 38 | 83400 | 27200 | 3.06 | 12.65 | 12974 | 0.958 | 112.7 | 19.6 |
| C | 3.2 | 30.5 | 74500 | 26900 | 2.77 | 10.4 | 10418 | 0.976 | 117 | 6.2 |
| D | 2.8 | 27 | 82952 | 25507 | 3.25 | 10.1 | 15936 | 0.953 | 119 | 3.5 |
| H | 12 | | | | | | 10475 | | | |
| X | | | | | | | | | 117 | 6.83 |

TABLE D

4D GPC Measurement of Hexene

| Supported Catalyst from Table A | Hexene Wt % | RCI, m | CDR2, m |
|---|---|---|---|
| A | 13.84 | 16.7 | 1.08 |
| B | 12.65 | 4.26 | 1.1 |
| C | 10.4 | 5.5 | 1.02 |
| D | 10.1 | 14.07 | 1.15 |
| X | 8.36* | 87.37 | 2.07 |

TABLE E

Ethylene-Hexene Triad Distributions of Examples from Table B

| Sample Description | A | B | D | C | X | E |
|---|---|---|---|---|---|---|
| | \multicolumn{6}{c}{triad mole fraction} | | | | | |
| EEE | 0.8670 | 0.8646 | 0.8851 | 0.8790 | 0.8845 | 0.8715 |
| HEE | 0.0869 | 0.0866 | 0.0763 | 0.0798 | 0.0763 | 0.0836 |
| HEH | 0.0008 | 0.0024 | 0.0000 | 0.0004 | 0.0004 | 0.0010 |
| EHE | 0.0414 | 0.0417 | 0.0357 | 0.0379 | 0.0366 | 0.0400 |
| EHH | 0.0040 | 0.0047 | 0.0029 | 0.0030 | 0.0023 | 0.0039 |
| HHH | 0.0000 | 0.0000 | 0.0000 | 0.0000 | 0.0000 | 0.0000 |
| Mole ethylene | 95.57% | 95.42% | 96.25% | 95.96% | 96.19% | 95.65% |
| Mole hexene | 4.43% | 4.58% | 3.75% | 4.04% | 3.81% | 4.35% |
| Wt % ethylene | 87.79 | 87.42 | 89.53 | 88.78 | 89.38 | 88.01 |
| Wt % hexene | 12.21 | 12.58 | 10.47 | 11.22 | 10.62 | 11.99 |

The resins from Table C were analyzed using analytical TREF methodology (see FIG. 2.) Analysis of the TREF curves shows the composition of the resins is different from that of the resin produced using comparative catalyst X (see Table C).

| Analysis of m-LLDPE Resins Produced using Bridged Metallocene Catalysts From Tables C and B | | | | | | | | |
|---|---|---|---|---|---|---|---|---|
| | | | | | | TREF | | |
| | Composition (%) by TREF Analysis by Derivative | | | | | Mole % Hexene 13C and | Mole % BP by 1H-NMR | Average Ethylene Run Length (#) | Crystallinity |
| Elution Temp (° C.) | A | B | C | D | X | 1H-NMR | 100 C(Chain) | 13C NMR | (%) |
| 60 Max | 15 | 14 | 15 | 14 | 6 | >5 | >2 | <20 | <20 |
| 60 to 80 | 32 | 35 | 31 | 33 | 29 | 2 to 5 | 1 to 2 | 20 to 50 | 20 to 40 |
| 80 Min | 53 | 51 | 54 | 53 | 65 | <2 | <1 | >50 | >40 |

TABLE F

Calculation of unsaturations (Vinyl groups) per 1000 Carbons

| Catalysts from Table A | B | D | C | X | E | A |
|---|---|---|---|---|---|---|
| Vy1 and Vy2 (I) | 0.16 | 0.05 | 0.13 | 0.02 | 0.05 | 0.13 |
| Vy5 (T) | 0.07 | 0.03 | 0.06 | 0.02 | 0.04 | 0.07 |
| Trisubstituted olefins (I) | 0.08 | 0.02 | 0.03 | 0.03 | 0.03 | 0.06 |
| Vinyls (T) | 0.00 | 0.02 | 0.00 | 0.01 | 0.02 | 0.02 |
| Vinylidenes (T) | 0.02 | 0.02 | 0.01 | 0.01 | 0.02 | 0.02 |
| Total terminal db | 0.09 | 0.07 | 0.07 | 0.04 | 0.08 | 0.11 |
| total internal db | 0.23 | 0.08 | 0.16 | 0.05 | 0.09 | 0.19 |
| Total unsaturations | 0.33 | .14 | 0.23 | 0.09 | 0.17 | 0.30 |
| Total I/Total T | 2.56 | 1.14 | 2.28 | 1.25 | 1.12 | 1.73 |

All documents described herein are incorporated by reference herein, including any priority documents and/or testing procedures to the extent they are not inconsistent with this text. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including." Likewise whenever a composition, an element or a group of elements is preceded with the transitional phrase "comprising," it is understood that we also contemplate the same composition or group of elements with transitional phrases "consisting essentially of," "consisting of," "selected from the group consisting of," or "is" preceding the recitation of the composition, element, or elements and vice versa.

We claim:

1. A catalyst compound represented by the formula (A):

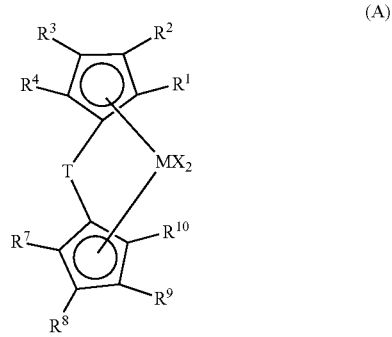

where:
M is Hf or Zr;
each $R^1$, $R^2$, and $R^4$ is independently hydrogen, an alkoxide, or a $C_1$ to $C_{40}$ substituted or unsubstituted hydrocarbyl group;
$R^3$ is independently hydrogen, an alkoxide, a $C_1$ to $C_{40}$ substituted or unsubstituted hydrocarbyl group, $-CH_2-SiR'_3$, or $-CH_2-CR'_3$, wherein each R' is independently hydrogen or a $C_1$ to $C_{20}$ substituted or unsubstituted hydrocarbyl, provided that at least one R' is not H;
each $R^7$, $R^8$, and $R^{10}$ is independently hydrogen, alkoxide or a $C_1$ to $C_{40}$ substituted or unsubstituted hydrocarbyl group;
$R^9$ is $-CH_2-SiR'_3$;
T is a bridging group; and
each X is, independently, a univalent anionic ligand, or two X are joined and bound to the metal atom to form a metallocycle ring, or two X are joined to form a chelating ligand, a diene ligand, or an alkylidene ligand.

2. The catalyst compound of claim 1, wherein M is Hf.

3. The catalyst compound of claim 1, wherein $R^3$ is $-CH_2-SiR'_3$ or $-CH_2-CR'_3$.

4. The catalyst compound of claim 1, wherein $R^3$ is hydrogen, an alkoxide or a $C_1$ to $C_{40}$ substituted or unsubstituted hydrocarbyl group.

5. The catalyst compound of claim 1, wherein the catalyst compound is at least 50% racemic.

6. The catalyst compound of claim 1, wherein at least one R' is a methyl group.

7. A catalyst system comprising an activator and the catalyst compound of claim 1.

8. The catalyst system of claim 7, wherein the activator comprises alumoxane or a non-coordinating anion.

9. The catalyst system of claim 7, wherein the catalyst system further comprises a support.

10. A process to polymerize olefins comprising contacting one or more olefins with the catalyst system of claim 7.

11. The process of claim 10, wherein the olefins and catalyst system are contacted in the gas phase.

12. The process of claim 10, wherein the olefins and catalyst system are contacted in the slurry phase.

13. The process of claim 10, wherein the olefins and catalyst system are contacted in the solution phase.

14. The process of claim 10, wherein the olefins and catalyst system are contacted in a slurry loop reactor.

15. The process of claim 10, wherein the polymerization is a continuous process.

16. The process of claim 10, wherein the catalyst system comprises one or more of: rac/meso $Me_2Si(Me_3SiCH_2Cp)_2HfMe_2$; rac$Me_2Si(Me_3SiCH_2Cp)_2HfMe_2$; rac/meso $Ph_2Si(Me_3SiCH_2Cp)_2HfMe_2$; $Me_2Si(Me_4Cp)(Me_3SiCH_2Cp)HfMe_2$; $Ph_2Si(Me_4Cp)(Me_3SiCH_2Cp)HfMe_2$; rac/meso $Me_2Si(Me_3SiCH_2Cp)_2ZrMe_2$; $Me_2Si(Me_4Cp)(Me_3SiCH_2Cp)ZrMe_2$; $Ph_2Si(Me_4Cp)(Me_3SiCH_2Cp)ZrMe_2$; rac/meso $(CH_2)_3Si(Me_3SiCH_2Cp)_2ZrMe_2$; rac/meso $(CH_2)_4Si(Me_3SiCH_2Cp)_2HfMe_2$; rac/meso $(C_6F_5)_2Si(Me_3SiCH_2Cp)_2HfMe_2$; rac/meso $(CH_2)_3Si(Me_3SiCH_2Cp)_2ZrMe_2$; rac/meso $(CH_2)_4Si(Me_3SiCH_2Cp)_2ZrMe_2$; rac/ meso (C₆F₅)₂Si(Me₃SiCH₂Cp)₂ZrMe₂; (CH₂)₄Si(Me₄Cp)(Me₃SiCH₂Cp)HfMe₂; (CH₂)₄Si(Me₄Cp)(Me₃SiCH₂Cp)ZrMe₂; (CH₂)₃Si(Me₄Cp)(Me₃SiCH₂Cp)HfMe₂; (CH₂)₃Si(Me₄Cp)(Me₃SiCH₂Cp)ZrMe₂; (C₆F₅)₂Si(Me₄Cp)(Me₃SiCH₂Cp)HfMe₂; (C₆F₅)₂Si(Me₄Cp)(Me₃SiCH₂Cp)ZrMe₂; rac/meso Me₂Ge(Me₃SiCH₂Cp)₂HfMe₂; rac/meso Me₂Si(Me₂PhSiCH₂Cp)₂HfMe₂; rac/meso Ph₂Si(Me₂PhSiCH₂Cp)₂HfMe₂; Me₂Si(Me₄Cp)(Me₂PhSiCH₂Cp)HfMe₂; Ph₂Si(Me₄Cp)(Me₂PhSiCH₂Cp)HfMe₂; rac/meso Me₂Si(Me₂PhSiCH₂Cp)₂ZrMe₂; Me₂Si(Me₄Cp)(Me₂PhSiCH₂Cp)ZrMe₂; Ph₂Si(Me₄Cp)(Me₂PhSiCH₂Cp)ZrMe₂; rac/meso (CH₂)₃Si(Me₂PhSiCH₂Cp)₂HfMe₂; rac/meso (CH₂)₄Si(Me₂PhSiCH₂Cp)₂HfMe₂; rac/meso (C₆F₅)₂Si(Me₂PhSiCH₂Cp)₂HfMe₂; rac/meso (CH₂)₃Si(Me₂PhSiCH₂Cp)₂ZrMe₂; rac/meso (CH₂)₄Si(Me₂PhSiCH₂Cp)₂ZrMe₂; rac/meso (C₆F₅)₂Si(Me₂PhSiCH₂Cp)₂ZrMe₂; (CH₂)₄Si(Me₄Cp)(Me₂PhSiCH₂Cp)HfMe₂; (CH₂)₄Si(Me₄Cp)(Me₂PhSiCH₂Cp)ZrMe₂; (CH₂)₃Si(Me₄Cp)(Me₂PhSiCH₂Cp)HfMe₂; (CH₂)₃Si(Me₄Cp)(Me₂PhSiCH₂Cp)ZrMe₂; (C₆F₅)₂Si(Me₄Cp)(Me₂PhSiCH₂Cp)HfMe₂; (C₆F₅)₂Si(Me₄Cp)(Me₂PhSiCH₂Cp)ZrMe₂; rac/meso Me₂Ge(Me₂PhSiCH₂Cp)₂HfMe₂; rac/meso Me₂Si(MePh₂SiCH₂Cp)₂HfMe₂; rac/meso Ph₂Si(MePh₂SiCH₂Cp)₂HfMe₂; Me₂Si(Me₄Cp)(MePh₂SiCH₂Cp)HfMe₂; Ph₂Si(Me₄Cp)(MePh₂SiCH₂Cp)HfMe₂; rac/meso Me₂Si(MePh₂SiCH₂Cp)₂ZrMe₂; Me₂Si(Me₄Cp)(MePh₂SiCH₂Cp)ZrMe₂; Ph₂Si(Me₄Cp)(MePh₂SiCH₂Cp)ZrMe₂; rac/meso (CH₂)₃Si(MePh₂SiCH₂Cp)₂HfMe₂; rac/meso (CH₂)₄Si(MePh₂SiCH₂Cp)₂HfMe₂; rac/meso (C₆F₅)₂Si(MePh₂SiCH₂Cp)₂HfMe₂; rac/meso (CH₂)₃Si(MePh₂SiCH₂Cp)₂ZrMe₂; rac/meso (CH₂)₄Si(MePh₂SiCH₂Cp)₂ZrMe₂; rac/meso (C₆F₅)₂Si(MePh₂SiCH₂Cp)₂ZrMe₂; (CH₂)₄Si(Me₄Cp)(MePh₂SiCH₂Cp)HfMe₂; (CH₂)₄Si(Me₄Cp)(MePh₂SiCH₂Cp)ZrMe₂; (CH₂)₃Si(Me₄Cp)(MePh₂SiCH₂Cp)HfMe₂; (CH₂)₃Si(Me₄Cp)(MePh₂SiCH₂Cp)ZrMe₂; (C₆F₅)₂Si(Me₄Cp)(MePh₂SiCH₂Cp)HfMe₂; (C₆F₅)₂Si(Me₄Cp)(MePh₂SiCH₂Cp)ZrMe₂; rac/meso Me₂Ge(MePh₂SiCH₂Cp)₂HfMe₂; rac/meso Me₂Si(Ph₃SiCH₂Cp)₂HfMe₂; rac/meso Ph₂Si(Ph₃SiCH₂Cp)₂HfMe₂; Me₂Si(Me₄Cp)(Ph₃SiCH₂Cp)HfMe₂; Ph₂Si(Me₄Cp)(Ph₃SiCH₂Cp)HfMe₂; rac/meso Me₂Si(Ph₃SiCH₂Cp)₂ZrMe₂; Me₂Si(Me₄Cp)(Ph₃SiCH₂Cp)ZrMe₂; Ph₂Si(Me₄Cp)(Ph₃SiCH₂Cp)ZrMe₂; rac/meso (CH₂)₃Si(Ph₃SiCH₂Cp)₂HfMe₂; rac/meso (CH₂)₄Si(Ph₃SiCH₂Cp)₂HfMe₂; rac/meso (C₆F₅)₂Si(Ph₃SiCH₂Cp)₂HfMe₂; rac/meso (CH₂)₃Si(Ph₃SiCH₂Cp)₂ZrMe₂; rac/meso (CH₂)₄Si(Ph₃SiCH₂Cp)₂ZrMe₂; rac/meso (C₆F₅)₂Si(Ph₃SiCH₂Cp)₂ZrMe₂; (CH₂)₄Si(Me₄Cp)(Ph₃SiCH₂Cp)HfMe₂; (CH₂)₄Si(Me₄Cp)(Ph₃SiCH₂Cp)ZrMe₂; (CH₂)₃Si(Me₄Cp)(Ph₃SiCH₂Cp)HfMe₂; (CH₂)₃Si(Me₄Cp)(Ph₃SiCH₂Cp)ZrMe₂; (C₆F₅)₂Si(Me₄Cp)(Ph₃SiCH₂Cp)HfMe₂; (C₆F₅)₂Si(Me₄Cp)(Ph₃SiCH₂Cp)ZrMe₂; rac/meso Me₂Ge(Ph₃SiCH₂Cp)₂HfMe₂; rac/meso Me₂Si(Cy₃SiCH₂Cp)₂HfMe₂; racMe₂Si(Cy₃SiCH₂Cp)₂HfMe₂; rac/meso Ph₂Si(Cy₃SiCH₂Cp)₂HfMe₂; Me₂Si(Me₄Cp)(Cy₃SiCH₂Cp)HfMe₂; Ph₂Si(Me₄Cp)(Cy₃SiCH₂Cp)HfMe₂; rac/meso Me₂Si(Cy₃SiCH₂Cp)₂ZrMe₂; Me₂Si(Me₄Cp)(Cy₃SiCH₂Cp)ZrMe₂; Ph₂Si(Me₄Cp)(Cy₃SiCH₂Cp)ZrMe₂; rac/meso (CH₂)₃Si(Cy₃SiCH₂Cp)₂HfMe₂; rac/meso (CH₂)₄Si(Cy₃SiCH₂Cp)₂HfMe₂; rac/meso (C₆F₅)₂Si(Cy₃SiCH₂Cp)₂HfMe₂; rac/meso (CH₂)₃Si(Cy₃SiCH₂Cp)₂ZrMe₂; rac/meso (CH₂)₄Si(Cy₃SiCH₂Cp)₂ZrMe₂; rac/meso (C₆F₅)₂Si(Cy₃SiCH₂Cp)₂ZrMe₂; (CH₂)₄Si(Me₄Cp)(Cy₃SiCH₂Cp)HfMe₂; (CH₂)₄Si(Me₄Cp)(Cy₃SiCH₂Cp)ZrMe₂; (CH₂)₃Si(Me₄Cp)(Cy₃SiCH₂Cp)HfMe₂; (CH₂)₃Si(Me₄Cp)(Cy₃SiCH₂Cp)ZrMe₂; (C₆F₅)₂Si(Me₄Cp)(Cy₃SiCH₂Cp)HfMe₂; (C₆F₅)₂Si(Me₄Cp)(Cy₃SiCH₂Cp)ZrMe₂; rac/meso Me₂Ge(Cy₃SiCH₂Cp)₂HfMe₂; rac/meso Me₂Si(Cy₂MeSiCH₂Cp)₂HfMe₂; rac/meso Ph₂Si(Cy₂MeSiCH₂Cp)₂HfMe₂; Me₂Si(Me₄Cp)(Cy₂MeSiCH₂Cp)HfMe₂; Ph₂Si(Me₄Cp)(Cy₂MeSiCH₂Cp)HfMe₂; rac/meso Me₂Si(Cy₂MeSiCH₂Cp)₂ZrMe₂; Me₂Si(Me₄Cp)(Cy₂MeSiCH₂Cp)ZrMe₂; Ph₂Si(Me₄Cp)(Cy₂MeSiCH₂Cp)ZrMe₂; rac/meso (CH₂)₃Si(Cy₂MeSiCH₂Cp)₂HfMe₂; rac/meso (CH₂)₄Si(Cy₂MeSiCH₂Cp)₂HfMe₂; rac/meso (C₆F₅)₂Si(Cy₂MeSiCH₂Cp)₂HfMe₂; rac/meso (CH₂)₃Si(Cy₂MeSiCH₂Cp)₂ZrMe₂; rac/meso (CH₂)₄Si(Cy₂MeSiCH₂Cp)₂ZrMe₂; rac/meso (C₆F₅)₂Si(Cy₂MeSiCH₂Cp)₂ZrMe₂; (CH₂)₄Si(Me₄Cp)(Cy₂MeSiCH₂Cp)HfMe₂; (CH₂)₄Si(Me₄Cp)(Cy₂MeSiCH₂Cp)ZrMe₂; (CH₂)₃Si(Me₄Cp)(Cy₂MeSiCH₂Cp)HfMe₂; (CH₂)₃Si(Me₄Cp)(Cy₂MeSiCH₂Cp)ZrMe₂; (C₆F₅)₂Si(Me₄Cp)(Cy₂MeSiCH₂Cp)HfMe₂; (C₆F₅)₂Si(Me₄Cp)(Cy₂MeSiCH₂Cp)ZrMe₂; rac/meso Me₂Ge(Cy₂MeSiCH₂Cp)₂HfMe₂; rac/meso Me₂Si(CyMe₂SiCH₂Cp)₂HfMe₂; rac/meso Ph₂Si(CyMe₂SiCH₂Cp)₂HfMe₂; Me₂Si(Me₄Cp)(CyMe₂SiCH₂Cp)HfMe₂; Ph₂Si(Me₄Cp)(CyMe₂SiCH₂Cp)HfMe₂; rac/meso Me₂Si(CyMe₂SiCH₂Cp)₂ZrMe₂; Me₂Si(Me₄Cp)(CyMe₂SiCH₂Cp)ZrMe₂; Ph₂Si(Me₄Cp)(CyMe₂SiCH₂Cp)ZrMe₂; rac/meso (CH₂)₃Si(CyMe₂SiCH₂Cp)₂HfMe₂; rac/meso (CH₂)₄Si(CyMe₂SiCH₂Cp)₂HfMe₂; rac/meso (C₆F₅)₂Si(CyMe₂SiCH₂Cp)₂HfMe₂; rac/meso (CH₂)₃Si(CyMe₂SiCH₂Cp)₂ZrMe₂; rac/meso (CH₂)₄Si(CyMe₂SiCH₂Cp)₂ZrMe₂; rac/meso (C₆F₅)₂Si(CyMe₂SiCH₂Cp)₂ZrMe₂; (CH₂)₄Si(Me₄Cp)(CyMe₂SiCH₂Cp)HfMe₂; (CH₂)₄Si(Me₄Cp)(CyMe₂SiCH₂Cp)ZrMe₂; (CH₂)₃Si(Me₄Cp)(CyMe₂SiCH₂Cp)HfMe₂; (CH₂)₃Si(Me₄Cp)(CyMe₂SiCH₂Cp)ZrMe₂; (C₆F₅)₂Si(Me₄Cp)(CyMe₂SiCH₂Cp)HfMe₂; (C₆F₅)₂Si(Me₄Cp)(CyMe₂SiCH₂Cp)ZrMe₂; rac/meso Me₂Ge(CyMe₂SiCH₂Cp)₂HfMe₂; rac/meso Me₂Si(Cy₂PhSiCH₂Cp)₂HfMe₂; rac/meso Ph₂Si(Cy₂PhSiCH₂Cp)₂HfMe₂; Me₂Si(Me₄Cp)(Cy₂PhSiCH₂Cp)HfMe₂; Ph₂Si(Me₄Cp)(Cy₂PhSiCH₂Cp)HfMe₂; rac/meso Me₂Si(Cy₂PhSiCH₂Cp)₂ZrMe₂; Me₂Si(Me₄Cp)(Cy₂PhSiCH₂Cp)ZrMe₂; Ph₂Si(Me₄Cp)(Cy₂PhSiCH₂Cp)ZrMe₂; rac/meso (CH₂)₃Si(Cy₂PhSiCH₂Cp)₂HfMe₂; rac/meso (CH₂)₄Si(Cy₂PhSiCH₂Cp)₂HfMe₂; rac/meso (C₆F₅)₂Si(Cy₂PhSiCH₂Cp)₂HfMe₂; rac/meso (CH₂)₃Si(Cy₂PhSiCH₂Cp)₂ZrMe₂; rac/meso (CH₂)₄Si(Cy₂PhSiCH₂Cp)₂ZrMe₂; rac/meso (C₆F₅)₂Si(Cy₂PhSiCH₂Cp)₂ZrMe₂; (CH₂)₄Si(Me₄Cp)(Cy₂PhSiCH₂Cp)HfMe₂; (CH₂)₄Si(Me₄Cp)(Cy₂PhSiCH₂Cp)ZrMe₂; (CH₂)₃Si(Me₄Cp)(Cy₂PhSiCH₂Cp)HfMe₂; (CH₂)₃Si(Me₄Cp)(Cy₂PhSiCH₂Cp)ZrMe₂; (C₆F₅)₂Si(Me₄Cp)(Cy₂PhSiCH₂Cp)HfMe₂; (C₆F₅)₂Si(Me₄Cp)(Cy₂PhSiCH₂Cp)ZrMe₂; rac/meso Me₂Ge(Cy₂PhSiCH₂Cp)₂HfMe₂; rac/meso Me₂Si(CyPh₂SiCH₂Cp)₂HfMe₂; rac/meso Ph₂Si(CyPh₂SiCH₂Cp)₂HfMe₂; Me₂Si(Me₄Cp)(CyPh₂SiCH₂Cp)HfMe₂; Ph₂Si(Me₄Cp)(CyPh₂SiCH₂Cp)

HfMe$_2$; rac/meso Me$_2$Si(CyPh$_2$SiCH$_2$Cp)$_2$ZrMe$_2$; Me$_2$Si(Me$_4$Cp)(CyPh$_2$SiCH$_2$Cp)ZrMe$_2$; Ph$_2$Si(Me$_4$Cp)(CyPh$_2$SiCH$_2$Cp)ZrMe$_2$; rac/meso (CH$_2$)$_3$Si(CyPh$_2$SiCH$_2$Cp)$_2$HfMe$_2$; rac/meso (CH$_2$)$_4$Si(CyPh$_2$SiCH$_2$Cp)$_2$HfMe$_2$; rac/meso (C$_6$F$_5$)$_2$Si(CyPh$_2$SiCH$_2$Cp)$_2$HfMe$_2$; rac/meso (CH$_2$)$_3$Si(CyPh$_2$SiCH$_2$Cp)$_2$ZrMe$_2$; rac/meso (CH$_2$)$_4$Si(CyPh$_2$SiCH$_2$Cp)$_2$ZrMe$_2$; rac/meso (C$_6$F$_5$)$_2$Si(CyPh$_2$SiCH$_2$Cp)$_2$ZrMe$_2$; (CH$_2$)$_4$Si(Me$_4$Cp)(CyPh$_2$SiCH$_2$Cp)HfMe$_2$; (CH$_2$)$_4$Si(Me$_4$Cp)(CyPh$_2$SiCH$_2$Cp)ZrMe$_2$; (CH$_2$)$_3$Si(Me$_4$Cp)(CyPh$_2$SiCH$_2$Cp)HfMe$_2$; (CH$_2$)$_3$Si(Me$_4$Cp)(CyPh$_2$SiCH$_2$Cp)ZrMe$_2$; (C$_6$F$_5$)$_2$Si(Me$_4$Cp)(CyPh$_2$SiCH$_2$Cp)HfMe$_2$; (C$_6$F$_5$)$_2$Si(Me$_4$Cp)(CyPh$_2$SiCH$_2$Cp)ZrMe$_2$, and rac/meso Me$_2$Ge(CyPh$_2$SiCH$_2$Cp)$_2$HfMe$_2$.

17. The process of claim 10, wherein the activator comprises alumoxane.

18. The process of claim 10, wherein the olefins comprise ethylene and optionally one more C$_3$ to C$_{20}$ alpha olefins.

19. The process of claim 10, wherein the activator comprises a non-coordinating anion activator.

20. The catalyst compound of claim 1, wherein R$^3$ is —CH$_2$—SiR'$_3$ or —CH$_2$—CR'$_3$, wherein a first R' is hydrogen, a second R' is hydrogen, and a third R' is a C$_1$ to C$_{20}$ substituted or unsubstituted hydrocarbyl.

21. The catalyst compound of claim 1, wherein R$^3$ is —CH$_2$—SiR'$_3$ or —CH$_2$—CR'$_3$, wherein a first R' is hydrogen, a second R' is a C$_1$ to C$_{20}$ substituted or unsubstituted hydrocarbyl, and a third R' is a C$_1$ to C$_{20}$ substituted or unsubstituted hydrocarbyl.

22. The catalyst compound of claim 1, wherein R$^3$ is —CH$_2$—SiR'$_3$ or —CH$_2$—CR'$_3$, wherein each R' is, independently, a C$_1$ to C$_{20}$ substituted or unsubstituted hydrocarbyl.

* * * * *